United States Patent [19]
Fraughton et al.

[11] Patent Number: 5,153,836
[45] Date of Patent: Oct. 6, 1992

[54] UNIVERSAL DYNAMIC NAVIGATION, SURVEILLANCE, EMERGENCY LOCATION, AND COLLISION AVOIDANCE SYSTEM AND METHOD

[75] Inventors: Edward J. Fraughton, 10353 S. 1300 West, South Jordan, Utah 84065; Philip H. Berger, Salt Lake City, Utah

[73] Assignee: Edward J. Fraughton, Salt Lake City, Utah

[21] Appl. No.: 571,514

[22] Filed: Aug. 22, 1990

[51] Int. Cl.⁵ .......................... G06F 15/50; G01S 3/02
[52] U.S. Cl. .................... 364/461; 364/452; 340/961; 342/30; 342/41; 342/455
[58] Field of Search .............. 364/452, 459, 460, 461; 340/961; 342/29-32, 41, 450, 451, 455, 463

[56] References Cited

U.S. PATENT DOCUMENTS

| | | | |
|---|---|---|---|
| 3,750,166 | 7/1973 | Dearth | 342/30 |
| 4,197,538 | 4/1980 | Stocker | 343/6.5 |
| 4,704,735 | 11/1987 | Swapp et al. | 455/68 |
| 4,814,711 | 3/1989 | Olsen et al. | 324/331 |
| 4,835,537 | 5/1989 | Manion | 324/30 |
| 4,884,208 | 11/1989 | Marinelli et al. | 364/460 |
| 5,043,903 | 8/1991 | Constant | 342/31 |

*Primary Examiner*—Gary Chin
*Attorney, Agent, or Firm*—Workman, Nydegger & Jensen

[57] ABSTRACT

A craft tracking and collision avoidance system is disclosed. The system allows the positions of a plurality of craft, either on land, sea, or air, or space, to be monitored. Each craft determines its own position using an existing position determining system such as LORAN or GPS. Each craft then transmits a radio frequency signal into which position information, preferably identifying information, and other messages, have been encoded. Each craft broadcasts its position, identifying information and other messages on a regular basis without the need for any interrogation signal. The broadcast position and identification information can be received by other craft and, since each craft has determined its own position, can be used to determine the proximity and identity of other craft, and if the craft are on a collision course. Preferably, the position of all the craft within a predetermined range of a craft is represented on a display in order to give the craft operator a visual indication of traffic surrounding his craft.

79 Claims, 14 Drawing Sheets

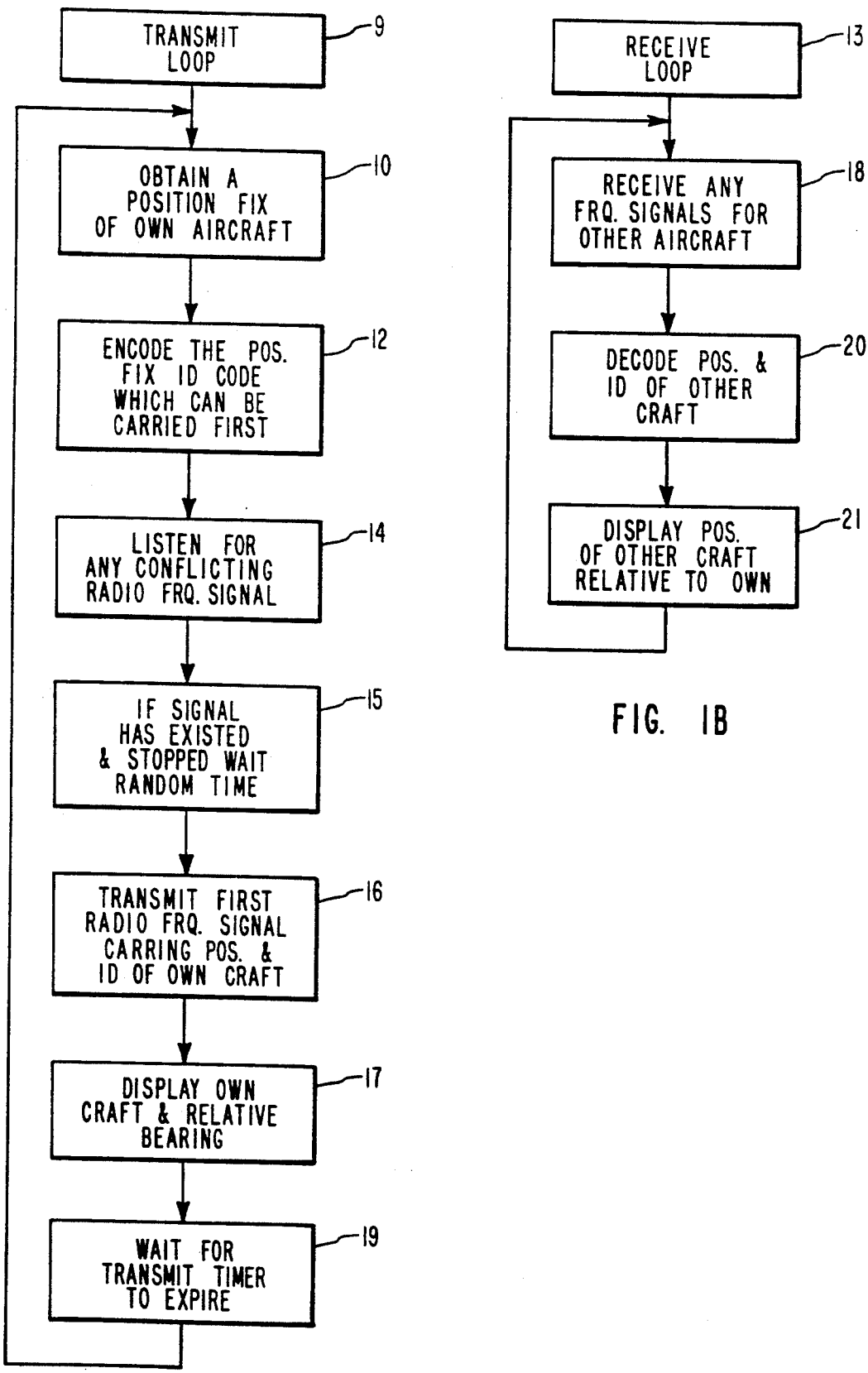

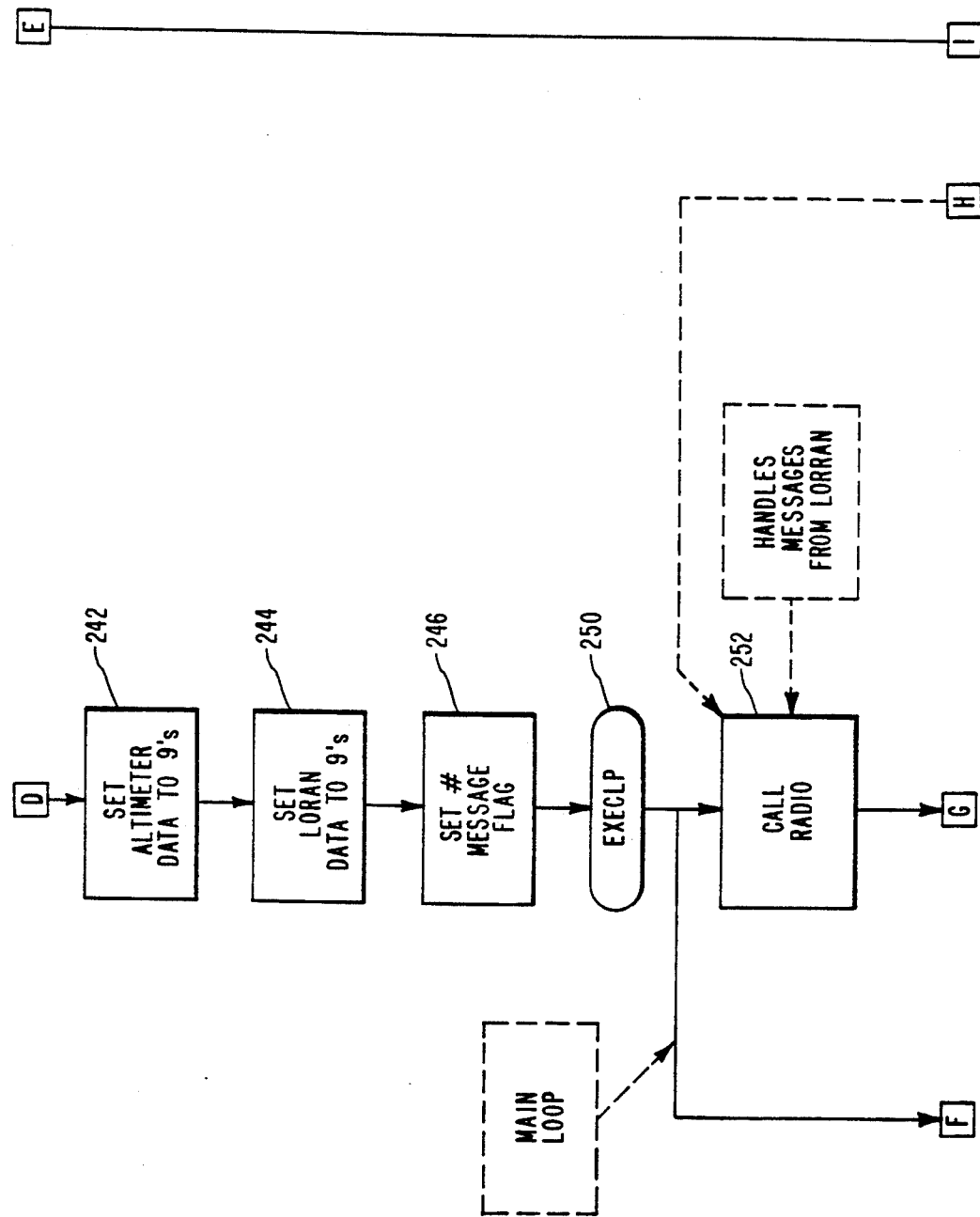

UNIVERSAL DYNAMIC NAVIGATION, SURVEILLANCE, EMERGENCY LOCATION, AND COLLISION AVOIDANCE SYSTEM AND METHOD

A portion of the disclosure of this patent document contains material to which a claim of copyright protection is made. The copyright owner has no objection to the facsimile reproduction by any one of the patent document or the patent disclosure as it appears in the Patent and Trademark Office patent file or records, but reserves all other rights in the copyrighted work.

BACKGROUND

1. The Field of the Invention

This invention relates to systems and methods for automatically announcing the position of one or more mobile craft to a receiver positioned at a remote location. More particularly, the present invention relates to systems and methods for tracking the positions of a plurality of mobile craft so as to provide assistance in navigation, surveillance, emergency location and collision avoidance.

2. The Prior Art

Throughout recorded history there has been an ever increasing need for more precise navigational aids. Through the years, the time keeping and position determining devices used for navigation have evolved from sun dials and sextants to sophisticated digital electronic systems capable of providing nearly pinpoint positioning accuracy almost anywhere in the world.

In today's transportation and communications environment, many devices exist that provide specific navigational aid to the operators of air, sea, and land craft. Navigational aids such as the Global Positioning Satellite system (GPS), the Long Range Navigation system (LORAN), and other navigational aids commonly referred to by such various acronyms as: VOR-DME, VOR-TACAN, DECCA, OMEGA, NDB, ILS, MLS, and ADF, are used by craft operators, particularly aircraft pilots, to determine the position of their craft in one, two, or three planes in space. For example, an operator of an aircraft may only desire to know the position of the craft above or below the surface of the earth (altitude or depth) or may desire to know only the position of the craft relative to a fixed terrestrial reference system (latitude and longitude) or the operator may desire to know the craft's position in all three planes in space.

One of the purposes of the various available navigational aids is to allow operators of craft, in particular air and water craft, to avoid collisions between their craft. As is well known, mid-air collisions of aircraft almost always result in disastrous loss of life and property. In an effort to avoid collisions between craft various systems have been implemented in the air and marine transportation industries.

In the United States, government agencies dealing with the air transportation industry have recognized a need to prevent mid-air collisions. In an effort to reduce the occurrence of mid-air collisions, U.S. government agencies have mandated that by the end of 1991 all commercial aircraft with thirty or more seats be equipped with collision avoidance equipment. Several types of collision avoidance equipment have been devised and are classified as either "active" or "passive" systems. These systems are commonly designated as Traffic Alert and Collision Avoidance Systems, also referred to as TCAS.

TCAS has been designed as a primary collision avoidance system for commercial aircraft and has received the United States Federal Aviation Administration's approval. An "active" TCAS system (TCAS II or III) provides the capability to interrogate other nearby transponder-equipped aircraft to elicit a responsive reply, while "passive" TCAS systems (TCAS I) simply eavesdrop on nearby interrogation replies from other transponders. In order to detect a "bearing," a TCAS system requires an expensive directional antenna.

The TCAS method is dependant upon either a secondary or beacon surveillance radar system, or other transponder (S) type interrogations in order to elicit a responsive reply. It is also transponder dependant, meaning that any aircraft not equipped with a transponder will not be detected, and any transponder not coupled to an altitude encoder will not deliver altitude information.

Recently, serious questions have been raised about how "safe" TCAS is in practice. TCAS operates in a narrow band of Air Traffic Control (ATC) radio frequencies in the microwave region of the spectrum. Thus, because of the number of interrogation requests and replies elicited, and the amount of information needed to be processed both TCAS and the ATC system may be "overwhelmed," and their operation sufficiently degraded to the point of "saturation," where the number of aircraft under the control of ATC exceeds the capacity of the system. Already, computer overloads and radar shutdowns have occurred at some busy locations. There is also the danger of a malfunction occurring, such as an item of interrogation equipment becoming stuck in the transmit mode, thereby "locking up" the entire system.

The high cost of the on board TCAS equipment makes its installation prohibitively expensive to most aircraft other than commercial aircraft. Moreover, TCAS III has not yet been fully developed. Even further, TCAS II and III are designed with the commercial aviation market in mind, but of the 215,926 active aircraft registered in the United States in 1988, the commercial aviation fleet only amounted to about three percent (3%) of the total. Thus, it is apparent that improved collision avoidance systems need to become more accessible to a much larger portion of the aviation industry, as well as to land and sea-based craft.

In view of these drawbacks and difficulties it would be an advance in the art to provide a complete traffic control system not requiring radar, and which provides a system and method for announcing the position of a craft to a remote receiver such that the position of the craft can be continuously monitored and collisions with other craft avoided. It would also be an advance in the art to provide a system and method for collision avoidance which may be used in addition to, and without interference with, preexisting collision avoidance systems and which can be economically implemented in the general aviation and marine industries so that, for example, with a single frequency select switch seagoing vessels could monitor air or land-based traffic and vice versa.

It would be a further advance in the art to provide a system and method which allows the operator of a first craft to monitor the position of a plurality of other craft within a predetermined range of the first craft and to alert the operator of a craft of a potential collision between craft as early as possible. It would be yet another advance in the art to provide a system and method for announcing the position of craft to other craft which are within a predetermined range which is reliable, does not distract an operator of a craft from other duties, and provides short and long range navigational assistance to the operator of a craft.

It would be a still further advance in the art to provide a system and method of tracking the position of one or more craft within a predetermined range of a location anywhere on the earth such as at a remote airstrip, or beneath the surface of the ocean, or in space. It would be an even further advance in the art to provide a collision avoidance system which does not become saturated in areas of heavy traffic and which is capable of assisting with the landing or mooring of craft operating under poor visibility conditions. Still further, it would be an advance in the art to provide a system and method for tracking the position of a number of craft, for example a fleet of land craft which are carrying out tasks such as delivery of goods or people or other tasks.

BRIEF SUMMARY AND OBJECTS OF THE INVENTION

In view of the above described state of the art, the present invention seeks to realize the following objects and advantages.

It is a primary object of the present invention to announce the position of a craft to a remote receiver such that the position of the craft can be monitored and collisions with other craft avoided.

It is also an object of the present invention to provide a system and method for collision avoidance which may be used in addition to, and without interference with, preexisting collision avoidance systems.

It is a further object of the present invention to provide an emergency location system for distressed or disabled craft.

It is a still further object of the present invention to provide a collision avoidance system which is economically implemented in the general aviation or marine industries.

It is another object of the present invention to provide a system and method which allows the operator of a first craft to monitor the position of a plurality of other craft within a predetermined range of the first craft.

It is yet another object of the present invention to provide a system and method which will alert the operator of a craft of a potential collision as early as possible.

It is another object of the present invention to provide a system and method for announcing the position of any craft to other craft which are within a predetermined range which is reliable and does not distract an operator of a craft from other duties unless operator attention is necessary.

It is a further object of the present invention to provide a system and method for providing short and long range navigational assistance to the operator of a craft.

It is a still further object of the present invention to provide a system and method which allows the operator of a first craft to continually monitor the positions of a plurality of other craft within a predetermined range.

It is another object to the present invention to provide a system and method of tracking the position of one or more craft within a predetermined range of a location anywhere on the earth such as at a remote airstrip as long as one is operating within the constraints of primary navigation inputs.

It is another object of the present invention to provide a system and method for tracking the position of each of a plurality of craft which may be operated within an independent fleet of craft.

It is a further object of the present invention to provide a collision avoidance system which operates well in areas of heavy traffic.

It is still another object of the present invention to provide a system and method for assisting with the landing or mooring of craft under poor visibility conditions.

It is yet another object of the present invention to provide a system and method for collision avoidance which presents appropriate information to the operator of the craft in an easily comprehendible manner and which provides traffic alerts and resolution advisories.

It is another object of the present invention to allow a permanent record to be made of the movement of any craft within a predetermined range of a monitoring receiver.

Another object of the present invention is to provide a direct pilot-based system of traffic control and communication, and to provide a traffic control system and method which does not require radar and that will not interfer with other existing traffic control systems which are based on radar.

A further object of the present invention is to provide a comprehensive monitoring, tracking and communication system and method to promote inter-craft operational safety.

These and other objects and advantages of the invention will become more fully apparent from the description and claims which follow, or may be learned by the practice of the invention.

The present invention allows the position of a first craft to be monitored at a location remote from the craft. The position of the craft can be monitored at a stationary receiver or from on board another craft. Since a craft equipped with the present invention can monitor the position of other properly equipped craft, collisions therebetween can be avoided.

In the case where the present invention is fully implemented, i.e., all the craft in a fleet are equipped with embodiments of the present invention, all the craft are able to monitor the position of all other craft within a predetermined range. Moreover, each craft is able to accurately transmit its own position so the present invention is a great aid to navigation.

The present invention includes means, on board a first craft, for receiving or determining the position fix of the first craft. Any number of position-determining devices may be used. For example, the position of the first craft may be obtained by using an altimeter or depth finder, the widely accepted LORAN navigation system, or GPS position determining techniques.

The position of the first craft is encoded, preferably as a digital signal, so that the position information of the first craft can be carried by a radio frequency signal. Preferably, both the craft position fix, craft identification code, and other relevant information such as radio frequency number, directory advisories, and equipment error flags are encoded so they can be carried by the radio frequency signal.

A large number of craft often operate within a limited range and may all transmit position information on the same radio frequency. In order to avoid interference with conflicting radio frequency signals, it is preferred that conflicting signals are listened for prior to transmitting the radio frequency signal.

Importantly, the present invention does not require interrogation by a land-based, or other transmitter before position information will be transmitted by a craft. The radio frequency signal carrying the position information, and preferably other messages and identification information, is regularly transmitted on a continuous basis.

The radio frequency signal which is transmitted (carrying at least the position information for the craft) is received by another craft or a stationary monitoring receiver at a remote location. The received radio frequency signal is decoded to extract the craft position, identification and other information therefrom. Using the position information, the position of the other craft is displayed.

If the radio frequency signal is received on board another craft, the position of the first craft is of great help to the operators of that craft to navigate, communicate and especially to avoid possible collisions. In order to aid the operators of that craft, the relative positions of each craft are also determined and preferably displayed.

By displaying the positions of the two craft as the craft move, a heading for each of the craft can be derived and displayed and the possibility of a collision assessed. In accordance with the present invention, if a collision is possible between two craft on their present headings the operators of each craft are alerted so appropriate action can be taken. It will be appreciated that the greatest benefit from the present invention accrues when all craft have an embodiment of the present invention on board. When all the craft are so equipped, all of the craft can monitor the position of all other craft which are within a predetermined range.

Importantly, the present invention has applications other than providing collision avoidance advice. The present invention may be used as a navigational aid, for example, by automatically displaying the craft's position on a terrain map or graphically showing a landing approach. Moreover, with appropriate navigation information, the present invention may be implemented economically and some embodiments of the invention may be used anywhere in the world. Also, the embodiments of the present invention can be used to locate and direct precision emergency location and rescue efforts in the case of disabled craft.

Significantly, the present invention does not rely on interrogation by other craft to transmit its position fix. Rather, the radio frequency signal carrying the position information is transmitted regardless of the presence of any other craft or monitoring receiver. The strength of the radio frequency signal is limited so that it is received only within a predetermined range which is of interest. For example, the predetermined range of the radio frequency signal may be five, ten, thirty, or more miles. Moreover, rather than requiring a sophisticated radio direction finding antenna, the radio frequency signal of the present invention is preferably transmitted omnidirectionally so that all craft within the predetermined range will be able to extract the position information therefrom.

BRIEF DESCRIPTION OF THE DRAWINGS

In order that the manner in which the herein-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which:

FIGS. 1A-1B are high level flow charts describing the presently preferred steps carried out by the system described herein.

DETAILED DESCRIPTION OF THE PREFERRED EMBODIMENT

Figure 2:
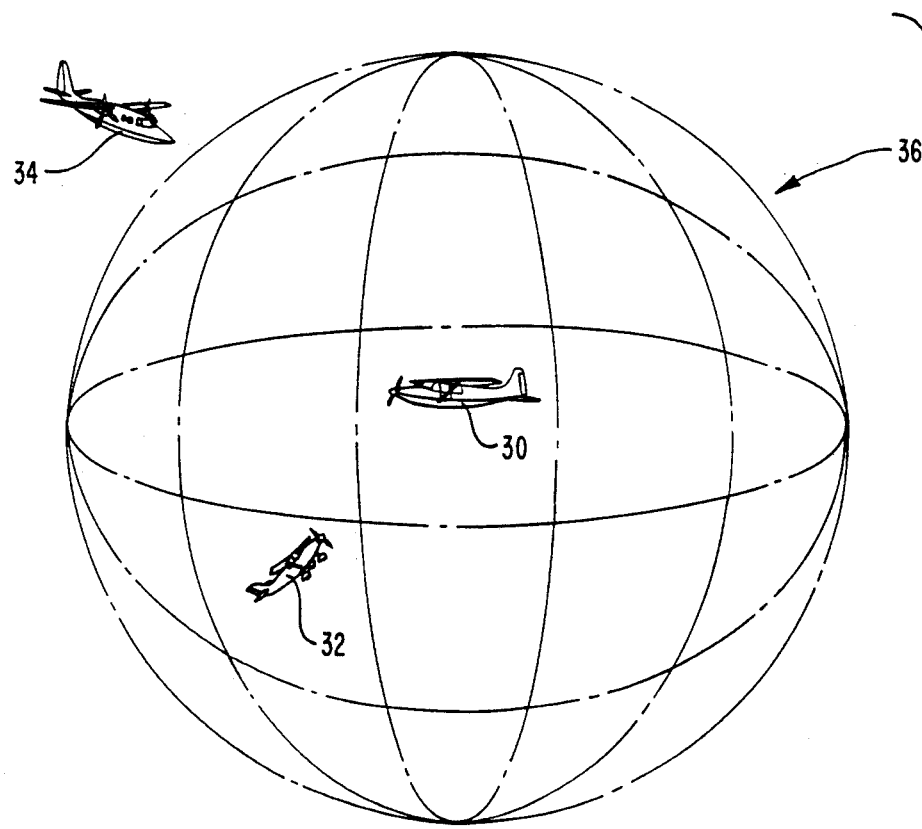
FIG. 2 depicts three aircraft as an example of the operating environment of the described embodiment of the present invention.
Figure 2:
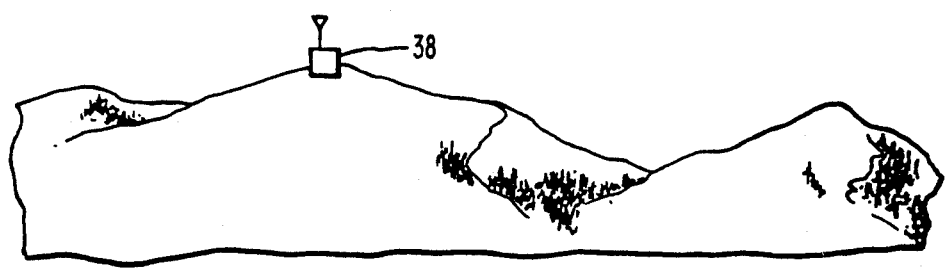

Reference will now be made to the drawings wherein like structures will be provided with like reference designations.

1. General Discussion

As discussed above, the widely promoted and available collision avoidance systems, particularly those available to the aviation industry, inherently have several drawbacks. A major drawback is the fact that the cost of installing the necessary on board equipment may exceed the cost of an entire small aircraft. Thus, economic consideration prevents such systems as TCAS, from being adopted by the great majority of the general aviation industry.

Moreover, TCAS equipment requires complex on board computers in conjunction with radio direction finding equipment. Since TCAS equipped aircraft are capable of interrogating all other aircraft in close proximity, the result is that a large number of interrogations will occur in high density air space. Eventually, the radio transmission media will become saturated thereby rendering both TCAS and secondary surveillance radar inoperative.

Even when working optimally, the TCAS and other collision avoidance systems provide only a transponder code assignment for identification, gives only relative heading information and if properly equipped, altitude information. In addition, the entire system is interrogation dependent.

In contrast to the previously available collision avoidance systems, the present invention makes use of existing ground based or satellite based equipment which has already been widely accepted, rather than requiring new dedicated equipment. Moreover, the present invention provides navigational aid and emergency location functions not contemplated in previously available systems. Importantly, the collision avoidance, navigation aid, and emergency location functions are all provided economically and thus the necessary equipment can be installed on board even small privately owned aircraft. Still further, the present invention can be applied in space, air, land, and sea craft and provide collision avoidance, navigation, and emergency location functions in nearly every environment, including IFR conditions.

The present invention is able to achieve its great advantages over the previously available systems by utilizing one of the existing position determining systems, or their equivalent, that is now available or currently being implemented. For example, using the LORAN system a craft, or in the case of portable LORAN receivers an individual, can immediately obtain a position fix measured in latitude and longitude, in many areas of the world. Also, the GPS scheme, when fully implemented, will allow a position fix measured in latitude, longitude, and altitude, to be determined anywhere in the world with great precision. These existing position determining systems, and others when available, are used by the present invention to provide advantages not heretofore available in the art.

The described presently preferred embodiment of the invention utilizes the LORAN position determining system. While one form or another of the LORAN system has been known for many years, especially in the marine environment, it has recently gained world-wide acceptance among other types of craft operators, and particularly among aircraft operators. The LORAN system provides more useful navigational information than many other navigational instruments now in popular use, especially in the aviation environment. It has proven to be a highly reliable and safe system and has even been conditionally approved by the FAA for non-precision approaches to approved landing strips.

The precision of the LORAN system generally ranges from 60 to 600 feet depending on the location of the craft in relation to the geometry of several widely spaced low frequency radio transmitters which provide the necessary position fixing signals. Because of the precision and versatility of the LORAN system, LORAN receivers are available which include computers, databases and displays providing mapping and navigational aids to the operator of a craft as the craft travels. For example, LORAN equipment intended for aviation use is often provided with databases that are updated monthly to provide all current airport frequencies, runway orientation and length, airport elevations, VOR, restricted and prohibited flight areas, and other useful information.

Furthermore, some aviation LORAN receivers are able to immediately locate several of the nearest airports in times of emergency. LORAN equipment installed on aircraft is able to compute ground speed, wind direction and speed, tracking error, offer tracking and vertical navigation advisories, and report minimum safe altitudes and degrees of magnetic variation.

Excellent LORAN coverage is now available throughout most of North America. LORAN coverage is partially available in most other areas of the world including the North Atlantic, the United Kingdom, Europe, the Mediterranean Sea, North Africa, the Persian Gulf, Saudi Arabia, and Japan. The relatively low cost and high benefits of installing LORAN transmitters make the LORAN system attractive to governments of both industrialized and developing nations. Furthermore, upon its full implementation, the GPS scheme will provide even greater benefits. Since an existing position determining system is not available everywhere, the term "operational range" will be used to denote when a craft is in an area in which an existing position determining system can be effectively used.

Complete information concerning the LORAN system can be obtained from the publications Melton, L., *The Complete Loran-C Handbook* (Marine Publishing Co. 1986) and Sweeny, D. J., "Learning About Loran," *Radio-Electronics Magazine* 50–58, 69 (May 1987) which are incorporated herein by reference. Likewise, the GPS scheme may also be used in accordance with the present invention. Further information concerning GPS can be obtained from the publications entitled "Introduction to Global Positioning," *Civil Engineering* 16–20 (January/February 1987), Ashjaee, J., "Global Positioning System: Refined Processing for Better Accuracy," *Sea Technology* 20, 22–25 (March 1986) and Enge, P. K. et al, "Differential Operation of the Global Positioning System," 26 *IEEE Communications Magazine* 48-60 (July 1988) which are incorporated herein by reference.

It will be appreciated that the present invention has application in many different circumstances. Thus, as used herein the term "craft" is intended to include any stationary object, any mobile animal or person, or any mobile apparatus or vehicle. For example, land, sea and air craft are specifically intended to fall within the meaning of the term "craft."

Also, as used herein, the term "monitoring receiver" means any device or apparatus invention which can monitor the position of a craft which is transmitting position information in accordance with the present invention.

The present invention comprises an apparatus and method for announcing the position of a craft to a monitoring receiver, either stationary or mobile, remotely located from the craft. In one application, the present invention can be used to track the position of one or more craft at a stationary receiver. In another application, the present invention can be used by one craft to track one or more other craft. With the present invention in place, as a first craft tracks all the other craft positioned within a predetermined range of the first craft, and the operator of the first craft is apprised of the position of all the other craft, collisions between the craft can be avoided.

The presently preferred embodiment of the invention which is described herein is intended to be used primarily in the aviation industry. Those familiar with the aviation industry will appreciate that the problems of collision avoidance are particularly troublesome in today's crowded airspace. Adding to the problem of collision avoidance in the aviation industry are: the limited operator's field of vision in an aircraft cockpit; the speeds of the craft on a collision course provide very little time for a pilot to react and take corrective action; and an aircraft on a collision course may come from any direction in space.

Also a universally useable or mandated collision avoidance system must be economically feasible for both small, modestly priced aircraft carrying just one or two persons and large multi-million dollar aircraft carrying hundreds of passengers and/or freight. Thus, at the current time, a most urgent need for the present invention lies within the aviation industry.

Nevertheless, the present invention can be used as a position announcing and/or collision avoidance system in other demanding situations such as with water craft. Also, the present invention can be applied where a dispatcher needs to track the movement of a plurality of vehicles in a fleet, for example, motor trucks as their movements are coordinated for making deliveries and- /or pickups, buses, trains, construction and other land based equipment.

2. Detailed Description in Reference to FIGS. 1-4

In order to describe the presently understood best mode for making and using the present invention, the presently preferred embodiment of the present invention, as intended to be used in an aircraft environment will be described. As will be appreciated, the application of the present invention to air traffic monitoring and collision avoidance is one of, if not the most, demanding of the contemplated applications of the present invention because of, among other things, the speeds of the craft involved and the desirability to monitor three dimensional space as opposed to two dimensional space in the case of water and land craft.

Referring now to FIGS. 1A-1B, the preferred general method used by the system of the present invention will be explained.

As shown at 10 in FIG. 1A, the initial step of the transmit loop 9 is to obtain a position fix for one's own craft, also sometimes referred to herein as a first craft. The position fix is obtained using apparatus on board the craft. It is preferred that the position fix be obtained using an existing automated navigational system which will provide the position of the craft relative to a fixed reference, for example, latitude and longitude. This arrangement is in contrast to other collision avoidance systems which merely determine the distance between two craft and not their position relative to a fixed reference system. The LORAN system and the GPS system are among the preferred existing external automated navigational systems.

While navigational systems which are capable of providing a position fix in two dimensions (e.g., LORAN) or three dimensions (e.g., LORAN in combination with an altitude encoder or GPS) are preferred, in some applications of the present invention it may only be necessary to obtain a position fix in one dimension or plane of space. For example, in one application of the present invention, an operator of an aircraft may only need to know if another craft is operating at the same altitude. While such information is only a portion of that which the described embodiment of the present invention can provide, it is of use to alert the operator of an aircraft. If another aircraft is operating within a close range at the same altitude, an operator of the aircraft should be warned that a collision with a another aircraft is possible if precautions are not taken.

Thus, the position fix can be obtained from an altimeter only (for a one dimensional position fix), from a LORAN receiver (for a two dimensional position fix), from both a LORAN receiver and an altimeter or a GPS device (for a three dimensional position fix). Other devices can also be used to obtain a position fix.

Figures 1, 4:
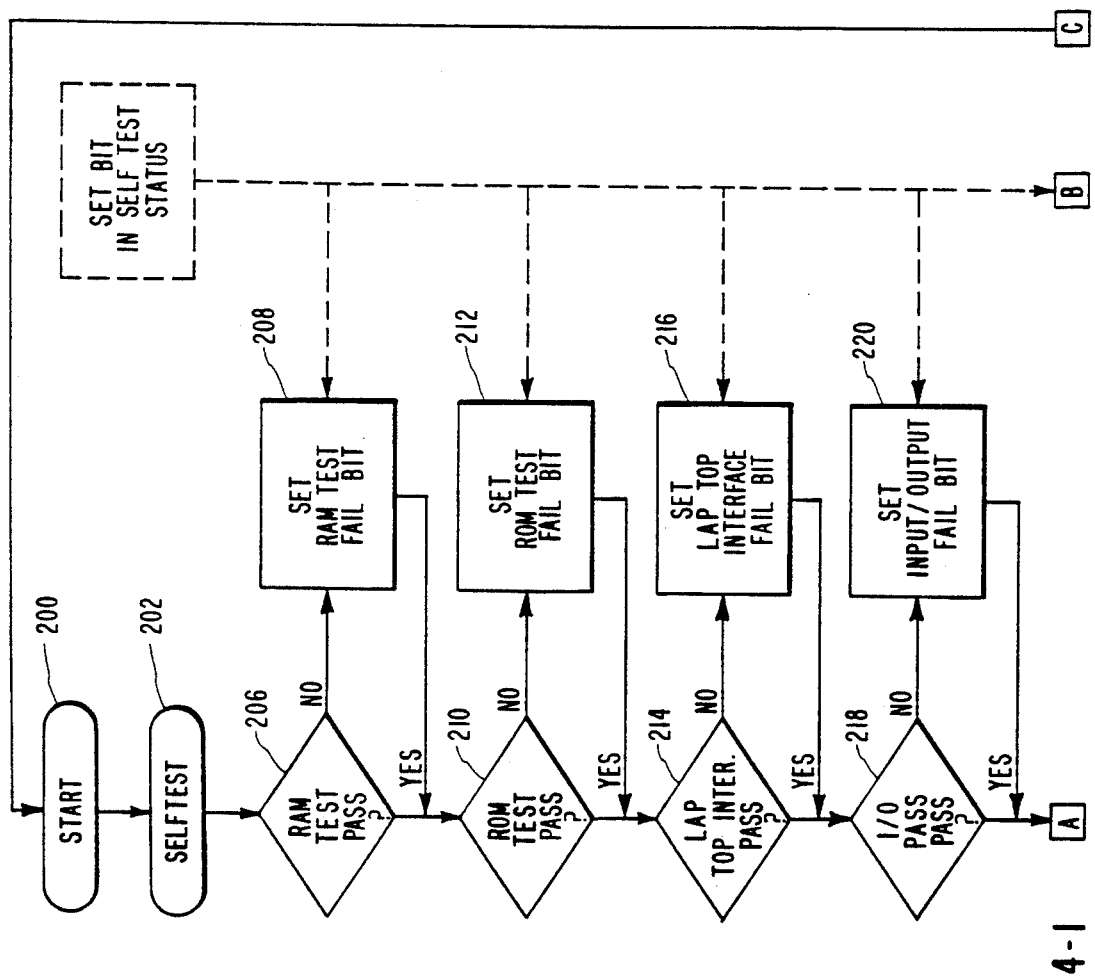
FIGS. 4-1 through 4-11 provide a flow chart describing the steps carried out by the preferred embodiment of the apparatus of the present invention.
Figures 2, 4:
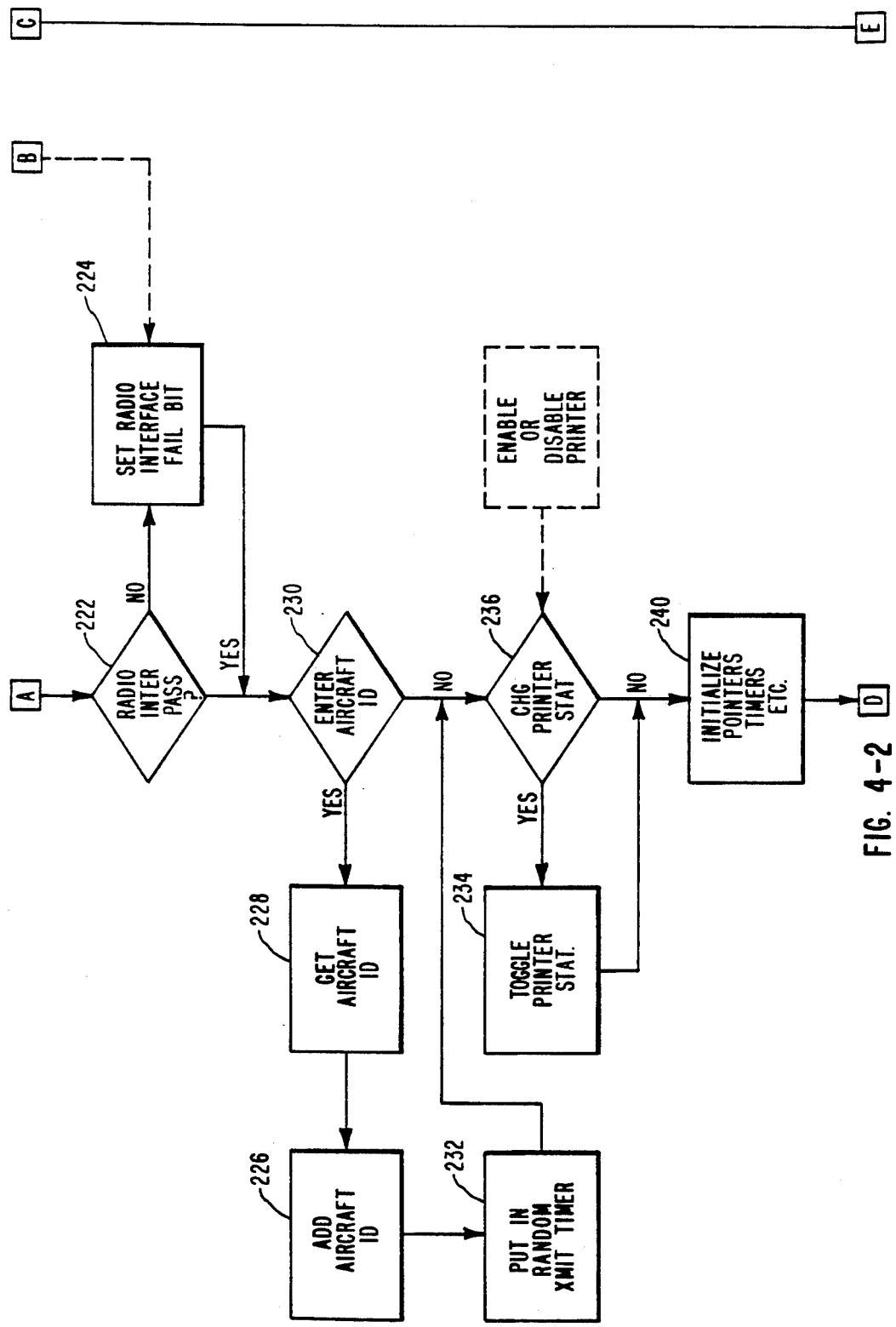
Figure 4:
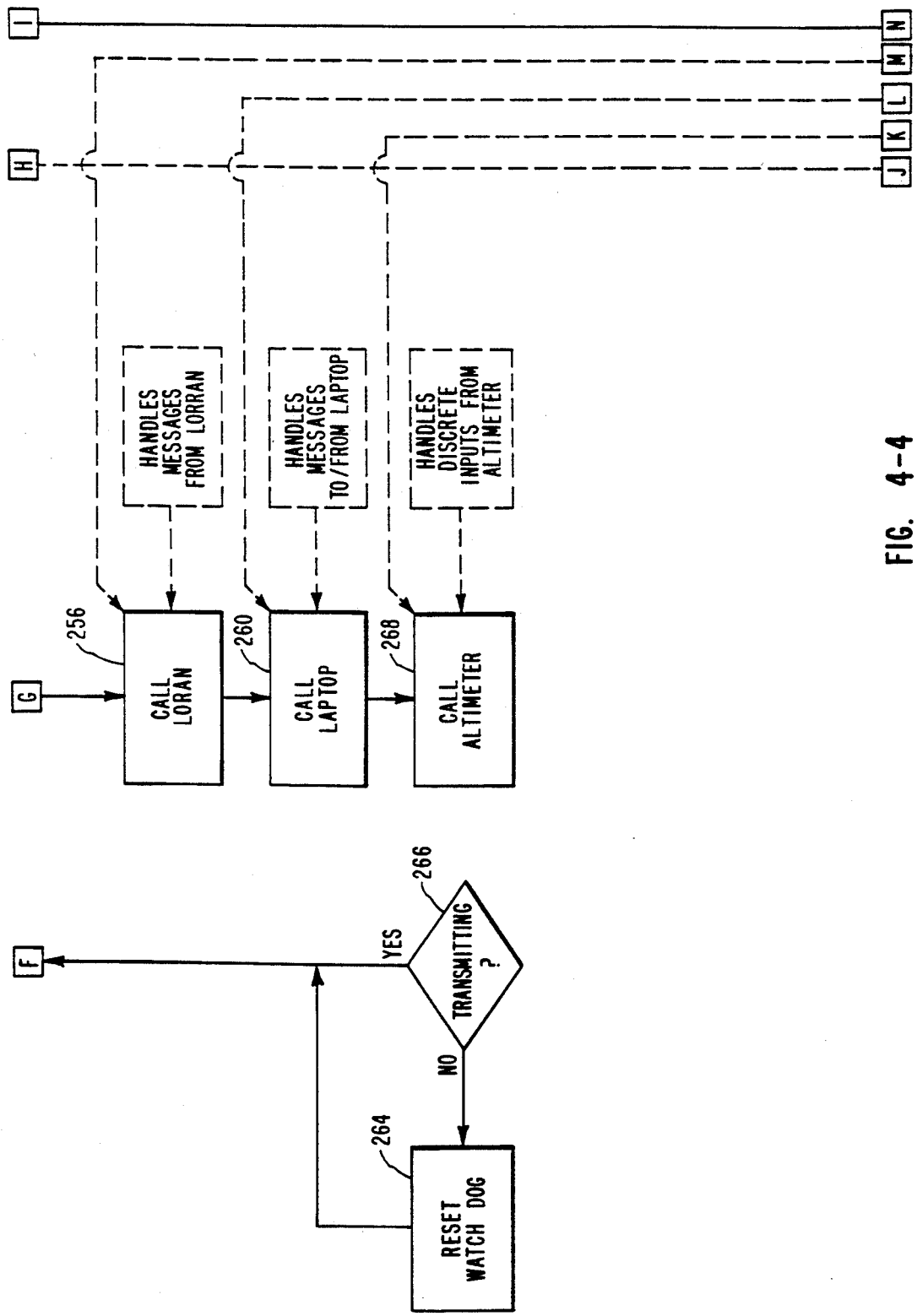
Figure 4:
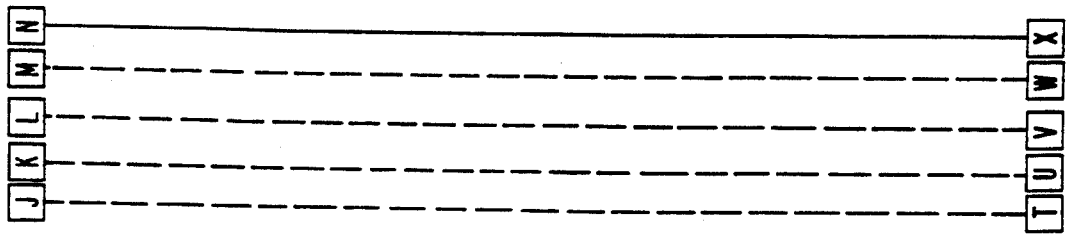

As indicated at step 12 in FIG. 1, the position fix which was obtained in step 10 is encoded so that it can be carried by a radio frequency signal. In addition to the position fix, an identification code (such as an aircraft registration number) and/or other messages are also encoded. It is preferred that the position fix and the identification code and other messages be digitally encoded so that they can be transmitted at a relatively high baud rate as will be described in detail below.

In the United States, the radio frequency allocation of 1.6 Gigahertz has been reserved for aviation use. Thus, it is presently preferred, but not required, to utilize the 1.6 Gigahertz frequency allocation. Since all aircraft utilizing the present invention preferably utilize the same frequency, step 14 provides that any conflicting radio frequency signals are listened for.

One of the significant advantages of the present invention is that, as opposed to previously available collision avoidance systems, a craft transmits its own position fix and identification code information without being interrogated.

Since many craft may be using the described embodiment of the present invention, all using just one or a few radio frequency allocations, avoidance of conflicting radio frequency signals is necessary. In use, some conflicts may occur in the described embodiment in areas where craft are highly concentrated. In the described embodiment, the position fix and identification code information is regularly and repeatedly transmitted. Thus, if an attempt at transmitting the position fix and identification code is postponed or "walked on" by another transmission, the information will be repeated in a short period of time.

One preferred arrangement for preventing interference between conflicting radio frequency signals is to first listen for conflicting signals, as at step 14, and if a conflicting signal has existed, then wait a random period of time after the detection of a conflicting radio frequency signal, as at step 15. The length of the random period of time can be, for example, derived from the registration number of the aircraft, a random generation, or some other means. Alternatively, after the detection of a conflicting radio frequency signal, a predetermined period of time may be waited before transmission.

Additional details concerning the settlement of a conflict between radio frequency signals can be devised by those skilled in the art and further information concerning the preferred example is provided later in this disclosure. It will be understood that various schemes, including the use of scanned multiple frequencies (speed spectrum technology), higher transmission rates, and other non-interrogation schemes, can be devised and used with the present invention.

At step 16 in FIG. 1, the radio frequency signal carrying the position fix and identification code information is transmitted and the pilot's own craft and relative bearing are displayed at step 17. The system then waits at step 19 for the transmit timer to expire, before re-entering the loop for another transmission.

Whether it is desired to avoid collisions between multiple craft or to track a single craft, it is nearly always desirable to have the radio frequency signal received only within a limited range. Thus, the radio frequency signal is of limited strength. For example, when functioning to avoid collisions between aircraft, the area of interest is generally a radius of between from about 1 to about 30 miles around one's own aircraft or around the airport. Nevertheless, in some cases, such as in the case of land or sea craft, the range of interest may be greater or lesser than that which is desirable for aircraft.

The radio frequency signal carrying the position fix, identification code information, and other messages, is of limited power so that only the radio frequency signal transmitted from craft within a predetermined range will be received. This reduces the number of radio frequency signals which conflict with one another, allowing a large number of aircraft to be simultaneously operating within a predetermined range. Other embodiments of the present invention can be fabricated which allow a greater number of craft to be simultaneously operating within the predetermined range.

Preferably, the radio frequency signal from each of the aircraft is transmitted, and received, omnidirectionally. Since position information is encoded within the radio frequency signal, and not derived from the signal strength or direction, complicated antenna arrangements are not necessary with the present invention. As will be appreciated, in the case of aircraft the term "omnidirectionally" is intended to include three planes of space while in the case of land or water craft, the term "omnidirectionally" generally need only include horizontal two dimensional planes surrounding the craft.

As indicated at step 18 of receive loop 13 in FIG. 1B, the radio frequency signals for other craft are transmitted and are received at a craft or another location which is equipped with a monitoring receiver in accordance with the present invention. The receiving location may be a ground location which is tracking one or more craft. The radio frequency signals are decoded, as indicated at step 20, and the position fix and identification code information is displayed at step 21.

Once the position information has been extracted from the radio frequency signals, the position of all the other craft within the predetermined range can be displayed as represented at step 21 in FIG. 1B. As each craft regularly transmits its own position, it is possible to calculate all relative essential elements of heading, speed and distance of each craft which can then be displaced. In the case of craft on a collision course, the projected point of impact and time of impact can be calculated and displayed while the operators of the craft are alerted to the danger and given appropriate advisories. While it is not always necessary, it is preferred that an identification code for each craft be transmitted. The transmission of a craft identification code and its current operating communication radio frequency simplifies the organization of incoming data and enhances safety by providing a craft identification for two-way radio communication.

Included in step 21 of displaying the position of all craft transmitting a radio frequency signal within the predetermined range is preferably the step of displaying the position of one's own craft. Also, it is preferable to issue a collision alert if a collision is possible between two craft on their present headings. Also, since, one's own position fix has already been determined, it is possible to display the position of one's own craft against a map superimposed on the display. Data to create such maps can be provided by databases as are available in the art.

Preferably, each of the craft may be provided with a recording device which will provide a non-volatile record of all position and identification information which is received, and if desired the position information of one's own craft. Thus, if an aircraft were to become disabled and go down, the radio frequency transmissions would continue to transmit the position and identification of the craft to be obvserved by other craft. If the apparatus did not survive a crash, any properly equipped craft within range recording all received position and identification information and the last transmitted radio frequency signal from the downed aircraft would provide precise information of the location information of the crash site. With either alternative, the present invention can be used as an emergency location system that will supply more precise information than that commonly available on the ELT (Emergency Location Transmitter) system in current use.

Referring next to FIG. 2, a primary aircraft 30 is represented at the center of a sphere 36. The sphere (which is not to scale) represents the predetermined range in which the radio frequency signal broadcast from the primary aircraft 30 can be received by other aircraft also carrying the system of the present invention. Thus, the operator of a secondary aircraft 32, being within the predetermined range, will receive a collision alert if the two craft are on a collision course. Alternatively, another secondary craft 34 will not be made aware of the position of the other two aircraft until it comes within the predetermined range represented by sphere 36. A ground based monitoring receiver 38 is also represented in FIG. 2. The ground based monitoring receiver can function as an air traffic control station as the craft come within range.

Figure 3:
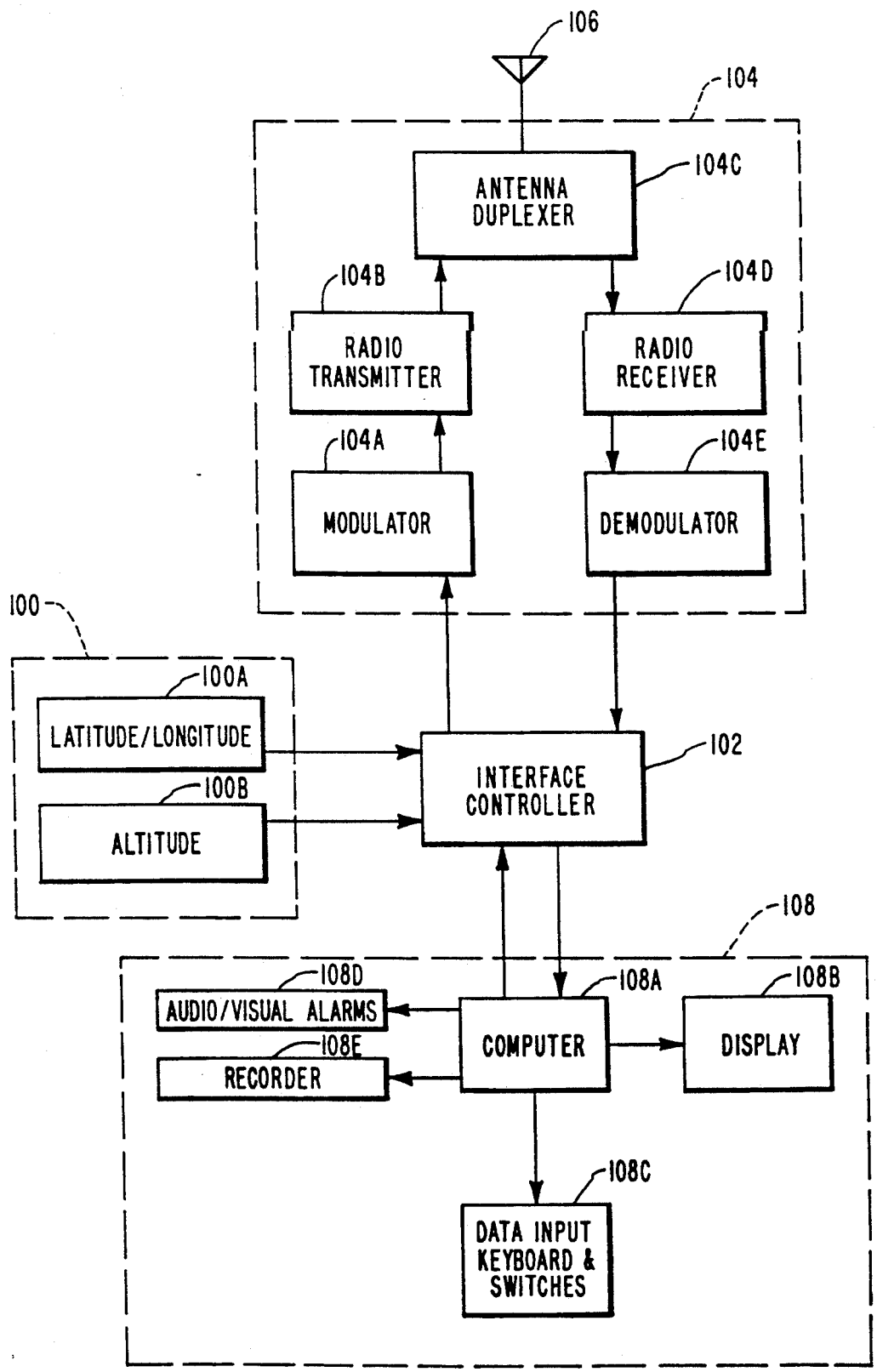
FIG. 3 is a block diagram showing the major functional components of the described embodiment.

Referring next to FIG. 3, a block diagram of the presently preferred embodiment of the present invention is provided. The high level functional blocks include: a position determining block 100; an interface controller block 102; a radio frequency block 104; an antenna 106; and a control block 108. In most of the functional blocks, additional components are represented. The components represented in FIG. 3 are generally included on board a craft or can be located at a stationary location.

Represented within the position determining block 100 are a latitude/longitude position determining device 100A and an altitude determining device 100B. It will be appreciated that many aircraft already include appropriate latitude/longitude position determining devices and an altitude determining device and thus the components represented within the position determining block 100 may not be included in all embodiments of the present invention. It is one of the advantages of the present invention that the existing equipment already provided on many aircraft can be used in conjunction with embodiments of the present invention. In the case of a water or land craft, the inclusion of only a latitude/longitude device is generally all that is necessary.

The presently preferred latitude/longitude position determining device is a LORAN-C receiver available from ARNAV, a subsidiary of Flight Dynamics, Inc., of Portland, Oreg. and referred to as Model R-50. The described LORAN receiver provides many desirable features as well as the ability to communicate with other devices via the industry standard RS-232 communication protocol.

The presently preferred altitude determining device is an altimeter available from ACK Technologies, Inc. of San Jose, Calif., Model A-30. Information concerning interfacing the indicated altimeter to other components is available from the manufacturer.

The devices included in the position determining block 100 are a preferred example of a means for determining, on board a craft, the craft's position using an existing external navigation system. The means for determining the craft's position can include, depending upon the particular application of the invention, devices for determining the craft's position in one, two, or three dimensions (or planes) of space.

The present invention includes means for encoding the position of the craft, which can also preferably encode an identification code for the craft, so such information can be carried by a radio frequency signal. The presently preferred example of a means for encoding the position and identification of the craft is the interface controller 102 represented in FIG. 3.

The identification code may be an aircraft registration number or any other number unique to the craft. While it is not essential to encode and transmit the craft identification code with the radio frequency signal, it is desirable to do so.

Still referring to FIG. 3, the interface controller 102 communicates with the devices of the position determining block 100 by way of communication ports included in the devices. The presently preferred example of the interface controller 102 is a system available from Enduratek Corporation of Salt Lake City, Utah and referred to as the Data-V-Com system. Complete information concerning the Data-V-Com system can be obtained from the publication "Mobile Data Terminal System Operations Manual" available from Enduratek Corporation and which is incorporated herein by reference.

The interface controller 102 system performs data encoding and preparation functions needed to transmit the digital information via a radio frequency signal and functions as the presently preferred example of a means for encoding the position of the craft into information which can be carried by a first radio frequency signal and a means for decoding the other craft's position from a radio frequency signal. Other devices performing similar or equivalent functions are intended to be included within the scope of the means for encoding included within the present invention. The designated interface controller 102 also functions as the presently preferred example of a means for decoding the position and identification information received from other craft. The radio frequency block 104 includes a modulator 104A, a radio transmitter 104B, an antenna duplexer 104C, a radio receiver 104D, and a demodulator 104E. The components of the radio frequency block are preferably included in a radio frequency transceiver capable of operating in the microwave band containing 1.6 Gigahertz. One presently preferred transceiver which operates in the VHF band is available from Icom, Model No. IC-A20. It will be appreciated that devices other than the designated transceiver, and frequencies other than 1.6 Gigahertz, for example any appropriate radio frequency may be used within the scope of the present invention.

Also represented in FIG. 3 is an antenna 106, which may comprise one or more individual antennas or antenna elements, and which is preferably one that will provide an omnidirectional radiation pattern. It is desirable that the radiation pattern and the reception pattern both be omnidirectional. The antenna duplexer 104C serves to isolate the radio transmitter 104B from the radio receiver 104D while allowing both to use the same antenna.

Still referring to FIG. 3, a modulator 104A functions to modulate the carrier radio frequency wave with the craft position and identification information encoded by the interface controller 102. A demodulator 104E similarly functions to extract the position and identification information from any radio frequency signal which is received and to pass the same onto the interface controller 102. The modulator 104A and demodulator 104E may be embodied in a device commonly referred to as a modem, which is available in the art.

The components represented within the radio block 104 and the antenna 106 are the presently preferred example of a means for transmitting the first radio frequency signal and a means for receiving a radio frequency signal. The interface controller 102 communicates with, and operates, the components of the radio frequency block 104 by way of connectors and cables customarily included on radio frequency transceivers as will be understood by those skilled in the pertinent art.

The interface controller 102 represented in FIG. 3 also communicates with a computer 108A which is included in the components of the control block 108. The computer 108 is preferably one which is equivalent to an IBM model PC AT. One of the many commercially available portable models (generally referred to as "Lap Tops") of the specified equivalent computer can also be used. The computer 108A and the interface controller 102 communicate with each other by way of the customary connectors and protocols (such as the RS-232 protocol) which are well known to those skilled in the art.

The programming code which is presently preferred for use with the interface controller 102 is attached hereto as Appendix A. The programming code which is presently preferred for use with the computer 108A is attached hereto as Appendix B.

Included in the control block 108 is a display 108B. The display 108B may be integral with the computer 108A or may be separate therefrom. The display is preferably used to provide a graphical representation of the position of the craft which are within the predetermined range of the monitoring craft or receiver. Thus, the operator of the craft can observe on the display the position of both his own craft (desirably in the center of the display) and the position of all other craft surrounding his craft within the predetermined range.

One preferred embodiment of the display would incorporate the use of a head-up display to display not only collision avoidance information, but to also aid in proximity reporting, navigation under IFR conditions, coordinated descent into controlled and uncontrolled airports and landing strips, and other relevant information, and to project these pertinent images in a forward view mode into the wind screen and line of the actual and preferred flight path.

It will be appreciated that some embodiments of the present invention may provide additional benefits if the display is one which not only provides high resolution in two dimensions, but one which is also suitable for displaying three dimensions, i.e., a display wherein depth can be represented by either using a three dimensional graphics mode or by decreasing intensity as a position recedes from the viewer and greater intensity as the position moves toward the viewer. Altitude information as well as indicators showing whether or not aircraft are climbing or descending can also be depicted on the display.

In the case of the present invention as applied to the aviation industry, it is desirable that the position of aircraft other than those in the same horizontal plane be displayed. Namely, the display 108B should provide position information of a plurality aircraft vertically displaced from the monitoring craft (i.e., differing altitude) as well as in the same horizontal plane (latitude and longitude). Depending upon the particular embodiment of the invention, the display 108B, or all of the components represented in radio block 108, function as a means for displaying a craft's position as defined by the present invention. Other devices and arrangements performing similar or identical functions are intended to be considered equivalent to the described structures.

Also represented in the control block 108 are input devices 108C. Input devices 108C can include a keyboard (which may be integral with the computer 108A) or other general purpose or dedicated input devices. An audio/visual alarm 108D is also represented in control block 108. The audio/visual alarm can be integral with the computer 108A or can be one of several dedicated alarm devices intended to apprise the operator of a craft of a potential collision or other situation requiring attention.

A recorder 108E is also provided in the control block 108 to make a non-volatile recording of selected data received by the computer 108A. Preferably, the recorder 108E is used to periodically log the position of all craft within the predetermined range. Thus, if a monitored craft becomes disabled and stops transmitting its radio frequency signal carrying position information, the last recorded position fix logged in the recorder 108E of any craft or observation station within the predetermined range can aid in the location of a disabled craft.

Furthermore, if a craft continues to transmit its radio frequency signal with its own position fix after becoming disabled, it will function as an emergency location device and will assist search and rescue crews in the rapid location of the disabled craft. In some embodiments of the invention, the radio frequency signal can carry, in addition to position and identification information, a distress signal as well as other messages to indicate a need for emergency assistance and even describe what type of emergency assistance is required at the disabled craft.

If desired, the components of the control block 108, the interface block 102, and the reception components of the radio frequency block 104 can be used as a monitoring receiver. For example, a monitoring receiver can be used as a ground control station to monitor the airspace surrounding an airport. In the case of small airstrips or airports in developing areas, the present invention can be adapted to provide both airborne craft and ground control personnel the information necessary to coordinate air traffic. This application of the embodiment of the invention would allow for the system's use as a standard ATC system exclusive of expensive radar installations, and at extremely low cost.

It will be appreciated that while the described embodiment is the presently best known mode for carrying out the invention, those skilled in the pertinent art will understand that other components may be used to carry out the invention. For example, the functional blocks illustrated in FIG. 3 may be combined into a few, or just one, devices housed in a single enclosure. Moreover, as the art progresses, the inventive concepts of the present invention may be embodied in devices not yet available but carrying out functions equivalent to those described in connection with the preferred embodiment. All such alternative embodiments of the invention are intended to fall within the scope of the present invention.

Provided in FIGS. 4-1 through 4-11 is a more detailed flow chart describing the steps carried out by the above-described embodiment. In these figures, the boxed letter designations indicate the interconnections between the portions of the flow chart which are divided between figures.

The flow chart provides a description of the high-level functions carried out principally by the interface controller 102 represented in FIG. 3. In the presently preferred embodiment of the present invention, the interface controller 102 is implemented by the above described Data-V-Com system. Also, as indicated earlier, the presently preferred programming code for the Data-V-Com system is included in Appendix A attached hereto.

It will be appreciated that the flow chart represented in FIGS. 4-1 through 4-11 represents just one preferred example of the programming steps that can be used to carry out the present invention and those skilled in the art will be able to devise other embodiments of the present invention using the teaching contained herein. Also, as will be appreciated after an examination of FIGS. 4-1 through 4-11, the Lap Top (a portable computer which functions as the computer 108A represented in FIG. 3) functions principally to display the data presented to it by other components and to provide input and output functions with a human user. The text contained in the dashed boxes are included to improve the clarity of the flow chart and do not represent steps in the method.

Also, as indicated earlier, the presently preferred programming code for the Lap Top is included in Appendix B attached hereto. Those skilled in the art will be able to provide embodiments of the present invention which perform functions similar or equivalent to those performed by the described embodiment, using the teachings contained herein.

The flow chart contained in FIGS. 4-1 through 4-11 is divided into several principal routines as indicated below.

Figure 5:
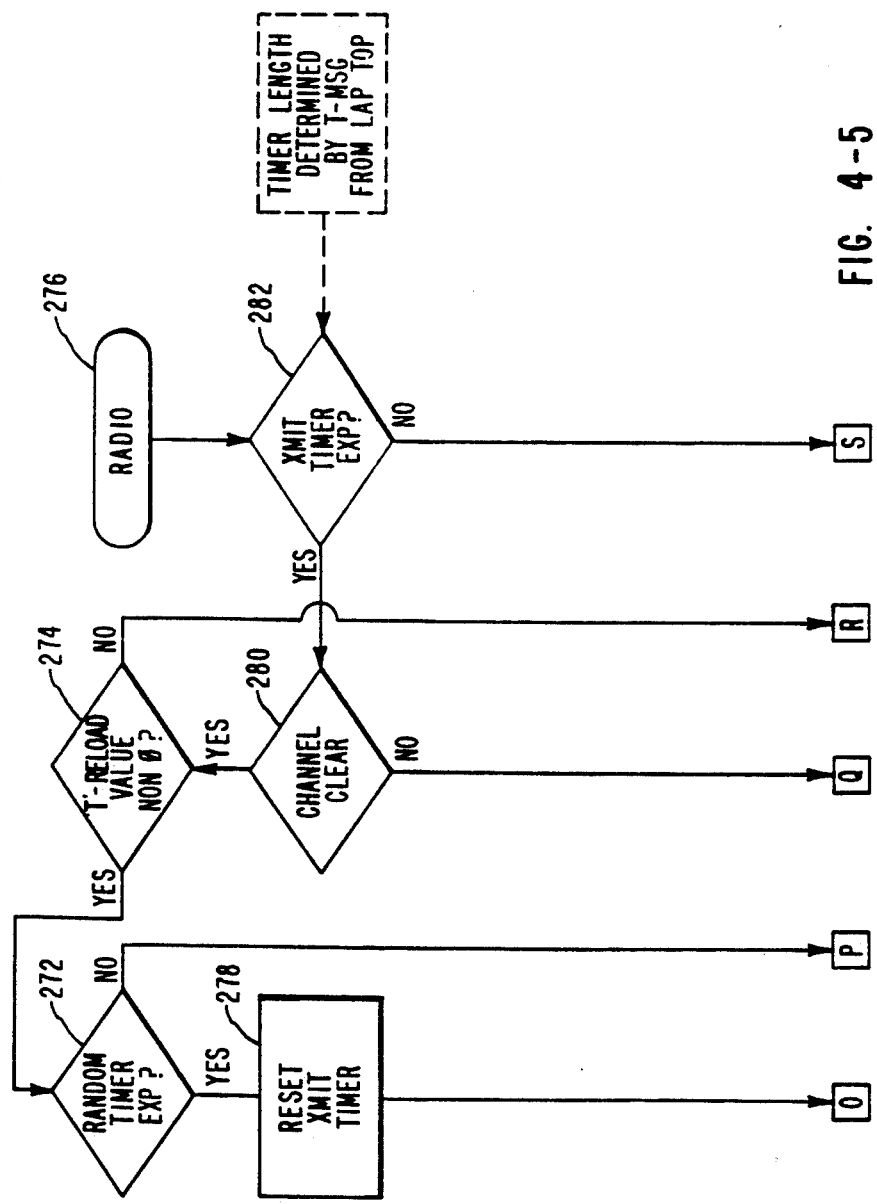
Figures 4, 5, 6:
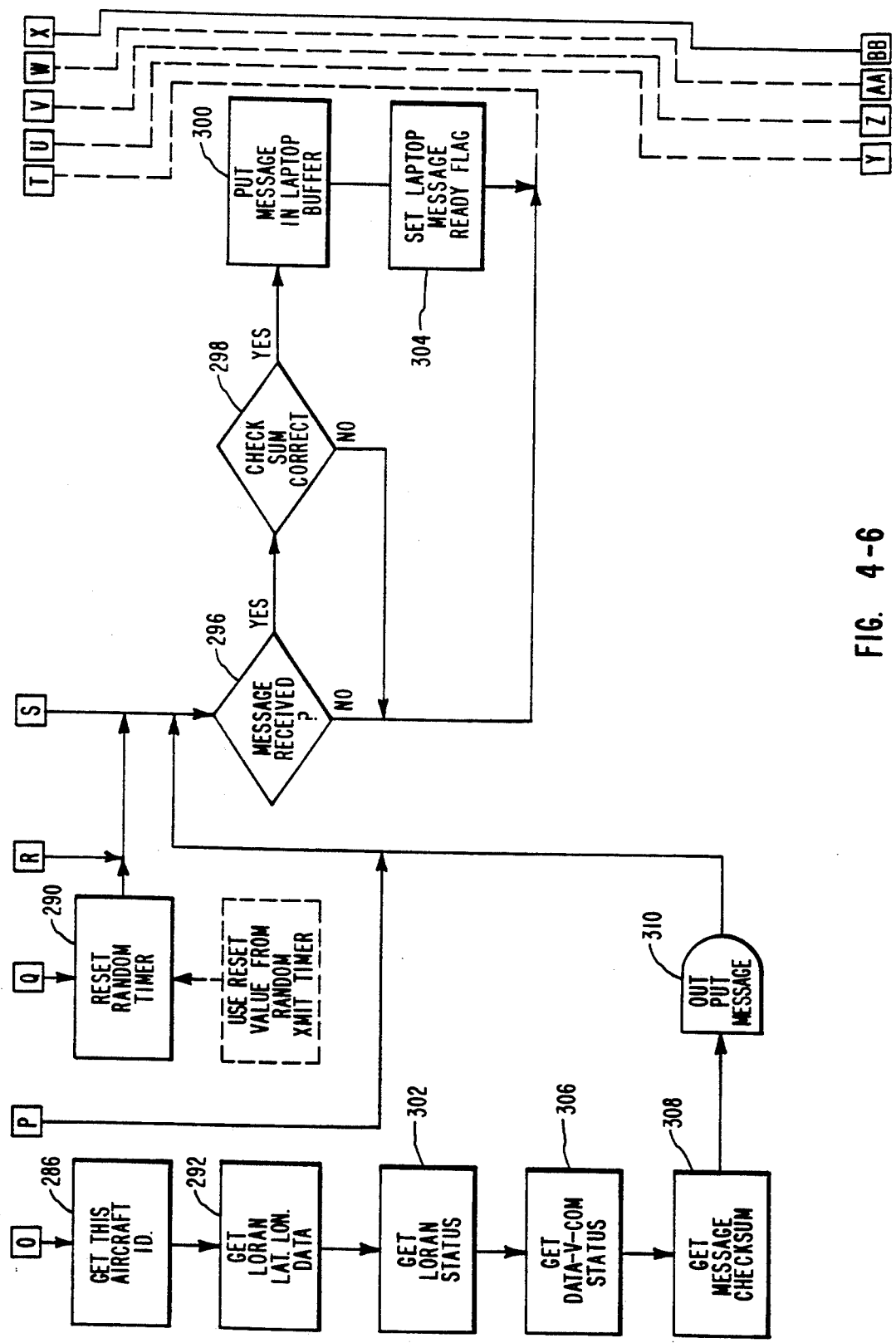
Figures 4, 5, 6, 7:
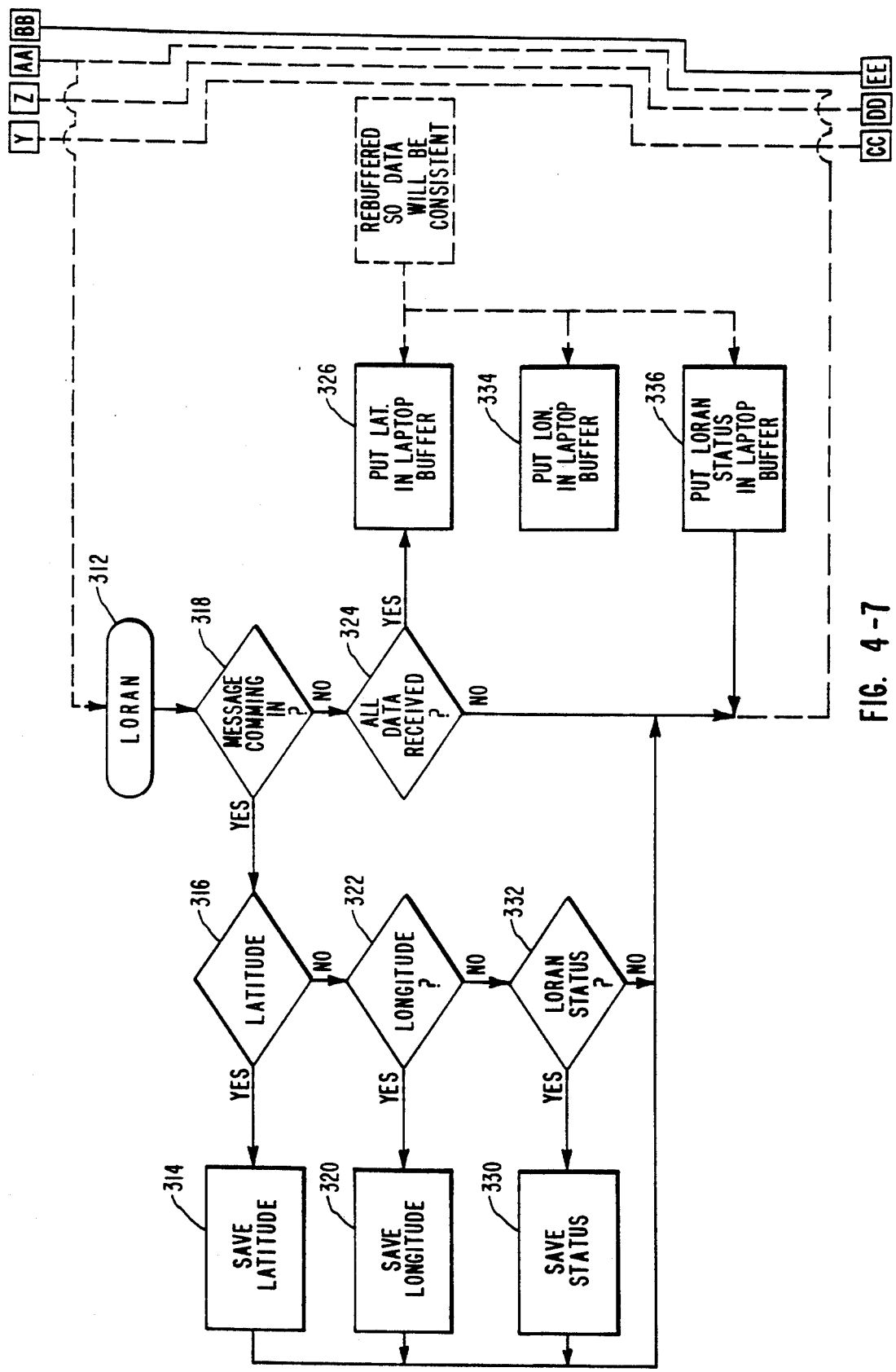
Figures 4, 5, 6, 7, 8:
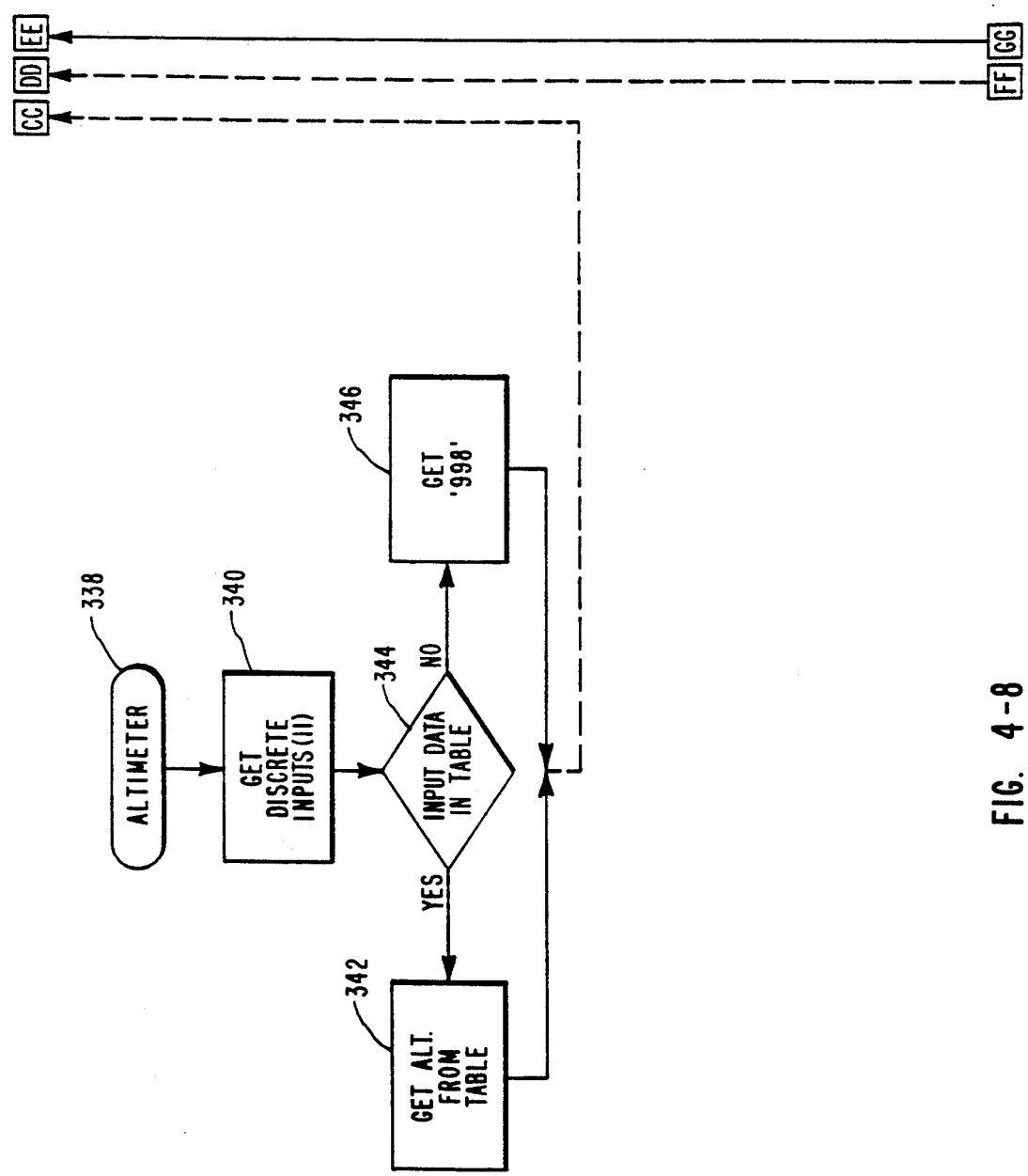
Figures 4, 5, 6, 7, 8, 9:
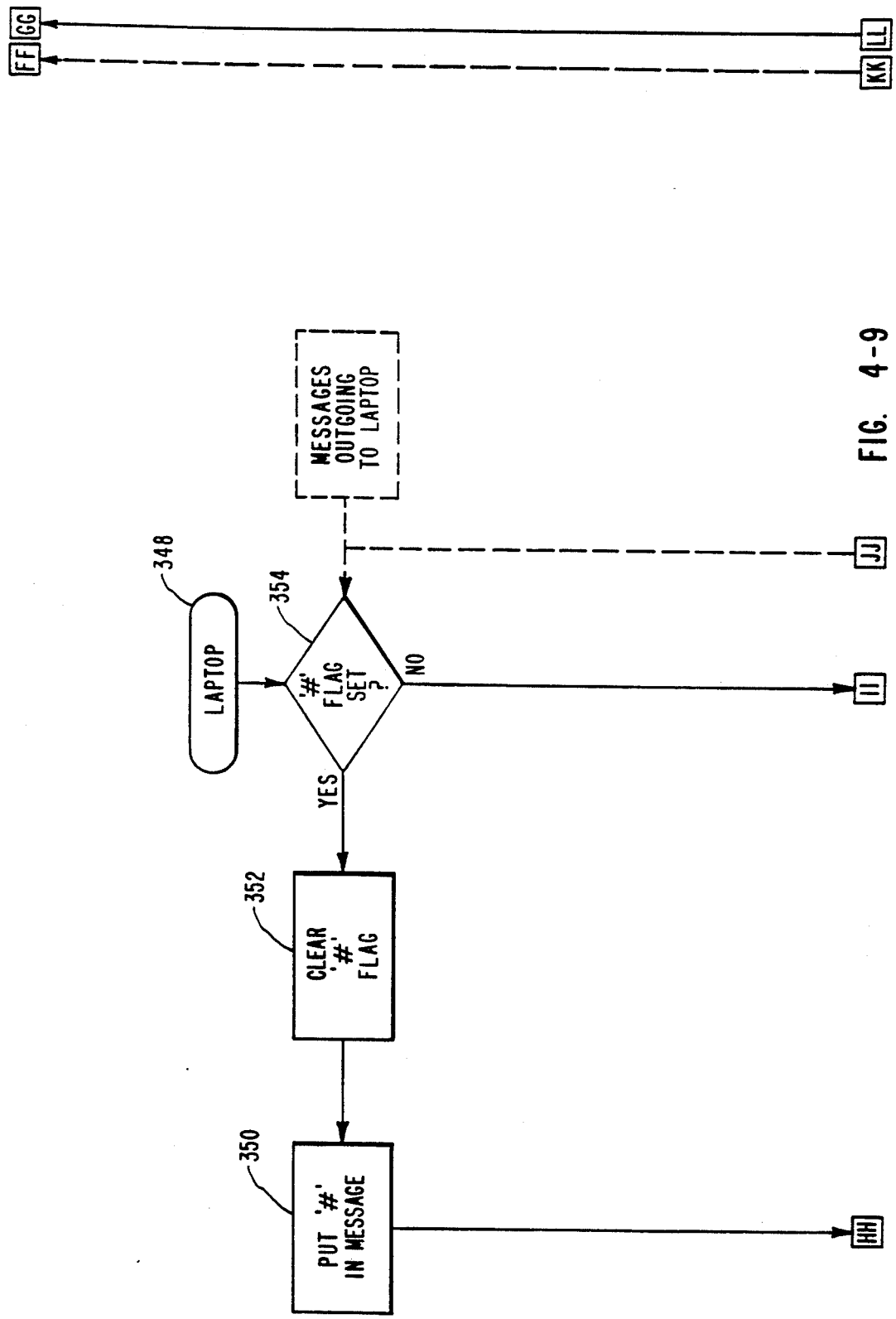
Figures 4, 5, 6, 7, 8, 9, 10:
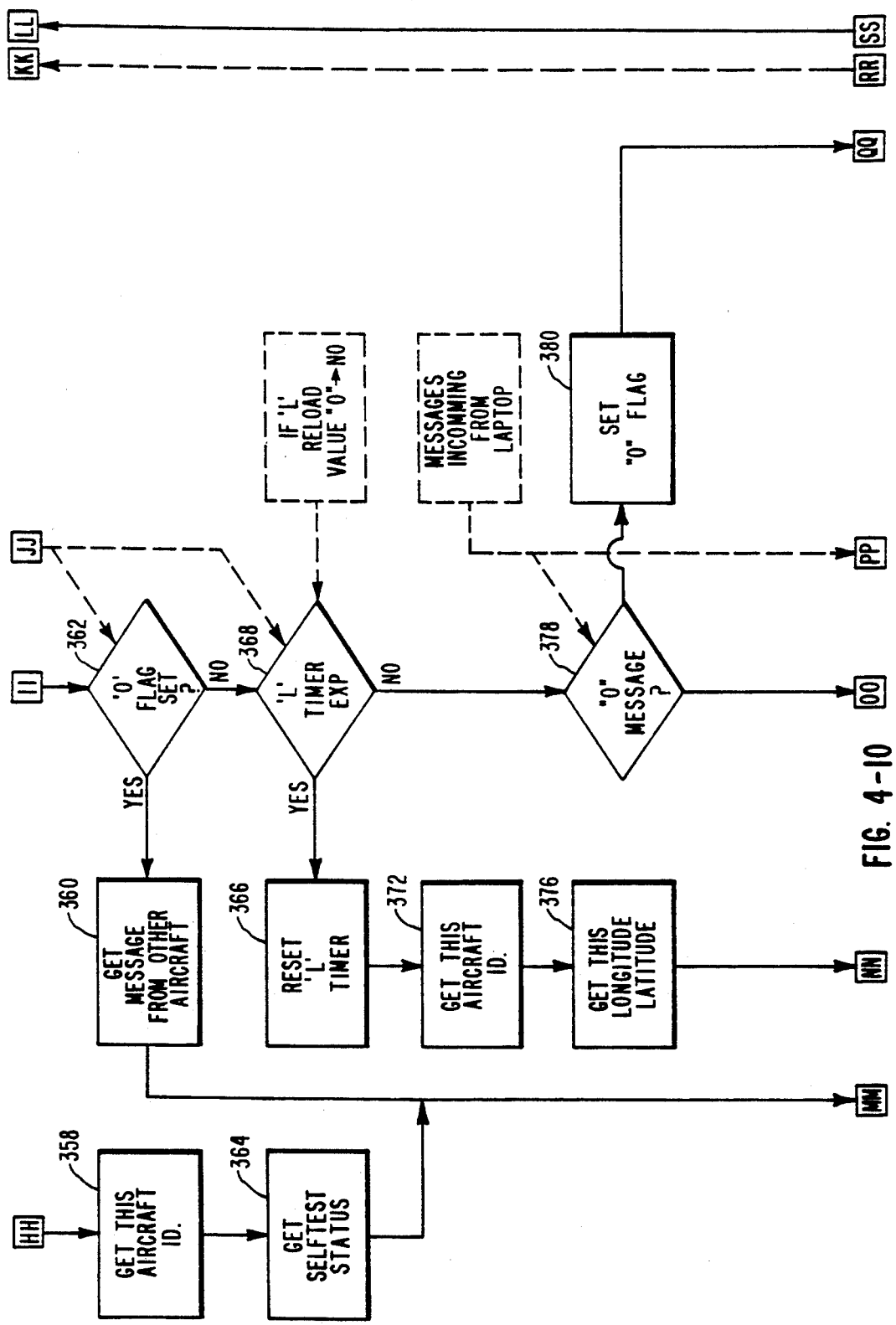
Figures 4, 5, 6, 7, 8, 9, 10, 11:
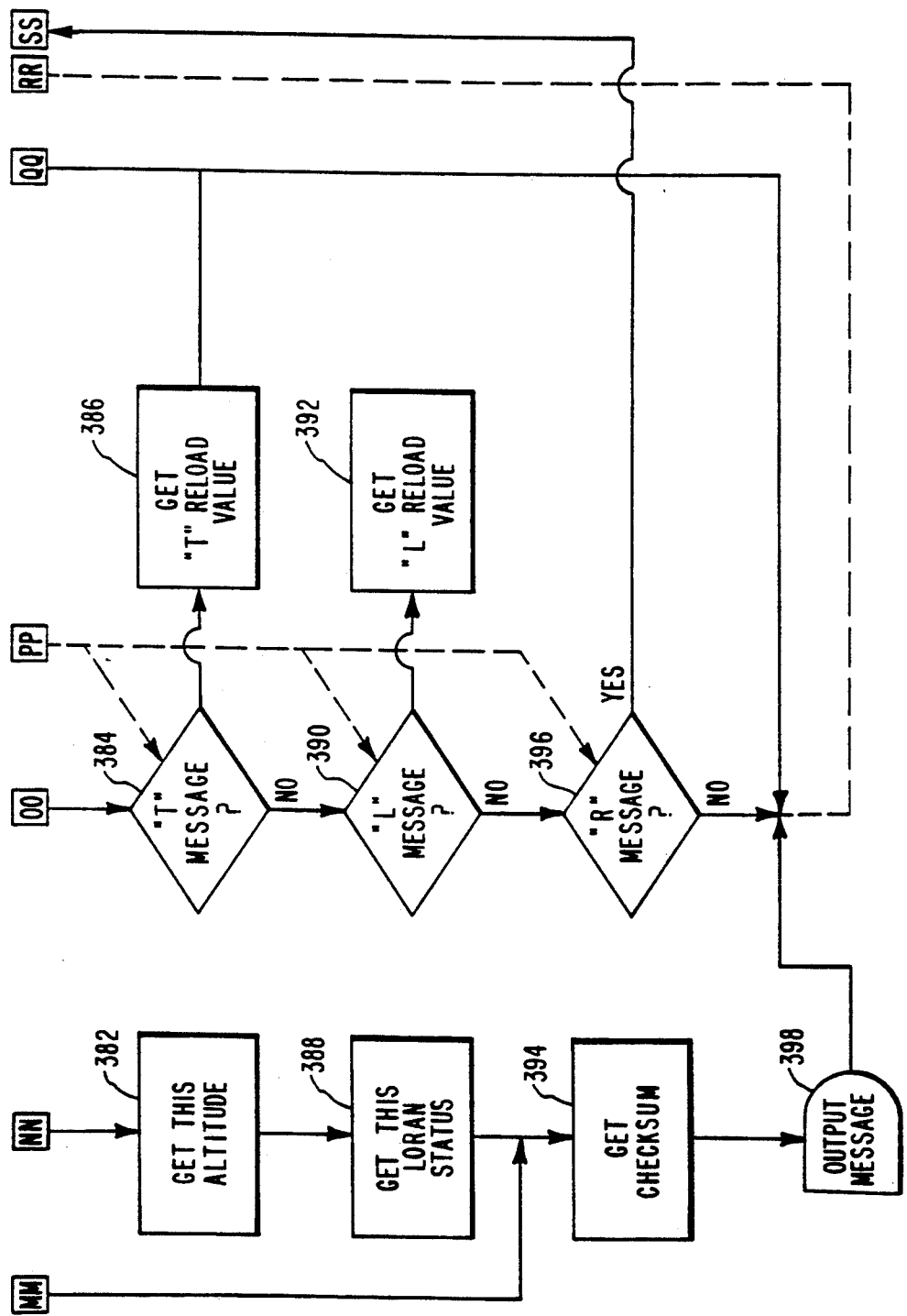

| Flow Chart Routine | FIG. NOS. |
| --- | --- |
| Initialization | FIGS. 4-1 through 4-4 |
| Radio | FIGS. 4-5 through 4-6 |
| Loran | FIG. 4-7 |
| Altimeter | FIG. 4-8 |
| Lap Top | FIGS. 4-9 through 4-11 |

Further information concerning each of the routines indicated above is provided in the Glossaries set forth below.

| Ref. No. | Label | Description |
| --- | --- | --- |
| | A. Initialization Routine Glossary | |
| 200 | START | This is the beginning of the program. When the micro-processor is reset via hardware or software it is vectored to this point. At START, the Stack Pointers, Interrupt disabling and various other Housekeeping chores are performed. |
| 202 | SELFTEST | This is the beginning of the Selftest Module. At this point the Diagnostic Terminal will display that Selftest has started. Also at this point Selftest Interrupts will be set up and enabled. |
| 206 | RAM TEST PASS | The RAM (Random Access Memory) test is run. The RAM test writes data found in a ROM table to each RAM address. If the same data that was written is read back, the program continues through the table until the data 00H is written. This signifies the end of the test and leaves all RAM cleared and ready for use. If the test fails at any point the data read, data written and the address are saved and reported back to the Diagnostic Terminal. The RAM should be replaced at the address reported if failure occurs. |
| 208 | SET RAM | The Selftest Status is sent to the Lap |

-continued

| Ref. No. | Label | Description |
|---|---|---|
| | TEST FAIL BIT | Top and to other Aircraft via the Radio. If this bit is set it means that the RAM Test Failed and all data is unreliable. |
| 210 | ROM TEST PASS | All Used ROM (Read Only Memory) is added and the sum must equal zero. The Check Sum Adjust Byte at 3FFFH ensures that the sum (without carry) is zero. If the sum is not zero the test fails and ROM should be replaced. The test failure status and the erroneous check sum are reported to the Diagnostic Terminal. |
| 212 | SET ROM TEST FAIL BIT | The Selftest Status is sent to the Lap Top and to other Aircraft via the Radio. If this bit is set it means that the ROM Test Failed and all data is unreliable. |
| 214 | LAP TOP INTER. PASS | The USART (Universal Synchronous Asynchronous Receive Transmit) 8051 is Software reset and the MIF (Mode Instruction Format) set up. Status is then checked and verified. |
| 216 | SET LAP TOP INTERFACE FAIL BIT | The Selftest Status is sent to the Lap Top and to other Aircraft via the Radio. If this bit is set it means that the Lap Top Communication could be unreliable. |
| 218 | I/O TEST PASS | The PIA (Peripheral Interface Adapter) 8155 is initialized for the proper mode, which ports are Inputs and which are outputs and the Baud rate Clock set up. Outputs are initialized. Status is then checked and verified. |
| 220 | SET INPUT/ OUTPUT FAIL BIT | The Selftest Status is sent to the Lap Top and to other Aircraft via the Radio. If this bit is set it means that the PIA is unreliable. The PIA interfaces mainly with the Altimeter. |
| 222 | RADIO INTER PASS | The USART (Universal Synchronous Asynchronous Receive Transmit) 8051 is Software reset and the MIF (Mode Instruction Format) set up. Status is then checked and verified. |
| 224 | SET RADIO INTERFACE FAIL BIT | The Selftest Status is sent to the Lap Top and to other Aircraft via the Radio. If this bit is set it means that the Radio Communication could be unreliable. |
| 226 | ADD AIRCRAFT ID | Each System has its own Aircraft Identification Via the Diagnostic Terminal the Aircraft Identification is put in NonVolatile Memory or EEPROM. (Electrically Erasable Read Only Memory). This Identification number will not be lost if the system is reset or powered down. When Selftest is run the system can sense that the Terminal is attached and allaow the user the option of changing the Aircraft Identification This block asks the question, Do You Want to Enter Aircraft Identification? |
| 228 | GET AIRCRAFT ID | This block Prompts the Terminal, for the Identification, Error Checks it and buffers it. |
| 230 | ENTER AIRCRAFT ID | This block enters the buffered aircraft Identification into EEPROM. |
| 232 | PUT IN RANDOM XMIT TIMER | Because the preferred embodiment of the present invention is polite (will not transmit when another signal is already present on the frequency). To eliminate various systems transmitting simultaneously, each system will have different wait times before transmitting after a frequency has cleared. This random wait time is determined by the system Aircraft Identification in the preferred embodiment. |
| 234 | TOGGLE PRINTER STAT. | Changes the printer status. |
| 236 | CHG PRINTER STAT | To enable someone to monitor the entire system there is a port for a printer or some other type of monitor. At this time the Diagnostic Terminal can be used for changing the Status of the Printer or Monitor. The Status is kept in NonVolatile ROM or EEPROM so that if the System is powered down or reset that status will not change. |
| 240 | INITIA- LIZE POINTERS TIMERS ETC. | Pointers such as the Input and Output Pointers for the Rotating buffers used for the Lap Top Interface are set up at this time. |
| 242 | SET ALTIMETER DATA TO 9's | At this point in the Program it is not known if the Altimeter is functional or not, especially since the Altimeter does not function for several minutes after it is powered up. So that any data present is not mistaken for good Altimeter Data all 9's are inserted in the Altimeter use area. |
| 244 | SET LORAN DATA TO 9's | At this point in the Program it is not known if the Loran Receiver is functional or not, especially since the Loran Receiver must be initialized manually to send the proper information at the proper baud rate, transmit rate, and so forth. To ensure that any random data already present is not mistaken for good data, all 9's are inserted in the Loran Longitude and Latitude buffers. |
| 246 | SET # MESSAGE FLAG | The # message flag is set so that when the system is fully initialized and functional, the # message will be sent to the Lap Top Computer. |
| 250 | EXECLP | This is the exit point for initialization that has been performed heretofore and the loop point for the rest of the program. When the rest of the program has completed it will come back to this point and begin again at this point. |
| 252 | CALL RADIO | The Radio Module (See step 276, FIG. 4-5) is interfaced at this point. |
| 256 | CALL LORAN | The Loran Module (See step 312, FIG. 4-7) is interfaced at this point. |
| 260 | CALL LAP TOP | The Lap Top Computer Module (See step 348, FIG. 4-9) is interfaced at this point. |
| 264 | RESET WATCH DOG | See step 266. |
| 266 | TRANSMIT- TING | If the system is transmitting the watch dog timer is not reset. This helps to ensure that the system does not transmit for too long a period. If the watch dog is not reset every 1.1 seconds the system is reset, the Program Counter goes to 0000H or the Start. |
| 268 | CALL ALTIMETER | The Altimeter Module is interfaced at this point. |

B. Radio Routine Glossary.

| Ref. No. | Label | Description |
|---|---|---|
| 272 | RANDOM TIMER EXP | After the frequency has been busy this timer must expire before transmitting. (See step 232 (FIG. 4-2) and 278 (FIG. 4-5). |
| 274 | 'T' RELOAD VALUE NON 0? | |
| 276 | RADIO | This is the entrance to the RADIO module. This module handles all the communication to/from the Radio. All communication to other aircraft is via |

-continued

| Ref. No. | Label | Description |
|---|---|---|
| 278 | RESET XMIT TIMER | the Radio. The value used to reset the XMIT timer is the value obtained from the 'T' message from the Lap Top Computer. (See steps 274 (FIG. 4-5), 350 (FIG. 4-9) & 376 (FIG. 4-10). |
| 280 | CHANNEL CLEAR | Because the system is polite (See step 232 (FIG. 4-2)). It will not transmit unless the channel is clear. The Carrier Active Sense (CAS) is checked at this point to see if the frequency is clear or not. |
| 282 | XMIT TIMER EXP | The location message for this aircraft must be transmitted to the other aircraft at a rate determined via a 'T' message from the Lap Top Computer. If the 'T' message time is 0 then (which is what is is upon initialization) then the message is not transmitted at all. |
| 286 | GET THIS AIRCRAFT ID | The Aircraft Identification is read from EEPROM and stored in the Radio Transmit buffer. (See steps 230, 228 (FIG. 4-2), & 226). |
| 290 | RESET RANDOM TIMER | The Random timer must be reset with the value determined from the Aircraft Identification (See steps 232 (FIG. 4-2), 280 & 372 (FIG. 4-5). |
| 292 | GET LORAN LAT. LON. DATA | The most recent data from the Loran Receiver is placed in the Transmit buffer. (See steps 292 (FIG. 4-6). 314 & 320 (FIG. 4-7)). |
| 296 | MESSAGE RECEIVED? | By examining the input buffer it can be determined if a message has been received. |
| 298 | CHECK SUM CORRECT | Each byte of the message is added w/carry and it is determined if the message is error free or not. |
| 300 | PUT MESSAGE IN LAP TOP BUFFER | The message received above is rebuffered into the large rotating Lap Top Computer Buffer for transmittal to the Lap Top Computer. |
| 302 | GET LORAN STATUS | This byte indicates the Loran Status. (See step 330 (FIG. 4-7)). The Loran Receiver transmits in addition to the Latitude and Longitude the Status of the Receiver. |
| 304 | SET LAPTOP MESSAGE READY FLAG | This flag tells the Lap Top Module that a message is ready to go to the Lap Top Computer. |
| 306 | GET DATA V - COM STATUS | The Data-V-Com Status includes not only the Selftest status, (See steps 208, 212, 216, 220 & 224 (FIGS. 4-1 & 4-2)) but also status as to how current the Loran Information is. |
| 308 | GET MESSAGE CHECKSUM | After concluding with step 306 (FIG. 4-6) the message is formatted and the Check sum is calculated by adding up each byte (w/carry). |
| 310 | OUTPUT MESSAGE | The message formatted above is output (AFSK) via the USART. An attack delay (a period of no data to enable the transmitter to stabilize) as well as a time delay at the end is necessary. |

C. Loran Routine Glossary.

| Ref. No. | Label | Description |
|---|---|---|
| 312 | LORAN | This is the Entrance Point for the Loran Module. This module handles the interface with the Loran receiver. Besides receiving the Latitude and Longitude it also saves the Loran Status and keeps track of if an update occurs between Message transmissions to other aircraft and to the Lap Top. |
| 314 | SAVE LATITUDE | The Latitude less the spaces is saved. (See step 318 (FIG. 4-7)). A flag is set so that it can be determined that data was received for Lat. and Lon. so that when processed will be data that is compatible. |
| 316 | LATITUDE | Checks for LAT (See step 318 (FIG. 4-7)) in message coming in from Loran Receiver. |
| 318 | MESSAGE COMING IN? | The entire message from the Loran Receiver is not saved. If a message is coming in the program looks for LAT for Latitude and LON for longitude and SD for Loran Status. If these labels are found the data less the spaces is saved. |
| 320 | SAVE STATUS | The Loran Status is saved for transmission to other Aircraft, as well as the Lap Top Computer. This makes it possible to know the accuracy of the Loran as well as other pertinent information. (See steps 388 (FIG. 4-11) & 302 (FIG. 4-6)). |
| 322 | LONGITUDE ? | Checks for LON (See step 318 (FIG. 4-7)) in message coming in from Loran Receiver. |
| 324 | ALL DATA RECEIVED? | See step 318. |
| 326 | PUT LAT. IN LAPTOP BUFFER | The message received above is rebuffered into the large rotating Lap Top Computer Buffer for transmittal to the Lap Top Computer. |
| 330 | SAVE STATUS | See step 320. |
| 332 | LORAN STATUS? | A flag is set for each of the 11 different types of status if that particular status is read from the Loran Receiver. |
| 334 | PUT LON. IN LAPTOP BUFFER | See step 326. |
| 336 | PUT LORAN STATUS IN LAPTOP BUFFER | See step 332. |

D. Altimeter Routine Glossary.

| Ref. No. | Label | Description |
|---|---|---|
| 338 | ALTIMETER | This is the Entrance point to the Altimeter handler. It reads the 11 Discrete inputs and decodes the data to an ASCII altitude. If the altitude is bad a 998 is output. |
| 340 | GET DISCRETE INPUTS (11) | Reads the 11 Discrete inputs from the Altimeter. If some are not used the program is modified so that they are assumed to be most significant and low. |
| 342 | GET ALT. FROM TABLE | The data is deemed good and saved for messages to the Lap Top and to other Aircraft. |
| 344 | INPUT DATA IN TABLE | A look up table is used to decode the 11 inputs to a three digit altitude reflecting 100's of feet. If the table reflects 998 then the data is deemed to be bad and is rejected. |
| 346 | GET '998' | The data in the table was bad, so instead of unreadable data a '998' is used to reflect the error. |

E. Laptop Routine Glossary.

| Ref. No. | Label | Description |
|---|---|---|
| 348 | LAPTOP | This is the input to the module. This module handles all communication to/from the Lap Top Computer. |
| 350 | PUT '#' IN MESSAGE | Put the '#' in the output buffer for this particular message to the Laptop. |
| 352 | CLEAR '#' FLAG | See step 354 (FIG. 4-9). |
| 354 | '#' FLAG SET? | This flag indicates that a # Message must be sent to the Lap Top Computer. This flag is set only during Initialization. (See step 246 (FIG. 4-3)). |
| 358 | GET THIS AIRCRAFT | The Aircraft Identification in Nonvolatile memory (EEPROM), is put |

-continued

| Ref. No. | Label | Description |
|---|---|---|
| | ID | in the transmit buffer to go to the Lap Top Computer. (See step 228 (FIG. 4-2)). |
| 360 | GET MESSAGE FROM OTHER AIRCRAFT | The message that was received from another aircraft via. the RADIO module is rebuffered and sent to the Lap Top Computer. |
| 362 | 'O' FLAG SET? | The 'O' determines if messages from other Aircraft are accepted or not. If the Flag is set, which must occur when a 'O' message is received from the Lap Top Computer, (See step 378 (FIG. 4-10)) then other aircraft messages are accepted. |
| 364 | GET SELFTEST STATUS | The Selftest Status (See steps 208, 212, 216, 220 (FIG. 4-1) & 224 (FIG. 4-2)) is put in the buffer to be transmitted to the Lap Top Computer. |
| 366 | RESET 'L' TIMER | The time value received from the Lap Top Computer, (See step 390 (FIG. 4-11)) is used to reset this timer. |
| 368 | 'L' TIMER EXP | The 'L' timer determines how often the Location message for this aircraft is sent to the Lap Top Computer. If the value is set at 0, which occurs on initialization, it is not sent at all. The value that the 'L' timer is set to is determined by the 'L' message received from the Lap Top Computer. (See step 390 (FIG. 4-11)). |
| 372 | GET THIS AIRCRAFT ID | The Aircraft Identification in Nonvolatile memory (EEPROM), is put in the transmit buffer to go to the Lap Top Computer. (See step 228 (FIG. 4-2)). |
| 376 | GET THIS LONGITUDE LATITUDE | This information is obtained from the Loran module. (See steps 314 & 320 (FIG. 4-7)) and is put in the transmit buffer to go to the Lap Top Computer. |
| 378 | "O" MESSAGE? | Is the incoming message from the Lap Top Computer an 'O' message? If so the 'O' flag is set. (See step 362 (FIG. 4-10)). |
| 380 | SET "O" FLAG | See step 378 (FIG. 4-10). |
| 382 | GET THIS ALTITUDE | This information is obtained from the Altitude module. (See step 342 (FIG. 4-8)) and is put in the transmit buffer to go to the Lap Top Computer. |
| 384 | "T" MESSAGE? | Is the incoming message from the Lap Top Computer a 'T' message? (See steps 274 & 282 (FIG. 4-5)). If so the 'T' Reload value is saved. This value determines how often the Radio Transmits the Location of the Aircraft to other Aircraft. |
| 386 | GET "T" RELOAD VALUE | See step 384 (FIG. 4-11). This value is used at step 372 (FIG. 4-5). |
| 388 | GET THIS LORAN STATUS | This information is obtained from the Loran module. (See step 330 (FIG. 4-7)) and is put in the transmit buffer to go to the Lap Top Computer. |
| 390 | "L" MESSAGE? | Is the incoming message from the Lap Top Computer and 'L' message? (See steps 368 (FIG. 4-10) & 392 (FIG. 4-11)). If so the 'L' Reload value is saved for use at step 366 (FIG. 4-10). |
| 392 | GET "L" RELOAD VALUE | See step 390 (FIG. 4-11). This value is used at step 366 (FIG. 4-10). |
| 394 | GET CHECKSUM | After concluding with step 388 (FIG. 4-11) the message is formatted and the Check sum is calculated by adding up each byte (w/carry). |
| 396 | "R" MESSAGE? | Is the incoming message from the Lap Top Computer an 'R' message? If so the program is vectored through software to the start address. (See step 276 (FIG. 4-5)). |
| 398 | OUTPUT MESSAGE | The message formatted above is output via the USART to the Lap Top Computer. |

3. Summary

In view of the foregoing, it will be appreciated that the present invention provides a system and method for announcing the position of a craft to a remote receiver such that the position of the craft can be continuously monitored and collisions with other craft avoided. The present invention also provides a system and method for collision avoidance which may be used in addition to, and without interference with, preexisting collision avoidance systems.

It will be further appreciated that the present invention also provides an emergency location system for distressed or disabled craft and a collision avoidance system which can be economically implemented in the general aviation industry. Still further, the present invention provides a system and method which allows the operator of a first craft to monitor the position of a plurality of other craft within a predetermined range of the first craft and to be alerted of a potential collision as early as possible.

The present invention also provides a system and method of monitoring craft proximity spacing, a critical function, while operating within the flight sector system in high density areas and while transitting or making approaches in VFR and IFR controlled airspace. Further, the system and method provide a similar function in the marine environment, particularly under adverse weather conditions and high density mooring or docking maneuvers.

Even further, after consideration of the foregoing, it will be understood that the present invention provides a system and method for announcing the position of any craft to other craft which are within a predetermined range which is reliable and which does not distract an operator of a craft from other duties unless operator attention is necessary. Moreover, the operator of a first craft is allowed to continually monitor the positions of a plurality of other craft within a predetermined range. Even further, the present invention provides a system and method of tracking the position of one or more craft within a predetermined range of a location anywhere on the earth such as at a remote airstrip or allows the position of each of a plurality of craft belonging to a fleet to be tracked. Still further, the present invention provides a collision avoidance system which does not become saturated in areas of dense traffic and which readily makes a permanent record of the movement of any craft within a predetermined range of a monitoring receiver.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

United States Patent Application of

Edward J. Fraughton and

Philip H. Berger for

A UNIVERSAL DYNAMIC NAVIGATION,
SURVEILLANCE, EMERGENCY LOCATION, AND
COLLISION AVOIDANCE SYSTEM AND METHOD

APPENDIX A
PROGRAMMING CODE

Copyright 1990 ENDURATEK CORPORATION

ORGANIZATION OF FIRMWARE FOR ACAS DATA-V-COM  16 Jan 90

Some of the descriptions in this document are operational and others are only organizational. The operational and other more important descriptions are highlighted in bold.

The following is a module by module description for the ACAS firmware for the Data-V-Com. Also included are all global buffers and flags for each module and how each will interface. Rotating buffers are used only where so stated (for output functions only). Where rotating buffers are used if, the input and output pointers are made equal while outputting the interrupts are disabled. The Global Flags and Buffers, RDTLTB/F, LRTLTB/F, LTTDVB/F and LRTRDB/F will function in the following manner. The module sending the message will set the flag, all 8 bits to 1's, and fill the buffer. Two modules will receive each message, one of which is the Printer module. The printer module will clear the LSB and the other module will clear the MSB when it receives the message. The module transmitting the message will wait till only the MSB is cleared before it will send another message. The LSB is only to tell the Printer module that it has received the message. The buffers and flags are described in the Section PRNHAN.SRC.

INITAL.SRC   This module is the Initialization module. This module will be vectored to on power up. It will initialize stack pointers, set interrupt vectors etc. and then call the selftest module SLFTST.SRC. When selftest has completed, this module will enable interrupts, set interrupt priorities etc. The names for the initialization routines for each of the following modules that needs one will be the same as the first three letters with a INL at the end, such as ITIINL. Selftest will call some of the initialization routines, this module will call the others. This module will also house the interrupt vectors for the modules requiring interrupts. The final act of this module will be to jump to the Executive loop EXECLP.SRC.

SLFTST.SRC   Selftest will be called by the Initialization Routine. It is the only other routine other than the Executive Loop that will be allowed to reset the Watchdog timer. Selftest is the only other module other than the Executive and Initialization that will be allowed to call other modules. The following selftests will be performed:

1.   EPROM Check Sum Test. All EPROM must add up to a predetermined value or this test will fail.

2. RAM Checkerboard Test. Patterns of all 1's, all 0's and alternating 1's and 0's will be written to each RAM address. After all addresses have been written with the pattern, each is read. If the correct data is not read this test will fail.
   3.   Peripheral Interface Adapter Test. Status Check only, there are at present no provisions for a wraparound self test.

4. USART Test. Status Check only on all used USARTS, there are at present no provisions for a wraparound self test.

This module will sense if a terminal is attached. If a terminal is attached it will give the operator the option of bypassing or rerunning the test that failed. Each time a test fails, failure data, such as the address and bit pattern for the failure will be displayed on the terminal. When a terminal is attached it will also handle operator input for the following functions:

1. See if Operator wants to exit Selftest and continue with no changes.

2.    See if the Operator wants to change the Primary Aircraft Id.

3.   See if Operator wants to change the transmission delay time. (TRNTIM see the Radio module for details) This should be slightly different for each aircraft.

4. If the Diagnostic function is enabled at assembly time the operator, can also turn on this function. (See below) If this function is turned on it will be turned off the next time the system is reset either by the Lap Top Computer or a power reset.

5. If the Printer function is enabled at assembly time the operator can also toggle this function off or on. This toggle will be in nonvolatile EEPROM so that resetting does not change it.

EXECLP.SRC  This is the Executive module and will call all the other modules except as noted above. After Selftest and Initialization are complete, this is the only module that will be allowed to call other modules, except of course for INITAL.SRC.

A second function of the Executive module is to declare global all Buffers, Flags etc. that are used by more than one module. Also any parameters that may need to be changed, such as memory limits etc. will be in the Executive. This does not include timers used only in one module. They will be declared global in the timer module and used in one other module.

Although the code for the Executive is minimal it will be most likely be the largest module.

Because this module is only a loop for calling the other modules, it will reset the watch dog timer, but only after calling all the other modules. If the radio module is transmitting (MESINP flag), or if the computer module has received a reset message (NWDRST flag), the watchdog will not be reset.

ITIMER.SRC  The timer routine after initialization will be interrupt driven. This module will be in two parts as shown:

A. ITIINT  Label called by interrupt from the Initialization module.

B. ITIINL  Initialization part of module called from the Initialization module.

The user will set the timer location with a value and then the timer module will decrement it until it is zero. It will be the function of the user module to monitor the timer to see when it expires. There will be three groups of timers, those that are decremented every 1/4 sec., 1 sec. and every minute.

The rest of the modules will only be called from the Executive Loop.

PRNHAN.SRC  This module can be enabled or disabled at assembly time. There will be a flag that can be set or cleared when the system is assembled and linked that will enable or disable this module. If disabled the USART will be turned off and the module will be disabled. Also to activate this module it will be necessary to set a non-volatile EEPROM location to an ASCII P. This can be performed during Selftest but only when a Diagnostic Terminal is attached. See Selftest for toggling this function. The parts of this module are as follows:

A. PRNHAN  Called by the Executive from the main loop. This module will monitor communication between the Data-V-Com and the radio, between the Data-V-Com and the Lap Top Computer as well as between the Loran Receiver and the Data-V-Com. This will check flags to see if a message needs to go out to the printer/terminal that it handles. This function will be rebuffered to the rotating buffer and add the characters for where the message is from/to as shown below.

B. PRNITL  This is the initialization for this module called by Selftest.

C.  PRNINT  This is the interrupt driver for this module for outputting data to the printer/terminal. The transmit function will have a 500 character rotating buffer. If the Buffer should become full it will not inhibit the transmission of information, but will print out Printer Buffer Full, clear just this buffer and then start over.

Each message will be on a single line with. At the end of the line there will be a space then the following to designate where the message is going or where it came from. Also included here are the message global buffers and flags. When this module reads the following Buffer it will clear the LSB (Least Sig. Byte) of the following flags:

|  | Buffer | Flag | Printer Designation |
|---|---|---|---|
| From Radio to Lap Top Computer | RDTLTB | RDTLTF | RDTLT |
| From Loran Receiver to Lap Top Computer, (includes # msg) | LRTLTB | LRTLTF | LRTLT |
| From Lap Top Computer to Data-V-Com | LTTDVB | LTTDVF | LTTDV |
| From Loran Receiver to Radio | LRTRDB | LRTRDF | LRTRD |

This module will be the last one that is written except for the Diagnostic module (DIAGNT.SRC) and any or all of the above may be left out if time is short.

DIAGNT.SRC  This module is also for trouble shooting as is PRNHAN.SRC above. This module will not need initialization and will have no interrupt vectors. The handle used by the Executive to call this module will be DIAGNT. The terminal used will be the Selftest Terminal when attached. If not attached this function will be disabled. While the system is up and running this module will make it possible to do the following:

A.  Read/Write Memory.
  B.  Read Code.

A volatile memory location in RAM must have an ASCII D for this module to function. It can also be inhibited during assembly and linking. This module when activated will seriously impede the processor since the software programmed serial interface must disable all interrupts when functioning. No interrupt handlers are needed for this module. This module will be the last one written and will be left out if time is short.

LAPHAN.SRC  This module is the Lap Top Computer Handler (Computer Module). This module is divided up as shown:

A.  LAPHAN  This is the main part of the module that will be called from the Executive Loop. On power up it will send the # message which includes the aircraft id in EEPROM and the Selftest Information (00 All passed) to the Lap Top Computer. The interface to the rest of the modules will be with the Global Buffers and Flags defined above for the printer module.

B.  LAPRIN  This is the receive interrupt handler. After the first character is received, the rest of the message. which is terminated with a Carriage Return, will have 1 second to be received, before it is aborted and the pointer reset to the beginning of the buffer. It is not anticipated that the Lap Top Computer will send messages closer than 1 second apart, because it must receive a response, before it sends the next message. If a Reset message is received it will set the NWDRST flag, which will cause the system to be reset. (See the Executive section) If a 'T' message is received the next two digits will be converted to HEX and stored in the buffer VTMCNT. This will be the number of times that the Loran Receiver will send information before the info will be sent to the Radio and the Lap Top Computer. The only other module that will need to read the messages coming in, is the printer module.

C. LAPTIN This is the transmit interrupt handler. Messages going to the Lap Top Computer will be put in a 500 character rotating buffer, This means that approximately 20 messages could be buffered up from the Radio and Loran Modules. Each time called this module will monitor the appropriate flags. If a flag is set it will transfer the appropriate message to the rotating buffer.

D. LAPINL This is the initialization routine for the module. It will set the RSTMSG flag that will cause LAPHAN to send the # or reset message when called.

RADHAN.SRC The radio module will transmit and receive messages over the radio. This module will be four parts as shown:

A. RADHAN This module will be polite and wait for the frequency to clear before transmitting. If it must wait longer that 10 sec., the message will be blurted out even if the channel is busy. If the channel clears before the 10 sec. has expired, it will not transmit immediately, because there may be other systems waiting also. Instead it will wait for a period of time determined by reading Nonvolatile EEPROM (TRNTIM). It is suggested that the first unit have a 01 for this value the next a 02 and so on till a max. is reached. Each tick will be 1/4 second.

B. RADINL Initialization called by Selftest.

C. RADRIN Receive interrupt handler from the Radio. Messages received will go only to the Printer and Computer modules as explained above.

D. RADTIN Transmit interrupt handler to the Radio. These messages will come only from the Loran handler module.

LORHAN.SRC This module will handle communications from the Loran Receiver. The only communication between the Loran Received and the Data-V-Com will be the data burst that the Loran Receiver will send once every second. This module will be divided as shown:

A. LORHAN This module will be called by the EXECLP every loop. When the LORRIN routine (B below) receives data from the Loran Receiver, if the counter TIMCNT has reached the value received from the Lap Top VTMCNT, the message will be sent to the Lap Top Computer and to the Radio handler RADHAN.

B. LORRIN Receive interrupt handler. This interrupt driven routine will ignore all data received from the Loran Receiver except the Longitude data after LON and the Latitude data after LAT. When it has successfully received this data it will set the local flag LORRCV. This flag will be cleared by the LORHAN module above.

C. LORINL Loran Initialization routine called by the Initialization module.

ALTHAN.SRC This module will read the 9 discrete inputs from the altimeter and decode them and put the ASCII data in the 3 byte buffers RADALT (3) and LAPALT (3) the MSB first. LORALT and LAPALT will be inbeded in the messages going out to the respective ports to the Radio and the Lap Top Computer.

THE FOLLOWING IS A LIST OF GLOBAL FLAGS, BUFFERS ETC.

```
DIAGNT = Diagnostic Handler Module.
DIAINL = Diagnostic Handler Initialization.
EXECLP = Executive Loop.
INITAL = Initialization Module.
ITIMER = Interupt for timer module.
ITIINL = Initialization for timer module.
LAPALT = 3 byte buffer for altitude written by ALTHAN
LAPDAT = USART Data for Computer handler.
LAPHAN = Lap Top Computer Handler Module.
LAPINL = Initialization Routine for Lap Top Computer.
LAPRIN = Receive Interrupt Handler for Lap Top Computer.
LAPSTS = USART Status for Computer handler.
LAPTIN = Transmit Interrupt Handler for Lap Top Computer.
LORALT = 3 byte buffer for altitude written by ALTHAN
LORDAT = USART Data for Loran Handler
LORHAN = Loran Receiver Handler Module.
LORINL = Loran Receiver Handler Initialization.
LORRIN = Loran Receiver Receive Interrupt handler.
LORSTS = USART Status for Loran Handler.
LRTRDB = From Loran Receiver to Radio    Buffer, length MSGLEN
LRTRDF =          '                      Flag, MSB & LSB
LRTLTB = From Loran Receiver to Lap Top Buffer, length MSGLEN
LRTLTE = End of LRTLTB buffer.
LRTLTF =            "                    Flag, MSB & LSB
LTTDVB = From Lap Top Computer to DVC   Buffer, length MSGLEN
LTTDVE = End of LRTLTE buffer.
LTTDVF =            "                    Flag, MSB & LSB
MSGLEN = Message Length without checksum and start of header
MSGTLN = Total Message Length with checksum and start of header
PRNDAT = USART Data for Printer Handler.
PRNHAN = Print Handler Module.
PRNSTS = Print Handler Status.
PRNTIN = Print Handler Transmit Interrupt.
PRNITL = Print Handler Initialization.
MESINP = Radio Message Inprocess.
NWDRST = Reset Flag  when set, watchdog not hit.
RADDAT = USART Data for Radio Handler.
RADHAN = Radio Handler Module.
RADINL = Radio Handler Initialization.
RADRIN = Radio Handler Receive Interrupt handler.
RADSTS = USART Status for Radio Handler.
RADTIN = Radio Handler Transmit Interrupt handler.
RCVINP = Receive in process for MESINP
RDTLTB = From Radio to Lap Top Computer Buffer, length MSGLEN
RDTLTE = End of RDTLTB buffer.
RDTLTF =            "                    Flag, MSB & LSB
SLFTST = Selftest Module.
TMAXTX = Radio Transmit Maximum time before time out
TRNINP = Transmit in process for MESINP
TRNTIM = Transmission Delay, when receiveing Timer 1/4 sec
VMAXTX = Value for TMAXTX.
VRNTIM = Value for TRNTIM Non Volatile EEPROM
VTMCNT = Timer for Loran Status to the RADIO and the Lap Top
         Computer.  When 0 it will not ever transmit.

CALL      COMOUT              ;OUT PUT MESSAGE
        MOV       DPTR,#ROMMSG        ;OUTPUT ROM MESSAGE
        CALL      COMOUT              ;OUTPUT MESSAGE
        MOV       A,R4                ;
        ANL       A,#0F0H             ;GET MSB
        SWAP      A                   ; ROTATE TO MSB

CALL      BINOUT              ;CONVERT TO ASCII AND OUTPUT
        MOV       A,R4                ;GET DATA AND CONVERT
        CALL      BINOUT              ;CONVERT TO ASCII AND OUTPUT

MOV       DPTR,#SLFFLG        ; SET SELFTEST FAILURE FLAG
        MOVX      A,@DPTR
        ORL       A,#SFFAIL           ;
        MOVX      @DPTR,A
```

```
SLFRM3:
        MOV     R0,#00                  ;CLEAR RETRY COUNTER

;LAP TOP USART SELFTEST

SLFDCH:
        CALL    WTDRST                  ;RESET WATCHDOG
        CALL    LAPINL                  ;INITIALIZE USART FOR LAP TOP

MOV     DPTR,#LAPSTS            ;READ DATA
        MOVX    A,@DPTR
        CJNE    A,#LAPCMP,SLFDC1
SLFDC0:
        MOV     R0,#00                  ;CLEAR RETRY COUNTER
        JMP     SLFPRT                  ; AND CONTINUE
SLFDC1:
        %COMP   (SLFDCH,19)             ;RERUN 19 TIMES IF NEEDED
        MOV     DPTR,#DCHFLL            ;GET FAILED MESSAGE
        CALL    COMOUT                  ;AND OUTPUT

MOV     DPTR,#SLFFLG            ; SET SELFTEST FAILURE FLAG
        MOVX    A,@DPTR
        ORL     A,#SFFAIL               ;
        MOVX    @DPTR,A

;PRINTER USART SELFTEST

SLFPRT:

CALL    WTDRST                  ;RESET WATCHDOG
        CALL    PRTIAL                  ;INITIALIZE PRINTER USART

MOV     DPTR,#PRTSTS            ;READ DATA
        MOVX    A,@DPTR
        CJNE    A,#PRTCMP,SLFPR1
SLFPR0:

MOV     R0,#00                  ;CLEAR RETRY COUNTER
        JMP     SLFITP                  ; AND CONTINUE
SLFPR1:
        %COMP   (SLFPRT,19)             ;RERUN 19 TIMES IF NEEDED
        MOV     DPTR,#PRTFLL            ;GET FAILED MESSAGE
        CALL    COMOUT                  ;AND OUTPUT

MOV     DPTR,#SLFFLG            ; SET SELFTEST FAILURE FLAG
        MOVX    A,@DPTR
        ORL     A,#SFFAIL               ;
        MOVX    @DPTR,A

;I/O SELFTEST

SLFITP:
        CALL    WTDRST                  ;RESET WATCHDOG
        CALL    IOINIT                  ;I/O SELFTEST

;PIA #1 SELFTEST

MOV     DPTR,#ICSR1             ;GET STATUS
        MOVX    A,@DPTR                 ;
        ORL     A,#ITPST1               ;ARE TIMER AND INTERRPUT
                                        ;ENABLES SET?
        CJNE    A,#ITPST1,SLFIT1        ;DID IT PAS
        MOV     R0,#00                  ;CLEAR RETRY COUNTER
        JMP     SLFRAD                  ; AND CONTINUE
SLFIT1:
        %COMP   (SLFITP,3)              ;RERUN 3 TIMES IF NEEDED
        MOV     DPTR,#IT1FLL            ;GET FAILED MESSAGE
        CALL    COMOUT                  ;AND OUTPUT

MOV     DPTR,#SLFFLG            ; SET SELFTEST FAILURE FLAG
        MOVX    A,@DPTR
        ORL     A,#SFFAIL               ;
        MOVX    @DPTR,A
```

```
;RADIO INTERFACE SELFTEST

SLFRAD:
        CALL    WTDRST                  ;RESET WATCHDOG
        CALL    RADINL                  ;INITIALIZE RADIO USART

MOV     DPTR,#RADSTS            ;READ DATA
        MOVX    A,@DPTR

CJNE    A,#RADCOM,SLFRD1
SLFRD0:
        MOV     R0,#00                  ;CLEAR RETRY COUNTER
        JMP     SLFPSD                  ; AND CONTINUE
SLFRD1:
        %COMP   (SLFRAD,19)             ;RERUN 19 TIMES IF NEEDED
        MOV     DPTR,#DCHFLL            ;GET FAILED MESSAGE
        CALL    COMOUT                  ;AND OUTPUT
        JNZ     SLFRAD                  ;AND HALT

MOV     DPTR,#SLFFLG            ; SET SELFTEST FAILURE FLAG
        MOVX    A,@DPTR
        ORL     A,#SFFAIL               ;
        MOVX    @DPTR,A

;SELFTEST PASSED

SLFPSD:
        MOV     DPTR,#SLFPAS            ;OUT PUT SELFTEST PASSED
        CALL    COMOUT                  ;MESSAGE

CALL    WTDRST                  ;RESET WATCHDOG

CALL    LORINL                  ;INITIALIZE LORAN RECEIVER

;THE FOLLOWING IS FOR TRANSMIT TEST, MAINTENCE, SHORT TIME

SLFINT:
        CALL    WTDRST                  ;RESET WATCHDOG

JNB     P3.2,SLFINE             ;JUMP IF NO KEYBOARD

MOV     DPTR,#MENU              ;OUT PUT MENUE
        CALL    COMOUT                  ;MESSAGE

CALL    RCV
SLFINE:
        CJNE    A,#'F',SLFPED           ; NOT A 'F' CHECK FOR MEMORY
        CALL    DATOUT                  ; GO TRANSMIT AND DON'T COMEBACK
SLFPED:
        ;SEE IF MEMORY READ/WRITE

CJNE    A,#'R',SLFCDR           ;NOT READ/WRITE MESSAGE

MOV     R3,#'D'                 ;SET FOR DATA

CALL    MEMRWD                  ;MEMORY READ/WRITE
        JMP     SLFINT                  ;EXIT MEMORY READ WRITE

SLFCDR:
        CJNE    A,#'C',SLFAIR           ;NOT READ/WRITE MESSAGE

MOV     R3,#'C'                 ;SET FOR CODE

CALL    MEMRWD                  ;MEMORY READ/WRITE
        JMP     SLFINT                  ;EXIT MEMORY READ WRITE
SLFAIR:
        CJNE    A,#'D',SLFTXW           ; NOT AIRCRAFT ID ENTRY
        CALL    AIRIDE                  ; IS AIRCRAFT ID ENTRY
        JMP     SLFINT                  ;   SEE IF MORE ENTRIES
SLFTXW:
        CJNE    A,#'V',SLFMFP           ;NOT WAIT VALUE ENTRY
        CALL    WTVALE                  ; IS XMIT WAIT VALUE ENTRY
        JMP     SLFINT                  ;   SEE IF MORE ENTRIES
```

```
SLFMFP:
        CJNE    A,#'L',SLFMFR           ;NOT FOR MSG FRQ. FROM LORAN
        CALL    MSGFLP                  ; GO CHANGE MESSAGE FREQ
        JMP     SLFINT                  ;   SEE IF MORE ENTRIES
SLFMFR:
        CJNE    A,#'T',SLFLRI           ;NOT FOR MSG FRQ. FROM RADIO
        CALL    MSGFRD                  ; GO CHANGE MESSAGE FREQ
        JMP     SLFINT                  ;   SEE IF MORE ENTRIES
SLFLRI:
        CJNE    A,#'M',SLFALT           ;NOT FOR ENTERRING LORRAN DATA
        CALL    ENTLOR                  ; GO ENTER LORRAN DATA
        JMP     SLFINT
SLFALT:
        CJNE    A,#'A',SLFEPT           ;NOT FOR CHANGING ALTIMETER INFO
        CALL    ENTALT                  ; GO ENTER ALTIMETER DATA
        JMP     SLFINT                  ; GO CONTINUE
SLFEPT:
        CJNE    A,#'P',SLFEND           ;SEE IF NEED TO GET PRINTER DATA
        CALL    ENTPRT
        JMP     SLFINT

;       END OF SELFTEST

SLFEND:
        CALL    WTDRST                  ;RESET WATCHDOG

MOV     IE,#0                   ;DISABLE INTERRUPTS

RET

;       ******************************************
;       ******************************************
;       * *                                    * *
;       * *       S U B R O U T I N E S        * *
;       * *                                    * *
;       ******************************************
;       ******************************************

IOINIT:

;INITIALIZATION OF PIA (8155) #1 PORTS A, B, C

MOV     DPTR,#ICTMB1    ;SET SQUARE WAVE OUTPUT FREQ.
        MOV     A,#VICTM1       ;D7,D6=0,1  TIMER MODE
                                ;D5-D0=1,0,0,1,0  5 MSB OF FREQ

MOVX    @DPTR,A         ;OUTPUT

MOV     DPTR,#ICTML1    ; 868.06 Hz
        MOV     A,#VICTL1       ;GET 8 LSB OF FREQ.

MOVX    @DPTR,A         ;OUTPUT

MOV     DPTR,#ICSR1     ;GET COMMAND REGISTER ADDRESS

MOV     A,#INMOD        ;D7,D6=TIMER MODE SQUARE WAVE=1,1
                                ;D5=INT ENB PORT B=0
                                ;D4=INT ENB PORT A=0
                                ;D3,D2=I/O PORT C (INPUTS)=0,0
                                ;D1=I/O PORT B (INPUTS)=0
                                ;D0=I/O PORT A (INPUTS)=0

MOVX    @DPTR,A         ;SET COMMAND REG.

MOV     A,#SETHGH       ;INIT HIGH

;TURN OFF THE FOLLOWING

MOV     DPTR,#RADIOO    ;RADIO OFF
        MOVX    @DPTR,A
```

```
            MOV      DPTR,#PTT_TK       ;DEASSERT PUSH TO TALK
            MOVX     @DPTR,A

IOINEX:
            RET                         ;EXIT SET UP

;THE FOLLOWING SUBROUTINE WAITS 20 MS AFTER A WRITE HAS BEEN
; MADE TO AN EEPROM

WAITEP:
            PUSH     1EH
            PUSH     1FH                ;SAVE R6 & R7

MOV      R7,#15
WATEP1:
            MOV      R6,#0FFH

WATEP2:
            NOP
            DJNZ     R6,WATEP2
            DJNZ     R7,WATEP1

POP      1FH
            POP      1EH
            RET                         ;EXIT WAIT SUBROUTINE

;This subroutine transmits until an '.' is output at that
; time it returns.

COMOUT:
            MOV      A,#00H             ;CLEAR ACC
            MOVC     A,@A+DPTR          ;OUTPUT DATA POINTER
            INC      DPTR
            CJNE     A,#' ',XMTOT0      ;TIME TO RESET WATCHDOG
            CALL     WTDRST             ; YES RESET
XMTOT0:
            CJNE     A,#'.',XMTOT1      ;ARE WE DONE?
            JMP      INTRS3             ;YES EXIT
XMTOT1:
            CALL     TRNOUT             ; NO TRANSMIT
            JMP      COMOUT
INTRS3:
            RET                         ;RETURN ENABLE INTERRUPTS

;This subroutine take the ACC and converts to ASCII and outputs it
; to the console

BINOUT:
            ANL      A,#0FH             ;STRIP OFF MSB

%JAG     (9,BINOT1)         ;GREATER THAT 9

ORL      A,#30H             ;MAKE ASCII
            JMP      BINOT2             ;CONTINUE
BINOT1:
            ADD      A,#37H             ;MAKE ASCII
BINOT2:
            CALL     TRNOUT             ;OUTPUT TO CONSOLE
            RET                         ;EXIT SUBROUTINE

;THE FOLLOWING ROUTINE RESETS THE WATCHDOG IF NOT TRANSMITTING

WTDRST:
            PUSH     ACC
            PUSH     PSW
            PUSH     DPL
            PUSH     DPH

MOV      A,#SETHGH          ;TURN OFF RADIO
            MOV      DPTR,#RADIOO
            MOVX     @DPTR,A
```

```
            MOV     DPTR,#PTT_TK        ;SET PUSH TO TALK HIGH
            MOVX    @DPTR,A             ; OR OFF
            MOV     DPTR,#WTDTIM        ;RESET WATCHDOG CHIP
            MOVX    @DPTR,A

POP     DPH
            POP     DPL
            POP     PSW
            POP     ACC

RET

;THIS SUBROUTINE READS AND WRITES MEMORY AS INPUT FROM MAINT CONSOLE

MEMRWD:
            MOV     DPTR,#MEMDAT        ;GET ENTER DATA MESSAGE
            CALL    COMOUT              ;OUTPUT
MEMWR:
            MOV     DPTR,#CRLFPD        ;CARRIAGE RETURN LF
            CALL    COMOUT

CALL    GETDAT              ;GET TWO CHARACTERS
            MOV     DPH,A
            MOV     A,R4
            CJNE    A,#CR,MEMRW0        ;GOOD DATA CONT
            JMP     MEMRWD
MEMRW0:
            CALL    GETDAT
            MOV     DPL,A               ; SAVE DATA

MOV     A,R4
            CJNE    A,#CR,MEMRW1        ;GOOD DATA CONT
            JMP     MEMRWD
MEMRW1:
            CALL    MEMEQE              ;GO DISPLAY MEMORY AT DPTR
MEMRW2:
            MOV     A,#' '              ;OUTPUT A SPACE
            CALL    TRNOUT

CALL    GETDAT              ;GET NEXT DATA
            MOV     R7,A                ;SAVE
            MOV     A,R4                ; GET COMMAND ENTRY

CJNE    A,#CR,MEMRW3        ;GOOD CONT
            INC     DPTR                ;GO TO NEXT LOCATION
            CALL    MEMDIS              ;GO DISPLAY MEMORY AT DPTR
            JMP     MEMRW2
MEMRW3:
            CJNE    A,#' ',MEMRW4       ;CONTINUE
            JMP     MEMWR               ;REENTER ADDRESS
MEMRW4:
            CJNE    A,#'/',MEMRW5       ;DATA WRITE
            CALL    MEMDIS              ;GO DISPLAY MEMORY AT DPTR
            JMP     MEMRW2
MEMRW5:
            CJNE    A,#'G',MEMRW6
            JMP     MEMRWT
MEMRW6:
            MOV     A,#'C'              ; IS IT CODE?
            CJNE    A,1BH,MEMRW7
            JMP     MEMRW8
MEMRW7:
            MOV     A,R7
            MOVX    @DPTR,A             ;WRITE DATA AT LOCATION
MEMRW8:
            CALL    MEMDIS              ;GO DISPLAY MEMORY AT DPTR
            JMP     MEMRW2
MEMRWT:
            RET

;THE FOLLOWING SUBROUTINE OUTPUTS A MEMORY DISPLAY AT DPTR
MEMDIS:
            MOV     R1,DPH
            MOV     R2,DPL              ;SAVE DPTR
```

```
        MOV     DPTR,#CRLFPD        ;CARRIAGE RETURN LF
        CALL    COMOUT

MOV     A,R1                ;GET DPH
        CALL    HEXOUT              ;OUTPUT MSB
        MOV     A,R2                ;
        CALL    HEXOUT              ;OUTPUT LSB

MOV     A,#'='              ;OUTPUT A =
        CALL    TRNOUT

MOV     DPL,R2              ;GET DATA
        MOV     DPH,R1              ;AT DPTR

MOV     A,#'C'              ;GET CODE DISIGNATOR
        CJNE    A,1BH,MEMDTA        ; NOT CODE BUT DATA
        CLR     A
        MOVC    A,@A+DPTR           ;GET CODE
        JMP     MEMDT1
MEMDTA:
        MOVX    A,@DPTR
MEMDT1:
        CALL    HEXOUT              ;OUTPUT

MOV     DPH,R1
        MOV     DPL,R2

RET

;THE FOLLOWING SUBROUTINE OUTPUTS AN EQUAL DISPLAY AT DPTR
MEMEQE:
        MOV     R1,DPH
        MOV     R2,DPL              ;SAVE DPTR

MOV     A,#'='              ;OUTPUT A =
        CALL    TRNOUT              ;OUTPUT

MOV     DPL,R2              ;GET DATA
        MOV     DPH,R1              ;AT DPTR

MOV     A,#'C'              ;GET CODE DISIGNATOR
        CJNE    A,1BH,MQEDTA        ; NOT CODE BUT DATA
        CLR     A
        MOVC    A,@A+DPTR           ;GET CODE
        JMP     MQEDT1
MQEDTA:
        MOVX    A,@DPTR
MQEDT1:
        CALL    HEXOUT              ;OUTPUT

MOV     DPH,R1
        MOV     DPL,R2

RET

;The following subroutine reads in the data for the Transmit Routine
; and then echo's it to the keyboard and then goes forever into the
; routine.

DATOUT:
SLFPS1:
        MOV     DPTR,#ENTDAT        ;GET ENTER DATA MESSAGE
        CALL    COMOUT              ;OUTPUT

CALL    RCV                 ;GET RECEIVE CHARACTOR
        CALL    TRNOUT              ;ECHO IT OUT
        MOV     R1,A                ;SAVE

%JAL    ('0',SLFPS1)        ;TOO LOW
        %JAG    ('9',SLFPS2)        ;NOT NUMERIC

ANL     A,#0FH              ;MAKE NUMERIC
        JMP     SLFPS3              ;CONTINUE
```

```
SLFPS2:
        %JAL        ('A',SLFPS1)        ;TOO LOW CONTINUE
        %JAG        ('F',SLFPS1)        ;TOO HIGH CONTINUE

CLR         C
        ADD         A,#0AH              ;
        SUBB        A,#'A'              ;MAKE HEX

SLFPS3:
        SWAP        A                   ;ROTATE MSB LSB
        MOV         R5,A                ;SAVE

CALL        RCV                 ;GET CHARACTOR
        CALL        TRNOUT              ;ECHO IT OUT

MOV         R2,A                ;SAVE

%JAL        ('0',SLFPS1)        ;TOO LOW
        %JAG        ('9',SLFPS5)        ;NOT NUMERIC

ANL         A,#0FH              ;MAKE NUMERIC
        JMP         SLFPS6              ;CONTINUE

SLFPS5:
        %JAL        ('A',SLFPS1)        ;TOO LOW CONTINUE
        %JAG        ('F',SLFPS1)        ;TOO HIGH CONTINUE

CLR         C
        ADD         A,#0AH              ;
        SUBB        A,#'A'              ;MAKE HEX

SLFPS6:
        ORL         A,R5                ;GET ALL OF DATA
        MOV         DPTR,#MODBYT        ;SET AT RAM
        MOVX        @DPTR,A             ;

MOV         DPTR,#MSGTRN        ;SEND OUT TRANSMIT MESSAGE
        CALL        COMOUT

MOV         A,R1                ;
        CALL        TRNOUT              ;OUTPUT FIRST DIGIT

MOV         A,R2                ;OUTPUT SECOND DIGIT
        CALL        TRNOUT              ;

DATOTL:
        CALL        MODBUS              ; AND OUTPUT FOREVER
        JMP         DATOTL

;The following subroutine requests and enters the aircraft Id.

AIRIDE:
        MOV         DPTR,#AIRMSG        ;OUTPUT AIRCRAFT ID MESSAGE
        CALL        COMOUT
        MOV         DPTR,#AIRCID        ;GET AIRCRAFT ID LOCATION
        MOV         R2,#AIRIDN          ;GET NUMBER OF MESSAGES
AIRD01:
        CALL        RCV                 ;GET NUMBER OR WHAT EVER
        MOVX        @DPTR,A             ; SAVE IN EEPROM
        INC         DPTR                ; GO TO NEXT LOCATION
        CALL        WAITEP              ;WAIT FOR EEPROM
        CALL        TRNOUT              ;ECHO TO SCREEN
        DJNZ        R2,AIRD01           ; RECEIVE WHOLE MESSAGE

MOV         DPTR,#TKYMSG        ;SAY THANKYOU
        CALL        COMOUT

RET                             ;EXIT SUBROUTINE

;The following subroutine requests and enters the Altimeter data.

ENTALT:
        MOV         DPTR,#ALTMSG        ;OUTPUT AIRCRAFT ID MESSAGE
```

```
            CALL      COMOUT
            MOV       DPTR,#ALTBUF        ;GET AIRCRAFT ID LOCATION
            MOV       R2,#ALTLEN          ;GET NUMBER OF MESSAGES
ENTAL1:
            CALL      RCV                 ;GET NUMBER OR WHAT EVER
            MOVX      @DPTR,A             ; SAVE IN EEPROM
            INC       DPTR                ; GO TO NEXT LOCATION
            CALL      WAITEP              ;WAIT FOR EEPROM
            CALL      TRNOUT              ;ECHO TO SCREEN
            DJNZ      R2,ENTAL1           ; RECEIVE WHOLE MESSAGE

MOV       DPTR,#TKYMSG        ;SAY THANKYOU
            CALL      COMOUT

MOV       DPTR,#ALTINH        ;SET ALTIMETER INHIBIT
            CLR       A
            CPL       A
            MOVX      @DPTR,A

RET                           ;EXIT SUBROUTINE

;The following subroutine requests and enters the LORAN Id.

ENTLOR:
            MOV       DPTR,#LNGMSG        ;OUTPUT LONGITUDE MESSAGE
            CALL      COMOUT
            MOV       DPTR,#PLNBUF        ;GET LONGITUDE LOCATION
            MOV       R2,#PLNLEN          ;GET NUMBER OF CHAR
ENTLN1:
            CALL      RCV                 ;GET NUMBER OR WHAT EVER
            MOVX      @DPTR,A             ; SAVE IN EEPROM
            INC       DPTR                ; GO TO NEXT LOCATION
            CALL      WAITEP              ;WAIT FOR EEPROM
            CALL      TRNOUT              ;ECHO TO SCREEN
            DJNZ      R2,ENTLN1           ; RECEIVE WHOLE MESSAGE

MOV       DPTR,#LATMSG        ;OUTPUT LATITUDE MESSAGE
            CALL      COMOUT
            MOV       DPTR,#PLTBUF        ;GET LONGITUDE LOCATION
            MOV       R2,#PLTLEN          ;GET NUMBER OF CHAR
ENTLT1:
            CALL      RCV                 ;GET NUMBER OR WHAT EVER
            MOVX      @DPTR,A             ; SAVE IN EEPROM
            INC       DPTR                ; GO TO NEXT LOCATION
            CALL      WAITEP              ;WAIT FOR EEPROM
            CALL      TRNOUT              ;ECHO TO SCREEN
            DJNZ      R2,ENTLT1           ; RECEIVE WHOLE MESSAGE

MOV       DPTR,#TKYMSG        ;SAY THANKYOU
            CALL      COMOUT

RET                           ;EXIT SUBROUTINE

;The following subroutine requests and enters the wait value.

WTVALE:
            MOV       DPTR,#WTVMSG        ;OUTPUT WAIT TILL CHANNEL CLEAR
                                          ; MESSAGE
            CALL      COMOUT
            MOV       DPTR,#VRNTIM        ;GET EEPROM LOCATION

CALL      GETDAT              ;GET HEX CHARACTER
            MOVX      @DPTR,A             ; SAVE IN EEPROM
            CALL      WAITEP              ;WAIT FOR EEPROM

MOV       DPTR,#TKYMSG        ;SAY THANK YOU
            CALL      COMOUT
            RET                           ;EXIT SUBROUTINE

;The following subroutine requests and enters the message freqency
; for the transmission of the aircraft frequency to the Lap Top
```

```
MSGFLP:
        MOV       DPTR,#FRLMSG           ;OUTPUT TIME IN SECONDS
                                         ; TO OUTPUT TO LAP TOP
                                         ; MESSAGE
        CALL      COMOUT
        MOV       DPTR,#VLRCNT           ;GET RAM LOCATION

CALL      GETDAT                 ;GET HEX CHARACTER
        MOVX      @DPTR,A                ; SAVE IN RAM

MOV       DPTR,#TKYMSG           ;SAY THANK YOU
        CALL      COMOUT
        RET                              ;EXIT SUBROUTINE
```

;The following subroutine requests and enters the message freqency
; for the transmission of the aircraft frequency to the Other Aircraft
; over the radio.

```
MSGFRD:
        MOV       DPTR,#FRRMSG           ;OUTPUT TIME IN SECONDS
                                         ; TO OUTPUT TO AIRCRAFT
                                         ; MESSAGE
        CALL      COMOUT
        MOV       DPTR,#VTRCNT           ;GET RAM LOCATION

CALL      GETDAT                 ;GET HEX CHARACTER
        MOVX      @DPTR,A                ; SAVE IN RAM

MOV       DPTR,#TKYMSG           ;SAY THANK YOU
        CALL      COMOUT
        RET                              ;EXIT SUBROUTINE
```

;THE FOLLOWING SUBROUTINE CONVERTS THE DATA IN THE ACC TO ASCII AND
; OUTPUTS IT

```
HEXOUT:
        PUSH      ACC

SWAP      A                      ;GET MSB
        CALL      BINOUT                 ;OUTPUT IT

POP       ACC
        CALL      BINOUT                 ;GET LSB
                                         ; AND OUTPUT IT
        RET
```

;The following subroutine requests and enters data to enable the printer.

```
ENTPRT:
        MOV       DPTR,#PRTMSG           ;OUTPUT PRINTER ID MESSAGE
        CALL      COMOUT

CALL      RCV                    ;GET NUMBER OR WHAT EVER
        MOV       DPTR,#PRTFLG           ;GET EEPROM ADDRESS
        MOVX      @DPTR,A                ; SAVE IN EEPROM
        CALL      WAITEP                 ;WAIT FOR EEPROM
        CALL      TRNOUT                 ;ECHO TO SCREEN

MOV       DPTR,#TKYMSG           ;SAY THANKYOU
        CALL      COMOUT

RET                              ;EXIT SUBROUTINE
```

;THIS SUBROUTINE RETURNS THE TWO BYTE DATA ENTERED

```
GETDAT:
        MOV       R4,#0                  ;CLEAR R4

CALL      RCV                    ;READ DATA

%JAL      ('0',MEMPS1)           ;TOO LOW
        %JAG      ('9',MEMPS2)           ;NOT NUMERIC
```

```
            CALL    TRNOUT                  ;OUTPUT

ANL     A,#0FH                  ;MAKE NUMERIC
            JMP     MEMPS3                  ;CONTINUE

MEMPS2:
            %JAL    ('A',MEMPS1)            ;TOO LOW CONTINUE
            %JAG    ('F',MEMPS1)            ;TOO HIGH CONTINUE

CALL    TRNOUT                  ;OUTPUT

CLR     C
            ADD     A,#0AH                  ;
            SUBB    A,#'A'                  ;MAKE HEX

MEMPS3:
            SWAP    A                       ;ROTATE MSB,LSB
            MOV     R5,A                    ;SAVE

CALL    RCV                     ;GET DATA

%JAL    ('0',MEMPS1)            ;TOO LOW
            %JAG    ('9',MEMPS5)            ;NOT NUMERIC

CALL    TRNOUT                  ;OUTPUT

ANL     A,#0FH                  ;MAKE NUMERIC
            JMP     MEMPS6                  ;CONTINUE

MEMPS5:
            %JAL    ('A',MEMPS1)            ;TOO LOW CONTINUE
            %JAG    ('F',MEMPS1)            ;TOO HIGH CONTINUE

CALL    TRNOUT                  ;OUTPUT

CLR     C
            ADD     A,#0AH                  ;
            SUBB    A,#'A'                  ;MAKE HEX

MEMPS6:
            ORL     A,R5                    ;GET ALL OF DATA

JMP     MEMEXT                  ;EXIT
MEMPS1:
            MOV     R4,A
MEMEXT:
            RET                             ;EXIT SUBROUTINE

;THE FOLLOWING SUBROUTINE OUTPUTS THE DATA IN THE ACC

TRNOUT:
      PUSH    ACC
      PUSH    1AH             ;SAVE

MOV     R2,#8           ;SET UP FOR 8 DATA BITS

CLR     P1.2            ;SET START BIT LOW
      CALL    WAIT2           ; WAIT

LPTRN:
      RRC     A               ;GET BIT IN CARRY
      JNC     LPTRN1          ;SET BIT
      SETB    P1.2            ;CARY SET OUTPUT HIGH
      JMP     LPTRN2          ; CONTINUE
LPTRN1:
      CLR     P1.2            ;SET LOW
LPTRN2:
      CALL    WAIT2           ; GO WAIT
      DJNZ    R2,LPTRN        ; LOOP UNTILL DONE

SETB    P1.2            ;STOP BITS

MOV     R2,#0CH         ;WAIT FOR STOP BITS
```

```
LPTRN3:
        CALL    WAIT2
        DJNZ    R2,LPTRN3

POP     1AH         ;RESTORE
        POP     ACC

RET                 ;EXIT SUBROUTINE

;
;The following is the RAM memory test.  It does the following:

;       Write each pattern found at RAMTAB to memory
;       from address RAMBG to RAMED then read it back.
;       if there is ever a change it will stop and put
;       the error address and written and read pattern
;       at RAMADD, RAMWRT and RAMRED respectively.  Will always
;       end with writing 00H to each address

RAMTAB:
        DB      55H,0AAH,0FFH,0H
RAMTST:

;CHECKERBOARD TEST AT USED RAM LOCATIONS

MOV     R1,#0           ;GET BEGINING OF TABLE
RAMIT3:
        MOV     DPTR,#RAMTAB    ;GET BYTE TO WRITE
        MOV     A,R1            ;GET TABLE ENTRY
        MOVC    A,@A+DPTR       ;

MOV     R5,A            ;SAVE
        INC     R1              ;GET NEXT VALUE IF NEEDED

MOV     R2,#RAMBG       ;GET START ADDRESS TO CHECK
        MOV     R3,#RAMED       ;GET STOPPING ADDRESS

CALL    RAMCK           ;GO CHECK EACH LOCATION

JC      EXIT            ;ERROR EXIT

MOV     A,R5            ;SEE IF DONE
        JNZ     RAMIT3          ; CONTINUE UNTIL DONE

;SET DIAG. REPORTING TO ALL FF'S

MOV     DPTR,#RAMADD    ;GET RAM PASS , FAIL ADDRESS
        MOV     A,#0FFH         ;SET ALL DATA TO 0FFH
        MOVX    @DPTR,A         ;SAVE
        INC     DPTR            ;GET NEXT ADDRESS
        MOVX    @DPTR,A         ;
        INC     DPTR            ;SAVE DATA WRITEN
        MOVX    @DPTR,A         ;
        INC     DPTR            ;SAVE DATA READ
        MOVX    @DPTR,A         ;

EXIT:

RET                     ;EXIT TEST

;THE FOLLOWING IS TO THE CODE TO FIND THE CHECKSUM.  IT ADDS
; UP ALL VALUES FROM ROMBG TO ROMED AND PUTS THE VALUE AT
;   CKSMAD

CKSADJ:  DB     0ACH            ;CHECKSUM ADDJUST TO 00

ROMCKS:

MOV     DPH,#ROMBG      ;GET BEGINING ADDRESS
        MOV     DPL,#00H        ;
```

```
        MOV     A,#0H           ;CLEAR USED BUFFERS
        MOV     R4,#00H         ;

ROM1:
        MOV     A,#0H           ;CLEAR ACC
        CLR     C               ;CLEAR CARRY BIT
        MOVC    A,@A+DPTR       ;GET DATA
        INC     DPTR            ; GO TO NEXT ADDRESS
        ADD     A,R4            ; AND ADD
        MOV     R4,A            ; AND SAVE

MOV     A,#ROMED        ;SEE IF THROUGH
        CJNE    A,DPH,ROM1      ; NOT THROUGH JUMP

MOV     A,R4            ;GET CHECKSUM
        MOV     DPTR,#CKSMAD    ; AND STORAGE ADDRESS
        MOVX    @DPTR,A         ; AND SAVE

RET                     ;EXIT TEST
;
;
; This subroutine writes the value of the ACC from high order address
; at R2 to but not including the high order address at R3.
;
RAMCK:

;WRITE TO ALL LOCATIONS

MOV     DPH,R2          ;GET STARTING ADDRESS
        MOV     DPL,#00H        ;
RAMCK1:
        MOV     A,R5            ;GET VALUE
        MOVX    @DPTR,A         ;WRITE ACC
        INC     DPTR
        MOV     A,R3            ;GET HIGH ORDER BYTE
        CJNE    A,DPH,RAMCK1    ;NOT THROUGH JUMP

;READ AT ALL LOCATIONS

MOV     DPH,R2          ;GET STARTING ADDRESS
        MOV     DPL,#00H
RAMCK3:
        MOVX    A,@DPTR         ;GET DATA AT ADDRESS
        CJNE    A,1DH,ERR       ;ERROR EXIT
        INC     DPTR            ; INC ADDRESS
        MOV     A,R3            ;GET END
        CJNE    A,DPH,RAMCK3    ;NOT THROUGH JUMP
        CLR     C               ;SET DONE
        RET                     ;EXIT SUBROUTINE

ERR:
        MOV     R6,A            ;SAVE BAD DATA
        MOV     A,DPH           ;GET HIGH ORDER
        MOV     R1,DPL          ; SAVE LOW ORDER
        MOV     DPTR,#RAMADD    ;GET RAM ADDRESS
        MOVX    @DPTR,A         ;
        INC     DPTR            ;SAVE BAD ADDRESS
        MOV     A,R1            ;
        MOVX    @DPTR,A         ;
        INC     DPTR            ;SAVE DATA WRITTEN
        MOV     A,R5            ;
        MOVX    @DPTR,A         ;
        INC     DPTR            ;SAVE DATA READ
        MOV     A,R6            ;
        MOVX    @DPTR,A         ;

SETB    C               ;INDICATE ERROR
        RET                     ;EXIT THIS MODULE

;THE FOLLOWING SUBROUTINE WAITS ONE FULL BIT
WAIT2:
```

```
               CALL    SWAIT           ;WAIT 1/2
WAIT1:
               CALL    SWAIT           ;WAIT 1/2
               RET                     ;EXIT WAIT

;THIS SUBROUTINE WAITS 1/2 OF BIT LENGTH

SWAIT:
       PUSH    1FH             ;
       PUSH    1EH

MOV     R7,#14H         ;
SWAIT1:
       MOV     R6,#3H

SWAIT2:

DJNZ    R6,SWAIT2

NOP

DJNZ    R7,SWAIT1

POP     1EH
       POP     1FH
       RET

;THE FOLLOWING IS FOR THE RECEIVE ON THE COM PORT
; AS WELL AS THE INTERRUPT HANDLER

CONINT:
RCV:
       PUSH    PSW             ;SAVE PSW
       PUSH    1AH             ;SAVE R2
       PUSH    DPL             ;SAVE DPTR
       PUSH    DPH

MOV     R2,#08H         ;SET FOR 8 DATA BITS
RCV1:
       JB      P1.3,RCV1       ;WAIT UNTIL STOP BIT

CALL    WAIT1           ;WAIT 1/2 BIT
RCV2:
       CALL    WAIT2           ;WAIT 1 BIT

JB      P1.3,RCV3       ;IS DATA BIT LOW OR HIGH
       CLR     C               ;CLEAR CARRY
       JMP     RCV4            ;CONTINUE
RCV3:
       SETB    C               ;SET CARRY
RCV4:
       RRC     A               ;ROTATE IN
       DJNZ    R2,RCV2

MOV     R2,#4           ;WAIT FOR 2 STOP BITS AND A
RCV5:
                               ; LITTLE EXTRA
       CALL    WAIT2           ;
       DJNZ    R2,RCV5

POP     DPH             ;RESTORE DPTR
       POP     DPL
       POP     1AH
       POP     PSW

RET

END
```

```
$TITLE  (INITIALIZATION 8052 BASED)
NAME INITAL

;ACAS  VA001 ORIGIONAL RELEASE 26 JAN 90  14:12

;LAST CHANGE VA001 02 FEB 90    10:43

;Initialization Used for serial, D/A and descrete I/O

;Basic Description of Module

;This module houses the interrupt vectors, including start, calls Selftest
; initializes that not done in Selftest, and returns control to the main
; Excutive Loop.

$EJECT
;
;               ****************************************
;               ****************************************
;               * *                                  * *
;               * *          P U B L I C S           * *
;               * *                                  * *
;               ****************************************
;               ****************************************
;
PUBLIC     INITAL                      ;Input to this module $EJECT
;
;               ****************************************
;               ****************************************
;               * *                                  * *
;               * *          M A C R O S             * *
;               * *                                  * *
;               ****************************************
;               ****************************************
;

%*DEFINE (JALE (CDATA,DEST))LOCAL LABEL(
        PUSH    ACC
        CLR     C
        SUBB    A,#%CDATA
        POP     ACC
        JC      %DEST
        CJNE    A,#%CDATA,%LABEL
        JMP     %DEST
%LABEL:
        )
;

;WAIT FOR EEPROM TO BE READY

%*DEFINE (WAITE) LOCAL LABEL
        (
%LABEL:
        JNB    P1.5,%LABEL
        )

%*DEFINE(INTHND(TYPSTS,TYPCNT,TYPVAL,TYPIT,USRTIN,XMPT)) LOCAL LABEL1 LABEL2
        (
        MOV     DPTR,#%TYPSTS
        MOVX    A,@DPTR           %'SEE IF INTERRUPT REQUEST TRANSMIT'
        ANL     A,#%XMPT
        JZ      %LABEL2           %' NO JUMP'
        MOV     DPTR,#%TYPCNT     %'GET INTERRUPT COUNT'
        MOVX    A,@DPTR
        INC     A
        MOVX    @DPTR,A           %'INC INTERRUPT COUNT'
        CJNE    A,#%TYPVAL,%LABEL1  %'COUNT AT MAX?'
        CLR     A
        MOVX    @DPTR,A           %'CLEAR COUNT'
        CALL    %TYPIT            %'GO REINITIALIZE'
        JMP     %LABEL2
```

```
%LABEL1:
        CALL    %USRTIN                 %'GO HANDLE TRN. INTERRUPT'
%LABEL2:
        )

$EJECT
;               ****************************************
;               ****************************************
;               * *                                  * *
;               * *          E X T E R N A L S       * *
;               * *                                  * *
;               ****************************************
;               ****************************************

; Interrupt handlers for different modules
;
                                        ; SPARE
EXTRN CODE (TIMIN)                      ; TIMER

EXTRN CODE (CONINT)                     ;KEYBOARD (DIAGNOSTICS) INTERRUPT

EXTRN CODE (LAPRIN,LAPTIN)              ; LAP TOP RECEIVE & TRANSMIT INTERRUPT
EXTRN CODE (LORRIN)                     ; LORAN RECEIVE INTERRUPT HANDLER
EXTRN CODE (RADRIN,RADTIN)              ; RADIO INTERRUPT HANDLERS
EXTRN CODE (PRTTIN)                     ; INTERRUPT HANDLER FOR PRINTER

;Selftest Entry Point

EXTRN CODE (SLFTST)

; Initialization for USARTS

EXTRN CODE (LAPINL)                     ; LAP TOP COMPUTER INITIALIZATION
EXTRN CODE (RADINL)                     ; RADIO INITIALIZATION
EXTRN CODE (PRTIAL)                     ; INITIALIZATON FOR PRINTER

; Interrupt counters

EXTRN XDATA (LAPTCT,LAPRCT)             ;FOR LAP TOP COMPUTER
EXTRN XDATA (RADTCT,RADRCT)             ;FOR RADIO
EXTRN XDATA (PRTTCT)

;EXTERNAL CODE FOR BEGIN OF PROGRAM

EXTRN CODE (EXECLP)

;USART Status addresses

EXTRN NUMBER (LAPSTS,RADSTS)            ;LAP TOP, RADIO
EXTRN NUMBER (PRTSTS,TERSTS)            ;PRINTER, TERMINAL

;Interrupt counter values

EXTRN NUMBER (LAPRVL,LAPTVL)            ;LAP TOP COMPUTER
EXTRN NUMBER (RADRVL,RADTVL)            ;RADIO
EXTRN NUMBER (TERRVL,TERTVL)            ;TERMINAL
EXTRN NUMBER (PRTTVL)                   ;PRINTER

;USART Ready or Empty flags

EXTRN NUMBER (TXRDY,TXEMPT,RXRDY)       ;DATA EMPTY FLAGS

;INTERNAL INITIALIZATION

EXTRN NUMBER (VTH1,VTH0,VTL0)           ;TIMER 0 & 1 VALUES

EXTRN NUMBER (VTMOD)                    ;TIMER MODE
EXTRN NUMBER (PCON)                     ;PCON IN INTERNAL MEMORY

;Reset Control

EXTRN NUMBER (VRSTCT)                   ;RESET COUNT MAX
EXTRN NUMBER (SETHGH)                   ;TURN OFF RADIO
```

```
EXTRN  NUMBER  (SETLOW)                    ;TURN ON RADIO
EXTRN  NUMBER  (RADIOO)                    ;RADIO CONTROL $EJECT

;              ****************************************
;              ****************************************
;              * *                                  * *
;              * *         P R O G R A M            * *

;              * *                                  * *
;              ****************************************
;              ****************************************

CSEG

ORG    00H

START:
       JMP       EXECLP       ;GO BEGIN CODE

ORG    03H

JMP       CONINT       ;DIAGNOSTIC START BIT

ORG    0BH

JMP       TIMIN        ;TIMER INTERRRUP

ORG    013H

JMP       INT1A        ;INTERRUPT VECTOR

ORG    23H

JMP       LORRIN       ;GO HANDLE NAVIGATION INTERRUPT

;
PROG_S    segment    CODE
RSEG      PROG_S

;THE FOLLOWING IS THE INTERRUPT VECTOR FOR THE USARTS
;
INT1A:
       CLR       EA           ;DISABLE INTERRUPTS

PUSH      PSW
       PUSH      DPH
       PUSH      DPL
       PUSH      ACC

;RADIO TRANSMIT USART
       %INTHND   (RADSTS,RADTCT,RADTVL,RADINL,RADTIN,TXRDY)

;RADIO RECIEVE USART
       %INTHND   (RADSTS,RADRCT,RADRVL,RADINL,RADRIN,RXRDY)

;LAP TOP TRANSMIT USART
       %INTHND   (LAPSTS,LAPTCT,LAPTVL,LAPINL,LAPTIN,TXRDY)

;LAP TOP RECEIVE USART

%INTHND   (LAPSTS,LAPRCT,LAPRVL,LAPINL,LAPRIN,RXRDY)

;TERMINAL TRANSMIT USART
;   INTHND   (TERSTS,TERTCT,TERTVL,TRINIT,TRTINT,TXRDY)

;TERMINAL RECEIVE USART
;   INTHND   (TERSTS,TERRCT,TERRVL,TRINIT,TRRINT,RXRDY)

;PRINTER RECEIVE USART
%INTHND   (PRTSTS,PRTTCT,PRTTVL,PRTIAL,PRTTIN,TXEMPT)
```

```
        POP        ACC
        POP        DPL
        POP        DPH
        POP        PSW

SETB       EA              ;ENABLE INTERRUPTS
        RETI
;
; THE FOLLOWING INITIALIZES ALL OF THE FOLLOWING:

INITAL:
        ORL        PSW,#18H        ;SELECT REG. BANK 3

SETB       P1.4            ;TURN ON PROCESS FAIL LED

;INITIALIZATION AND TEST OF USARTS AND ROM AND RAM

CALL       SLFTST          ;GO DO SELFTEST

;SET UP INTERNAL CPU REGISTERS

;TIMER 0 FOR 16 BIT TIMER FOR TIMIN
            ;TIMER 1 FOR BAUD RATE GEN FOR COM PORT

MOV        TMOD,#VTMOD     ;SET TMOD FOR
                                   ;TIMER 0 = TIMER
                                   ;TIMER 1 = BAUD RATE GENERATOR

MOV        TH1,#VTH1       ;SET BAUD RATE FOR COM PORT

MOV        TH0,#VTH0       ;SET TIMER 0
        MOV        TL0,#VTL0

SETB       TR0             ;START INTERNAL TIMER
        SETB       TR1             ;START BAUD RATE GENERATOR

SETB       SM1             ;MODE 2 IN SCON
        SETB       REN             ;ENABLE RECEIVE

MOV        PCON,#80H       ;SET SMOD

SETB       PT1             ;SET INTERUPT 1 HIGHEST PRIORITY

;ENABLE INTERRUPTS
        SETB       EX1             ;EX1 = EXTERNAL INTERUPT 1 USARTS
        CLR        EX0             ;EX0 = EXTERNAL INTERUPT 0 DIAG.
        SETB       ES              ;ENABLE SERIAL PORT
        SETB       ET0             ;ET0 = INTERNAL TIMMER INTERRUPT 0
        CLR        P1.4            ;CLEAR PROCESS FAIL LED
        SETB       EA              ;EA = ENABLE ALL

MOV        DPTR,#RADIO0    ;TURN ON RADIO
        MOV        A,#SETLOW
        MOVX       @DPTR,A

RETI                       ;EXIT INITIALIZATION

;END OF PROGRAM
;
END $TITLE (EXECUTIVE 8052 BASED)
NAME EXECLP                ;

;ORICIONAL RELEASE A001 20 JAN 90
;
;LAST CHANGE 22 MAY 90  08:14

;VA002 15 FEB 90  ADDED LORAN STATUS
;VA003 23 FEB 90  CHANGED LORAN METHOD OF UPDATE
```

```
;VA004 15 MAY 90   XMIT 1/2 AFTER RCV
;                  RECEIVE LED
;                  ATTACK DELAY 180MS
;VA005 21 MAY 90   ELIMINATED DOUBLE RESET
;VA006 22 MAY 90   FIXED ABOVE

;Basic Description of Module:
;
;  This module is the main loop that calls all other assembly
;   language routines in the main program.  It also defines all
;   public definitions and equates.
;
;
;            *****************************************
;            *****************************************
;            * *                                  * *
;            * *          P U B L I C S           * *
;            * *                                  * *
;            *****************************************
;            *****************************************
;

PUBLIC       EXECLP       ;INPUT FROM INIT
;
;            *****************************************
;            *****************************************
;            * *                                  * *
;            * *        E X T E R N A L S         * *
;            * *                                  * *
;            *****************************************
;            *****************************************

EXTRN XDATA          (TWTDTM)              ;WATCHDOG TIMER COUNTER
EXTRN XDATA (TRERUN)                       ;RERUN TIMER $EJECT
;            *****************************************
;            *****************************************
;            * *                                  * *
;            * *          M A C R O S             * *
;            * *                                  * *

;            *****************************************
;            *****************************************
;
;WAIT FOR EEPROM TO BE READY

%*DEFINE (WAITE) LOCAL LABEL
      (
%LABEL:
        JNB  P1.5,%LABEL
      )

;CALL TO LOOPED MODULES

%*DEFINE (CALLIT (MODULE))
        (
EXTRN CODE (%MODULE)
        LCALL    %MODULE
        )

;JUMP (LONG JUMP) IF A> CDATA

%*DEFINE (JAG (CDATA,DEST))LOCAL LABEL(
        PUSH   ACC
        CLR    C
        SUBB   A,#%CDATA
        JZ     %LABEL
        JC     %LABEL
```

```
        POP     ACC
        JMP     %DEST
%LABEL:
        POP     ACC
        )

%*DEFINE (DSE (TLABEL,DSV))
        (
PUBLIC  %TLABEL
%TLABEL:    DS      %DSV
        )
;
; EQUATE AND MAKE PUBLIC
;
%*DEFINE (EQE (TLABEL,VALUE))
        (
PUBLIC  %TLABEL
%TLABEL     EQU     %VALUE
        )
;
$EJECT
;
;               ******************************

;               ******************************
;               * *                        * *
;               * *       D A T A          * *
;               * *                        * *
;               ******************************
;               ******************************

D_ABS       segment     XDATA
D_NONV      segment     XDATA
DATA_AREA   segment     XDATA
PROG_S      segment     CODE

;***********ABSOLUTE DATA AREA******************

RSEG        D_ABS

;THE FOLLOWING IS A DATA AREA THAT IS USED EXTERNALLY AND SHOULD
; NOT BE CHANGED

%DSE    (CKSMAD,1)              ;ROM CHECKSUM ADDRESS
%DSE    (RAMADD,5)              ;RAM PASS FAIL AND ADDRESS
%DSE    (MODBYT,1)              ;RADIO TEST ADDRESS
%DSE    (RERUNA,1)              ;RERUN ADDRESS

;***********NONVOLATILE RAM AREA******************

RSEG        D_NONV

%EQE    (AIRIDN,6)              ;NUMBER OF DIGITS IN AIRCRAFT ID
;*******A CHANGE OF ABOVE EMGLEN IN RADINT MUST ALSO BE CHANGED
%DSE    (AIRCID,AIRIDN)         ;AIRCRAFT ID
%DSE    (VRNTIM,1)              ;RANDOM WAIT TIMER

;***********Printer Flags*********************
%DSE    (PRTFLG,1)              ;VOLATILE RAM
%EQE    (PRTVAL,'P')            ;VALUE FOR PRINTER ATTACHED

;***********RAM AREA***************************

RSEG        DATA_AREA

;****************INTERRUPT COUNTERS**************

%DSE (LAPRCT,1)                 ;LAP TOP RECEIVE
%DSE (LAPTCT,1)                 ;LAP TOP TRANSMIT

%DSE (RADRCT,1)                 ;RADIO RECEIVE
%DSE (RADTCT,1)                 ;RADIO TRANSMIT
```

```
%DSE (LRRCNT,1)                  ;LORAN INTERRUPT COUNT

%DSE (PRTTCT,1)                  ;PRINTER TRANSMIT
%DSE (TERRCT,1)                  ;TERMINAL RECEIVE
%DSE (TERTCT,1)                  ;TERMINAL TRANSMIT

;*************Altimeter Receiver buffer and lengths

%EQE (ALTLEN,3)                  ;Altimeter buffer length
%DSE (ALTBUF,ALTLEN)             ;Altimeter buffer %DSE (ALTINH,1)                  ;Altimeter inhibit %EQE (ALT9IN,01H)                ;FOR 9 STROBE ALTIMETER
%EQE (ALT11N,07H)                ;FOR 11 STROBE ALTIMETER ;*************Lorran Receiver buffer and lengths %EQE (PLNLEN,8)                  ;Longitude length
%DSE (PLNBUF,PLNLEN)             ;Longitude buffer
%DSE (TLNBUF,PLNLEN)             ;Temporary Longitude buffer %EQE (PLTLEN,7)                  ;Latitude length
%DSE (PLTBUF,PLTLEN)             ;Latitude buffer
%DSE (TLTBUF,PLTLEN)             ;Temporary atitude buffer %EQE (STSLEN,11)                 ;Loran Status Length
%DSE (STSBUF,STSLEN)             ;Loran Status buffer
%EQE (TLORST,3)                  ;Actual transmit length of above %DSE (LRTLTF,1)                  ;Loran Data Ready for Lap Top
%DSE (LRTRDF,1)                  ;Loran Data Ready for Radio ;***********Radio Handler Flags and buffers***************
;****************RECEIVE**********************************
%DSE (RDTLTF,1)                  ;Message from Radio to Lap Top Flag
SOHLEN     EQU      02           ;START OF HEADER LENGTH %EQE (MSGLEN,AIRIDN+PLTLEN+PLNLEN+ALTLEN+TLORST+SOHLEN) ;Message Length
%DSE (RDTLTB,MSGLEN)             ;Message from Radio to Lap Top
%DSE (MINCKS,1)                  ;Check sum address
%DSE (RDTLTE,1)                  ;End of RDTLTB ;***********Radio Handler Flags and buffers***************
;****************Transmit*********************************

%EQE (TRNMAX,1)                  ;Number of times to transmit

%EQE      (MSGTLN,MSGLEN+1+SOHLEN)    ;ENTIRE TRANSMIT LENGTH

;;;;;;;;CAUTION DO NOT ALTER THE FOLLOWING ORDER;;;;;;;;;;;;
%DSE (STTRAN,SOHLEN)             ;AREA FILLED WITH START OF HEADERS
%DSE (RADOTB,MSGLEN)             ;BUFFER FOR MESSAGE
%DSE (TRNCKS,1)                  ;CHECKSUM ADDRESS

DS       (TRNMAX-1)*MSGTLN

%DSE (EDTRAN,0)                  ;END OF BUFFER
;;;;;;;;;;;;;;;;;;;;;;;;;;;;;;;;;;;;;;;;;;;;;;;;;;;;;;;;;;;;

%DSE (VTRCNT,1)                  ;COUNT FOR MESSAGES TO RADIO

;*************Lap Top Handler Flags**********************

%DSE (VLRCNT,1)                  ;COUNT BETWEEN MESSAGES
%DSE (NWDRST,1)                  ;NO WATCH DOG RESET

;*************SelfTest FLAGS*****************

%DSE (SLFFLG,1)                  ;SELFTEST FLAG
%EQE (SFFAIL,01H)                ;DVC SELFTEST FAILURE FLAG
%EQE (NOLRRD,02H)                ;NO LORAN UPDATE FOR RADIO
%EQE (NOLRLT,04H)                ;NO LORAN UPDATE FOR LAPTOP
```

```
%EQE   (TRRDST,08H)              ;NOT TRANSMITTED TO RADIO
%EQE   (TRLTST,10H)              ;NOT TRANSMITTED TO LAPTOP
%EQE   (OUTFLG,20H)              ;NOT ACCEPTING OTHER AIRCRAFT MSG'S $EJECT
;              ****************************************
;              ****************************************
;              * *                                  * *
;              * *         E Q U A T E S            * *
;              * *                                  * *
;              ****************************************
;              ****************************************
;
%EQE   (VRSION,0A006H)           ;VERSION NUMBER

;************** 8155 PIA #1********************************

%EQE   (ICSR1,0A010H)            ;INT. CMD STATUS REG
%EQE   (ICTMB1,0A015H)           ;MSB FOR SQUARE WAVE FREQ.
                                 ; (1800 BAUD)
                                 ;SET SQUARE WAVE OUTPUT FREQ.
                                 ;D7,D6=0,1  TIMER MODE
                                 ;D5-D0=1,0,0,1,0  5 MSB OF FREQ
%EQE   (VICTM1,41H)              ;VALUE FOR MSB ABOVE (1200 BAUD)
%EQE   (ICTML1,0A014H)           ;LSB FOR SQUARE WAVE FREQ.
%EQE   (VICTL1,038H)             ;VALUE FOR LSB ABOVE (1200 BAUD)
%EQE   (ITPST1,0CFH)             ;STATUS VERIFICATION

%EQE   (OUTMOD,0CCH)             ;PORT C OUTPUT
%EQE   (INMOD,0C0H)              ;PORT C INPUT
                                 ;D7,D6=TIMER MODE SQUARE WAVE=1,1
                                 ;D5=INT ENB PORT B=0
                                 ;D4=INT ENB PORT A=0
                                 ;D3,D2=I/O PORT C (INPUTS)=0,0
                                 ;D3,D2=I/O PORT C (OUTPUTS)=1,1
                                 ;D1=I/O PORT B (INPUTS)=0
                                 ;D0=I/O PORT A (INPUTS)=0

;      PORT A   (INPUTS)
%EQE   (PORTA1,0A011H)           ;ADD FOR PORT A

%EQE   (ALT_A1,01H)              ;01H - AITIMETER INPUT A1    (PA0)
%EQE   (ALT_D4,02H)              ;02H - ALTIMETER INPUT D4    (PA1)
%EQE   (ALT_D2,04H)              ;04H - ALTIMETER INPUT D2    (PA2)
                                 ;08H - SPARE                 (PA3)
                                 ;10H - SPARE                 (PA4)
%EQE   (DPTTIN,20H)              ;20H - INPUT FOR DAT_PTT     (PA5)
%EQE   (CARR,40H)                ;40H - CARRIER ACTIVE SENCE  (PA6)
                                 ;80H - NOT USED              (PA7)

;      PORT B   (INPUTS)
%EQE   (PORTB1,0A012H)           ;PORT B ADD

%EQE   (ALT_C4,01H)              ;01H - ALTIMETER INPUT C4    (PB0)
%EQE   (ALT_C2,02H)              ;02H - ALTIMETER INPUT C2    (PB1)
%EQE   (ALT_C1,04H)              ;04H - ALTIMETER INPUT C1    (PB2)
%EQE   (ALT_B4,08H)              ;08H - ALTIMETER INPUT B4    (PB3)
%EQE   (ALT_B2,10H)              ;10H - ALTIMETER INPUT B2    (PB4)
%EQE   (ALT_B1,20H)              ;20H - ALTIMETER INPUT B1    (PB5)
%EQE   (ALT_A4,40H)              ;40H - ALTIMETER INPUT A4    (PB6)
%EQE   (ALT_A2,80H)              ;80H - ALTIMETER INPUT A2    (PB7)

;      PORT C   (INPUTS & OUTPUTS)
%EQE   (PORTC1,0A013H)           ;

%EQE   (RADIOO,0A051H)           ;LOW RADIO ON
%EQE   (PTT_TK,0A052H)           ;LOW PUSH TO TALK OUTPUT TO RADIO

;**************Loran Receiver*******************************
;
;CPU USART
```

;************LAP TOP COMPUTER SERIAL CONTROL*

```
%EQE    (LAPSTS,0A061H)         ;MODE/COMMAND/STATUS
%EQE    (LAPDAT,0A060H)         ;TRANSMIT AND RECEIVE DATA

%EQE    (LAPMIF,0CEH)           ;SET MODE INSTRUCTION FORMAT
                                ;D7=1,D6=1  2 STOP BITS
                                ;D5=0       ODD PARITY
                                ;D4=0       PARITY DISABLED
                                ;D3=1,D2=1  8 DATA BITS
                                ;D1=1,D0=0  16X BAUD RATE FACTOR

%EQE    (LAPTRS,035H)           ;ENABLE TRANSMIT AND RECEIVE

;D5=1  SET RTS
                                ;D4=1  RESET ERROR FLAGS
                                ;D2=1  SET RECEIVE ENABLE
                                ;D0=1  SET TRANSMIT ENABLE

%EQE    (LAPRCS,034H)           ;ENABLE RECEIVE (NOT TRANSMIT)
                                ;D5=1  SET RTS
                                ;D4=1  RESET ERROR FLAGS
                                ;D2=1  SET RECEIVE ENABLE
                                ;D0=0  DISABLE TRANSMIT

%EQE    (LAPCMP,0C5H)           ;STATUS COMPARISON

%EQE    (LAPRVL,0CH)            ;RECEIVE INTERRUPT COUNT MAX
%EQE    (LAPTVL,0CH)            ;TRANSMIT INTERUPT COUNT MAX
%EQE    (LAPRET,06H)            ;USART RESET TRIES

;******************RADIO COMMUNICATION CONTROLLER******************

%EQE    (RADSTS,0A031H)         ;MODE/COMMAND/STATUS
%EQE    (RADDAT,0A030H)         ;TRANSMIT AND RECEIVE DATA
%EQE    (RADMIF,0CEH)           ;SET MODE INSTRUCTION FORMAT
                                ;D7=1,D6=1  2 STOP BITS
                                ;D5=0       ODD PARITY
                                ;D4=0       PARITY DISABLED
                                ;D3=1,D2=1  8 DATA BITS
                                ;D1=1,D0=0  16X BAUD RATE FACTOR

%EQE    (RADTRS,031H)           ;ENABLE TRANSMIT
                                ;D5=1  SET RTS
                                ;D4=1  RESET ERROR FLAGS
                                ;D0=1  SET TRANSMIT ENABLE

%EQE    (RADRCS,034H)           ;ENABLE RECEIVE (NOT TRANSMIT)
                                ;D5=1  SET RTS
                                ;D4=1  RESET ERROR FLAGS
                                ;D2=1  SET RECEIVE ENABLE
                                ;D0=0  DISABLE TRANSMIT

%EQE    (RADCOM,0C5H)           ;STATUS COMPARISON

%EQE    (RADRES,50H)            ;RADIO RESET

%EQE    (RADRVL,0CH)            ;RECEIVE INTERRUPT COUNT MAX
%EQE    (RADTVL,0CH)            ;TRANSMIT INTERUPT COUNT MAX
%EQE    (RADSVL,03H)            ;SYNCH INTERUPT COUNT MAX
%EQE    (RADRET,06H)            ;USART RESET TRIES

;***********PRINTER COMMUNICATION CONTROLLER**********************

%EQE    (PRTSTS,0A071H)         ;MODE/COMMAND/STATUS
%EQE    (PRTDAT,0A070H)         ;TRANSMIT AND RECEIVE DATA

%EQE    (PRTMIF,0CEH)           ;SET MODE INSTRUCTION FORMAT
                                ;D7=0,D6=1  1 STOP BIT
                                ;D5=0       ODD PARITY
                                ;D4=0       PARITY DISABLED
                                ;D3=1,D2=1  8 DATA BITS
                                ;D1=1,D0=0  16X BAUD RATE FACTOR
```

%EQE    (PRTTRS,11H)            ;ENABLE TRANSMIT
                                ;D5=0    SET RTS
                                ;D4=1    RESET ERROR FLAGS
                                ;D2=0    SET RECEIVE ENABLE
                                ;D0=1    SET TRANSMIT ENABLE

%EQE    (PRTCMP,0C5H)           ;STATUS COMPARISON

%EQE    (PRTTVL,0CH)            ;TRANSMIT INTERUPT COUNT MAX

;**************TERMINAL***************************************

%EQE    (TERSTS,0A061H)         ;MODE/COMMAND/STATUS
%EQE    (TERDAT,0A060H)         ;TRANSMIT AND RECEIVE DATA
%EQE    (TERMIF,0CH)            ;SET MODE INSTRUCTION FORMAT
                                ;D7=0,D6=1    1 STOP BIT
                                ;D5=0         ODD PARITY
                                ;D4=0         PARITY DISABLED
                                ;D3=1,D2=1    8 DATA BITS
                                ;D1=1,D0=0    16X BAUD RATE FACTOR
%EQE    (TERTRS,50H)            ;ENABLE TRANSMIT AND RECEIVE
                                ;D5=1    SET RTS
                                ;D4=1    RESET ERROR FLAGS
                                ;D2=1    SET RECEIVE ENABLE
                                ;D0=1    SET TRANSMIT ENABLE

%EQE    (TERRCS,50H)            ;ENABLE RECEIVE (NOT TRANSMIT)

;D5=1    SET RTS
                                ;D4=1    RESET ERROR FLAGS
                                ;D2=1    SET RECEIVE ENABLE
                                ;D0=0    DISABLE TRANSMIT

%EQE    (TERCOM,0DFH)           ;STATUS COMPARISON
%EQE    (TERRVL,0CH)            ;RECEIVE INTERRUPT COUNT MAX
%EQE    (TERTVL,0CH)            ;TRANSMIT INTERUPT COUNT MAX

;*************USART EQUATES***********************************
;       READ

%EQE    (RXRDY,02H)             ;READY FOR RECEIVE
%EQE    (TXRDY,01H)             ;READY FOR TRANSMIT
%EQE    (TXEMPT,04H)            ;TRANSMITTER EMPTY
%EQE    (TRSERR,38H)            ;FRAMMING, OVERRUN OR PARITY ERROR

;       WRITE

%EQE    (TRSDIS,10H)            ;DISABLE USART & ERROR RESET
%EQE    (TRSRES,50H)            ;RESET USART & ERROR RESET
%EQE    (TRANON,011H)           ;ENABLE TRANSMIT AND RESET ERROR
%EQE    (TRANOF,0EEH)           ;DISABLE TRANSMIT
%EQE    (RECVON,014H)           ;ENABLE RECEIVE AND RESET ERROR
%EQE    (RECVOF,0EBH)           ;DISABLE RECEIVE

;**************WATCHDOG EQUATES************************

%EQE    (WTDTIM,0F000H)         ;WATCHDOG TIMER ADDRESS

%EQE    (VWDHTC,225)            ;MAX WATCH DOG RESETS OUT OF LOOP
%EQE    (VRSTCT,5)              ;MAX RESETS
%EQE    (VWTDTM,01)             ;VALUE FOR WATCHDOG TIMER

;***********RAM AND ROM LIMITS*************************

%EQE    (RAMBG,80H)             ;MSB OF BEGINNING OF RAM
%EQE    (RAMED,90H)             ;MSB OF END OF RAM CHECK
%EQE    (ROMBG,00H)             ;MSB OF BEGINNING OF ROM CHECK
%EQE    (ROMED,40H)             ;MSB OF END OF RAM CHECK

;**********Message Length Deffinition******************

%EQE    (MSGTOT,35)             ;TOTAL LENGTH OF MESSAGE
                                ;NUMBER OF SPACES IN LAPTOP MESSAGE
%EQE    (LATSPC,MSGTOT-PLTLEN-PLNLEN-AIRIDN-ALTLEN-TLORST-6)
%EQE    (RSTSPC,MSGTOT-AIRIDN-7)   ;NUMBER OF SPACES IN RESET MESSAGE

;***********CPU INTERNAL TIMER & INTERRUPT SETUP ********

;       TIMERS 0 & 1

%EQE    (VTMOD,21H)             ;VALUE FOR TMOD
                                ;TIMER 0 = 16 BIT AUTO RELOAD TIMER
                                ;TIMER 1 = 8 BIT AUTO RELOAD
                                ;           BAUD RATE GEN.

%EQE    (VTH1,0F3H)             ;RELOAD VALUE FOR TIMER 1
                                ;CPU USART FOR 1200/2400 BAUD
%EQE    (VTL0,00H)              ;RELOAD VALUE FOR TIMER 0 LSB
%EQE    (VTH0,0FH)              ;RELOAD VALUE FOR TIMER 0 MSB
                                ;TIMER INTERRUPT 4/SECOND
%EQE    (PCON,87H)              ;PCON IN INTERNAL MEMORY

;**********OTHER COMMONLY USED SYMBOLS*******************

%EQE    (SETLOW,0H)             ;SET OUTPUT LOW
%EQE    (SETHGH,01H)            ;SET OUTPUT HIGH
%EQE    (SC1,0A5H)              ;FIRST SYNC CHARACTER
%EQE    (SC2,0D2H)              ;SECOND SYSC CHARACTER
%EQE    (CR,0DH)                ;CARRIAGE RETURN
%EQE    (LF,0AH)                ;LINE FEED
%EQE    (TRUE,0FFH)             ;POSITIVE
%EQE    (FALSE,00)              ;NEGATIVE
%EQE    (STTBRK,5BH)            ;START BRACKET [
%EQE    (ENDBRK,5DH)            ;END BRACKET OF ]
%EQE    (RERUNV,'1')            ;RERUN VALUE
VRERUN  EQU     02              ;RERUN TIMER $EJECT

;       *****************************************
;       *****************************************
;       * *                                 * *
;       * *         P R O G R A M           * *
;       * *                                 * *
;       *****************************************
;       *****************************************

RSEG    PROG_S

;Begining of Main Program

EXECLP:

MOV             SP,#30H         ;SET STACK POINTER
        MOV             IE,#0           ; CLEAR INTERRUPTS

%CALLIT         (INITAL)        ;Initialization Routine
EXE1:
        %CALLIT         (RADHAN)        ;RADIO Handler
        %CALLIT         (LAPHAN)        ;LAP TOP Handler
        %CALLIT         (LORHAN)        ;Loran Receiver Handler
        %CALLIT         (ALTHAN)        ;Altimeter Handler

CALL            WTDRST          ;GO RESET WATCH DOG TIMER

MOV             DPTR,#NWDRST    ; NO WATCH DOG RESET
        MOVX            A,@DPTR
        JNZ             EXECLP          ; CONTINUE

; RERUN IF NEEDED

MOV             DPTR,#RERUNA    ; NEED TO RERUN
        MOVX            A,@DPTR         ;
        CJNE            A,#RERUNV,EXECL1;
        JMP             EXE1            ;Continue to Loop
EXECL1:
        CJNE            A,#TRUE,EXECL2  ; RERUN INITIALIZED
        JMP             EXECL4
EXECL2:
        MOV             A,#TRUE
        MOVX            @DPTR,A         ;SET RERUN INITIALIZED

```
EXECL3:
        MOV     DPTR,#TRERUN    ; SET RERUN TIMER
        MOV     A,#VRERUN
        MOVX    @DPTR,A
EXECL4:
        MOV     DPTR,#TRERUN    ; RERUN TIMER EXPIRED?
        MOVX    A,@DPTR
        JNZ     EXE1
EXECL5:
        MOV     DPTR,#RERUNA
        MOV     A,#RERUNV
        MOVX    @DPTR,A

JMP     EXECLP          ;LOOP

;       *****************************************
;       *****************************************
;       * *                                   * *
;       * *       S U B R O U T I N E S       * *
;       * *                                   * *
;       *****************************************
;       *****************************************

;THE FOLLOWING SUBROUTINE WAITS 20 MS AFTER A WRITE HAS BEEN
; MADE TO AN EEPROM

WAITEP:
        PUSH    1EH
        PUSH    1FH             ;SAVE R6 & R7

MOV     R7,15
WATEP1:
        MOV     R6,0FFH

WATEP2:
        NOP
        DJNZ    R6,WATEP2
        DJNZ    R7,WATEP1

POP     1FH
        POP     1EH

RET                     ;EXIT WAIT SUBROUTINE

;THE FOLLOWING SUBROUTINE RESETS THE WATCHDOG TIMER
; IF NOT INTERRUPT BOUND

WTDRST:

CLR     A                       ; CLEAR COUNT

MOV     DPTR,#RADRCT    ;CLEAR RADIO RECEIVE INTERRUPT
MOVX    @DPTR,A

MOV     DPTR,#RADTCT    ;CLEAR RADIO TRANSMIT INTERRUPT
MOVX    @DPTR,A

MOV     DPTR,#LAPRCT    ;CLEAR LAP TOP RECEIVE INTERRUPT
MOVX    @DPTR,A

MOV     DPTR,#LAPTCT    ;CLEAR LAP TOP TRANSMIT INTERRUPT
MOVX    @DPTR,A

MOV     DPTR,#PRTTCT    ;CLEAR PRINTER TRANSMIT INTERRUPT
MOVX    @DPTR,A

MOV     DPTR,#TWTDTM    ;WATCH DOG TIMER EXP
MOVX    A,@DPTR
JNZ     WTDRS4          ; NO CONTINUE
```

```
        MOV     DPTR,#PORTA1    ;DATPTT LOW
        MOVX    A,@DPTR         ;
        ANL     A,#DPTTIN       ;
        JNZ     WTDRS4          ; YES DON'T SET WATCHDOG

MOV     DPTR,#TWTDTM    ;GET WATCH DOG TIMER
        MOV     A,#VWTDTM       ; YES RESET TIMER
        MOVX    @DPTR,A         ;

MOV     DPTR,#WTDTIM    ;RESET WATCHDOG CHIP
        MOVX    A,@DPTR
WTDRS4:
        RET
END
```

```
$TITLE  (TIMER 8052 BASED)
NAME TIMER              ;DDECREMENTS TIMERS EVERY 1/4 SEC

;ACAS ORIGIONAL RELEASE 23 JAN 90 15:53

;LAST CHANGE  15 MAY 1990  8:48

;Basic Description of Module
;This module consists of two groups of timers:
;
;GROUP 1
;
; This group has timers from TSTAR1 to TEND1.  They are decremented
; until they are zero.  They are decremented every 1/4 second
; which is determined by the initialization of the clock
; calendar chip using the PIE output.

;GROUP 2
;
; This group has timers from TSTAR2 to TEND2.  They are decremented
; until they are zero.  They are decremented every 1 second
; which is determined by counting four ticks or decrements of the
; timers in group 1.
;
;GROUP 3
;
; This group has timers from TSTAR3 to TEND3.  They are decremented
; until they are zero.  They are decremented every 1 minute
; which is determined by counting sixty ticks or decrements of the
; timers in group 2.
;

;           **************************************
;           **************************************
;           * *                                * *
;           * *          P U B L I C S        * *
;           * *                &               * *
;           * *        E X T E R N A L S       * *
;           * *                                * *
;           * *                                * *
;           **************************************
;           **************************************
;
;
PUBLIC      TIMIN               ;Input to this module

EXTRN  NUMBER (VTH0,VTL0)       ;TIMER 0 RELOAD VALUES

;
;           **************************************
;           **************************************
;           * *                                * *
```

```
;            * *        M A C R O S           * *
;            * *                               * *
;            ****************************************
;            ****************************************

; DEFINE AND MAKE PUBLIC
;
%*DEFINE (DSE (TLABEL))
         (
PUBLIC    %TLABEL
%TLABEL:  DS      1
         )

$EJECT
;
;            ****************************************
;            ****************************************
;            * *                               * *
;            * *        D A T A                * *
;            * *                               * *
;            ****************************************
;            ****************************************

;THIS IS DATA USED INTERNAL TO THIS FILE ONLY

DATA_AREA        segment XDATA
RSEG             DATA_AREA

;  GROUP 1  DECREMENTED EVERY 1/4 SECOND

GROUP1:          DS      1       ;GROUP 1 COUNTER (SET BY VGRUP1)
VGRUP1           EQU     1       ;GROUP 1 COUNTER VALUE

%DSE     (TSTAR1)                ;START OF TIMERS GROUP 1 (SPARE)
%DSE     (TWTDTM)                ;WATCH DOG TIMER COUNTER
%DSE     (TLPRTO)                ;LAP TOP RECEIVE TIME OUT COUNTER
%DSE     (TLPART)                ;LAP TOP UART REFRESH TIMER
%DSE     (TLRRTO)                ;LORAN RECEIVE TIME OUT COUNTER

%DSE     (TWATCH)                ; RADIO WATCHDOG TIMER
%DSE     (TRCVE)                 ; RADIO RECEIVE TIME OUT TIMER
%DSE     (TWATXT)                ; RADIO WAIT FOR TRANSMIT
%DSE     (TRDRNT)                ; RADIO RECEIVE HANG UP TIMER
%DSE     (TRERUN)                ; RERUN TIMER
%DSE     (TRCLED)                ; RECEIVE ON LED TIMER (LAPHAN)

%DSE     (TEND1)                 ;END OF TIMERS GROUP 1 (SPARE)

;  GROUP 2 DECREMENTED EVERY SECOND

%DSE     (GROUP2)                ;GROUP 2 COUNTER (SET BY VGRUP2)
VGRUP2           EQU     3       ;GROUP 2 COUNTER VALUE

%DSE     (TSTAR2)                ;START OF TIMERS GROUP 2 (SPARE)
%DSE     (TMAXTX)                ;RADIO MAX. WAIT TO TRANSMIT
%DSE     (TTRCNT)                ;WAIT TO TRANSMIT TO RADIO
%DSE     (TLRCNT)                ;WAIT TO SEND MESSAGE TO LAPTOP
%DSE     (TEND2)                 ;END OF TIMERS GROUP 2 (SPARE)

;  GROUP 3 DECREMENTED EVERY MINUTE

%DSE     (GROUP3)                ;GROUP 3 COUNTER (SET BY VGRUP3)
VGRUP3   EQU    59               ;GROUP 3 COUNTER VALUE

%DSE     (TSTAR3)                ;START OF TIMERS GROUP 3 (SPARE)

%DSE     (TEND3)                 ;END OF TIMERS GROUP 3 (SPARE)

$EJECT
```

```
;       ****************************************
;       ****************************************
;       * *                                  * *
;       * *         P R O G R A M            * *
;       * *                                  * *
;       ****************************************
;       ****************************************
;
;
PROG_S      segment       CODE
RSEG PROG_S

TIMIN:
            ORL           PSW,#18H            ;SET RB

PUSH          PSW                 ;SAVE PSW
            PUSH          DPH
            PUSH          DPL
            PUSH          ACC
            PUSH          1DH                 ; (REG5)
            PUSH          1CH                 ; (REG4)

;GROUP 1 FAST TIMERS 1/4 SECOND / TICK

MOV           DPTR,#GROUP1        ;GET GROUP 1 COUNTER
            MOVX          A,@DPTR             ;
            JZ            TIMG1S              ;COUNTED DOWN GO DEC.
            DEC           A                   ; NOT DONE DEC AND CONT.
            MOVX          @DPTR,A             ;
            JMP           TIMG3E              ;
TIMG1S:
            MOV           A,#VGRUP1           ;RESET GROUP 1 COUNTER
            MOVX          @DPTR,A             ;

MOV           DPTR,#TEND1+1       ;GET LAST VALUE +1
            MOV           R5,DPL              ; TIMER
            MOV           R4,DPH              ;

MOV           DPTR,#TSTAR1        ;GET FIRST TIMER
TIMG11:
            MOVX          A,@DPTR             ;GET VALUE
            JZ            TIMG12              ; CONTINUE IF ZERO
            DEC           A                   ;
            MOVX          @DPTR,A             ;
TIMG12:
            INC           DPTR                ;GO TO NEXT ONE
            MOV           A,DPH               ;SEE IF DONE
            CJNE          A,1CH,TIMG11        ; CONTINUE IF NOT EQUAL
            MOV           A,DPL               ;
            CJNE          A,1DH,TIMG11        ;

;GROUP 2 SLOW TIMERS 1 SECOND / TICK

MOV           DPTR,#GROUP2        ;GET GROUP 2 COUNTER
            MOVX          A,@DPTR             ;
            JZ            TIMG2S              ;COUNTED DOWN GO DEC.
            DEC           A                   ; NOT DONE DEC AND CONT.
            MOVX          @DPTR,A             ;
            JMP           TIMG3E              ;

TIMG2S:                                       ;START OF GROUP 2 TIMERS
            MOV           A,#VGRUP2           ;RESET GROUP 2 COUNTER
            MOVX          @DPTR,A             ;

MOV           DPTR,#TEND2+1       ;GET LAST VALUE +1
            MOV           R5,DPL              ; TIMER
            MOV           R4,DPH              ;

MOV           DPTR,#TSTAR2        ;GET FIRST TIMER
TIMG21:
            MOVX          A,@DPTR             ;GET VALUE
            JZ            TIMG22              ; CONTINUE IF ZERO
            DEC           A                   ;
            MOVX          @DPTR,A             ;
```

```
TIMG22:
        INC     DPTR                    ;GO TO NEXT ONE
        MOV     A,DPH                   ;SEE IF DONE
        CJNE    A,1CH,TIMG21            ; CONTINUE IF NOT EQUAL
        MOV     A,DPL                   ;
        CJNE    A,1DH,TIMG21            ;

;GROUP 3 SLOW TIMERS 1 MINUTE / TICK

MOV     DPTR,#GROUP3            ;GET GROUP 3 COUNTER
        MOVX    A,@DPTR                 ;
        JZ      TIMG3S                  ;COUNTED DOWN GO DEC.
        DEC     A                       ; NOT DONE DEC AND CONT.
        MOVX    @DPTR,A                 ;
        JMP     TIMG3E                  ;

TIMG3S:                                 ;START OF GROUP 3 TIMERS
        MOV     A,#VGRUP3               ;RESET GROUP 3 COUNTER
        MOVX    @DPTR,A                 ;

MOV     DPTR,#TEND3+1           ;GET LAST VALUE +1
        MOV     R5,DPL                  ; TIMER
        MOV     R4,DPH                  ;

MOV     DPTR,#TSTAR3            ;GET FIRST TIMER
TIMG31:
        MOVX    A,@DPTR                 ;GET VALUE
        JZ      TIMG32                  ; CONTINUE IF ZERO
        DEC     A                       ;
        MOVX    @DPTR,A                 ;
TIMG32:
        INC     DPTR                    ;GO TO NEXT ONE
        MOV     A,DPH                   ;SEE IF DONE
        CJNE    A,1CH,TIMG31            ; CONTINUE IF NOT EQUAL
        MOV     A,DPL                   ;
        CJNE    A,1DH,TIMG31            ;

TIMG3E:                                 ;END OF GROUP2

MOV     TH0,#VTH0               ;SET TIMER 0
        MOV     TL0,#VTL0

POP     1CH                     ;RESTORE SAVED SFR, ECT.
        POP     1DH
        POP     ACC                     ;
        POP     DPL                     ;
        POP     DPH                     ;
        POP     PSW                     ;SAVED ON INTERRUPT

RETI                            ;EXIT INTERRUPT

;END OF PROGRAM
END $TITLE   (RADHAN 8052 BASED)
NAME RADHAN                    ;RADIO INTERUPT HANDLER
;
;VA001 ORIGIONAL RELEASE
;LAST CHANGE VA004 15 MAY 90  08:14

;VA002 14 FEB 90 ADDED LORAN STATUS
;VA003 23 FEB 90 CHANGED LORAN UPDATE METHOD
;VA004 15 MAY 90 CHANGED ATTACK DELAY TO 180 MS

;The purpose of this module is to handle and buffer I/O
; between the RADIO module and the radio modem.

;Basic Description of Module:

;RADHAN: This module will interface with the RADIO by looking at a flag
;        LRTRDF and transmitting what is in the buffers for altitude, latitude
;        and longitude when the flag is set.  When the message is sent out it
;        will clear the flag LRTRDF.  When it has received a message it will
```

```
;           put it in RDTLTB buffer and set flag RDTLTF.  It will not accept
;           another message until this flag is cleared.  This module will have two
;           inputs.  One called by EXECLP and two called from interrupts, one for
;           transmit and one for receive.  This module will be responsible
;           for MESINP with TRNINP so that the watchdog timer will not be reset
;           when transmitting.
;
;           This module will handle only one kind of message format which is
;           MSGLEN characters long.
;
;           RADHAN  module will be polite and wait for the frequency to clear
;           before transmitting.  If it must wait longer than 10 sec., the
;           message will be blurted out even if the channel is busy,  If
;           the channel clears before the 10 sec. timer has expired, it will
;           transmit immediately, because there may be other systems that were
;           waiting and begin to transmit at the same time.  It will wait an
;           additional period of time as determined by reading EEPROM VRNTIM
;
;           RADINL This is the Initialization Routine called by Selftest
;
;           RADRIN This is the receive interrupt routine
;
;           RADTIN This is the transmit interrupt routine
$EJECT
;
;                 ******************************************
;                 ******************************************
;                 * *                                    * *
;                 * *           P U B L I C S            * *
;                 * *                                    * *
;                 ******************************************
;                 ******************************************

PUBLIC    RADTIN                ;Input to this module
PUBLIC    RADINL                ;Receive interrupt
PUBLIC    RADTIN                ;Transmit interrupt
PUBLIC    RADINL                ;Initialization
EXTRN     CODE   (PRTCOM)       ;TEMP $EJECT
;
;                 ******************************************
;                 ******************************************
;                 * *                                    * *
;                 * *           D A T A                  * *
;                 * *                                    * *
;                 ******************************************
;                 ******************************************
;THIS DATA IS USED BY OTHER MODULES
; AND IS DECLARED IN EXECLP
;
;         RECEIVE BUFFER ADDRESSES
EXTRN XDATA (RDTLTB,MINCKS)
;
;         TIMERS
EXTRN XDATA (TWATCH)                    ;WATCHDOG TIMER
EXTRN XDATA (TRCVE)                     ;RECEIVE TIME OUT TIMER
EXTRN XDATA (TWATXT)                    ;WAIT FOR TRANSMIT
EXTRN XDATA (TMAXTX)                    ;MAX. WAIT TO TRANSMIT
                                        ;BEFORE BLERT OUT
EXTRN XDATA (TRDRNT)                    ;RENABLE RECEIVE ;         TIMER VALUES
EXTRN XDATA (VRNTIM)                    ;WAIT TO TRANSMIT TIMER ;         INPUT AND OUTPUT
EXTRN NUMBER (SETHGH,SETLOW)            ;OUTPUTS BEFORE TRANS.
EXTRN NUMBER (PTT_TK)

;OUTPUTS BEFORE TRANS.
EXTRN NUMBER (PORTA1,CARR)              ;CARRIER ACTIVE SENSOR
```

```
;       USART CONTROL
EXTRN NUMBER (RADSTS,RADDAT)        ;MODEM CONTROL
EXTRN NUMBER (RADRCS,RADTRS)        ;ENABLE RECEIVE & TRANSMIT
EXTRN NUMBER (RADMIF)               ;MODE INSTRUCTION FORMAT
EXTRN NUMBER (TRSDIS,RADRES)        ;DISABLE USART
EXTRN NUMBER (TRSERR)               ;FRAMING,OVERRUN OR PARITY ERROR
EXTRN NUMBER (TXEMPT)               ;TRANSMIT EMPTY

;       RECEIVE AND TRANSMIT BUFFER LENGTHS
EXTRN NUMBER (TRNMAX)               ;# OF TIMES TO TRANSMIT
EXTRN NUMBER (MSGLEN)               ;MESSAGE LENGTH
EXTRN NUMBER (MSGTLN)

;       SYNC CHARACTORS
EXTRN NUMBER (SC1,SC2)              ;SC1 = 1ST SC2 = 2ND

;       LAP TOP INTERFACE

EXTRN XDATA  (RDTLTF)               ;MESSAGE READY FROM RADIO TO LAP TOP

EXTRN XDATA  (AIRCID)               ;AIRCRAFT ID IN NONVOLATILE RAM
EXTRN NUMBER (AIRIDN)               ;LENGTH OF AIRCRAFT ID

;       LORAN RECEIVER INTERFACE

EXTRN XDATA  (LRTRDF)               ;DATA READY FOR LAP TOP COMPUTER
EXTRN XDATA  (PLTBUF,PLNBUF)        ;LATTITUDE AND LONGITUDE BUFFERS
EXTRN NUMBER (PLTLEN,PLNLEN)        ;LATTITUDE AND LONGITUDE LENGTH
EXTRN XDATA  (STSBUF)               ;LORAN STATUS BUFFER
EXTRN NUMBER (STSLEN)               ;LORAN STATUS BUFFER LENGTH

;       ALTIMETER INTERFACE

EXTRN XDATA  (ALTBUF)               ;ALTIMETER DATA
EXTRN NUMBER (ALTLEN)               ;ALTIMETER DATA LENGTH

;       SELFTEST INTERFACE

EXTRN XDATA  (SLFFLG)               ;SELFTEST FLAG
EXTRN NUMBER (NOLRRD)               ;NO LORAN UPDATE FOR RADIO
EXTRN NUMBER (TRRDST)               ;NOT TRANSMITTED TO RADIO
EXTRN NUMBER (TRLTST)               ;NOT TRANSMITTED TO LAPTOP

;       TRANSMIT BUFFER AND LENGTHS

EXTRN XDATA  (STTRAN)               ;START OF TRANSMIT BUFFER
EXTRN XDATA  (RADOTB)               ;MESSAGE IN TRANSMIT BUFFER
EXTRN XDATA  (EDTRAN)               ;END OF TRANSMIT BUFFER

;THIS IS DATA USED INTERNAL TO THIS FILE ONLY
;
$EJECT

DATA_AREA        segment      XDATA
PROG_S           segment      CODE
RSEG             DATA_AREA RCVFLG:   DS       1              ;RECEIVE FLAGS
SC1RCD    EQU      01H            ;FIRST SYNC CHARACTOR FLAG
RINPFG    EQU      02H            ;RECEIVE IN PROCESS
RECIND    EQU      04H            ;RECEIVE INITIALIZED
MUTPTR:   DS       2              ;TRANSMIT MESSAGE POINTER
MINPTR:   DS       2              ;INPUT MESSAGE POINTER

;        MESSAGE IN PROCESS BUFFER

MESINP:   DS       1              ;MESSAGE INPROCESS FLAGS
RCVINP    EQU      01H            ;  RECEIVE IN PROCESS
RCVIPN    EQU      0FFH - RCVINP  ;RCVINP/
TRNINP    EQU      02H            ;  TRANSMIT IN PROCESS
TRINPN    EQU      0FFH - TRNINP  ;TRINP/

VRDRNT    EQU      04             ; REENABLE RECEIVE
```

$EJECT
;           ********************************
;           ********************************
;           * *                          * *
;           * *        M A C R O S       * *
;           * *                          * *
;           ********************************
;           ********************************

;JUMP (LONG JUMP) IF A> CDATA

%*DEFINE (JAG (CDATA,DEST))LOCAL LABEL(
        PUSH    ACC
        CLR     C
        SUBB    A,#%CDATA
        JZ      %LABEL
        JC      %LABEL
        POP     ACC
        JMP     %DEST
%LABEL:
        POP     ACC
        )

$EJECT

;           ********************************
;           ********************************
;           * *                          * *
;           * *        E Q U A T E S     * *
;           * *                          * *
;           ********************************
;           ********************************

;
;THE FOLLOWING IS INTERNAL EQUATES ONLY
;
;Receive flags (RCVFLG)   see DATA above
;
;Message Inprocess flags (MESINP) see DATA above
VWATCH      EQU      05H            ;WATCH DOG TIMER VALUE
VRCVE       EQU      05H            ;RECEIVE TIME OUT VALUE

;MISC.

XWAIT       EQU      22             ;WAIT XWAIT*10 ms before transmit
XWAITS      EQU      10             ;WAIT 10 MS
VMAXTX      EQU      10             ;MAX WAIT BEFORE BLERT OUT
                                    ;VALUE FOR TMAXTX $EJECT ;           ********************************
;           ********************************
;           * *                          * *
;           * *        P R O G R A M     * *
;           * *                          * *
;           ********************************
;           ********************************
;
RSEG       PROG_S ;This input RADHAN is polled by the main exec EXECLP and it
; checks to see if a message needs to go out and if so enables
; the appropriate interrupt and rebuffers the message and
; calls the interrupt handler to output it. If a message has
; successfully been received it sets the appropriate flags to
; Lap Top Module so it can get the message.

RADHAN:
        MOV     DPTR,#RADSTS      ;THROUGH TRANSMITTING
        MOVX    A,@DPTR           ;GET COUNTER

```
          ANL     A,#TXEMPT
          JNZ     RADIN0          ; YES CONTINUE

MOV     DPTR,#TWATCH    ;WATCH DOG TIMER EXPIRED?
          MOVX    A,@DPTR
          JZ      RAD0A           ; YES TURN OFF

JMP     REXIT           ;  NO EXIT
RADIN0:
          MOV     DPTR,#MESINP    ;A MESSAGE IN PROCESS
RADI0A:
          MOVX    A,@DPTR         ;SEE IF TX IN PROCESS
          ANL     A,#TRNINP
          JZ      RAD0            ; NO CONTINUE

MOV     DPTR,#TWATCH    ;WATCH DOG TIMER EXPIRED?
          MOVX    A,@DPTR

JZ      RAD0A           ; YES TURN OFF
          JMP     REXIT           ; EXIT
RAD0A:
          MOV     DPTR,#RADSTS    ;DISABLE TRANSMIT INTRERRUPT
          MOV     A,#TRSDIS
          MOVX    @DPTR,A

MOV     DPTR,# LRTRDF   ; CLEAR TRANSMIT FLAG
          CLR     A
          MOVX    @DPTR,A
          MOV     DPTR,#MESINP    ;    AND MESSAGE IN PROCESS
          MOVX    @DPTR,A         ;       FLAGS
RAD0:
          MOV     DPTR,#PTT_TK    ;GET PUSH TO TALK
          MOV     A,#SETHGH       ;SET HIGH
          MOVX    @DPTR,A

MOV     DPTR,#TWATCH    ;GET WATCH DOG TIMER COUNTER
          MOVX    A,@DPTR         ;HAS IT EXPIRED?
          JNZ     RAD1            ; NO CONTINUE
          MOV     A,#VWATCH       ; YES UPDATE
          MOVX    @DPTR,A
RAD1:
          MOV     DPTR,#RDTLTF    ;MESSAGE STILL PROCESSING?
          MOVX    A,@DPTR
          JNZ     RECXIT          ; YES CONTINUE

MOV     DPTR,#PORTA1    ;IS CARRIER ACTIVE SENSE HIGH
          MOVX    A,@DPTR
          ANL     A,#CARR
          JNZ     RAD1B           ;YES CAN RECEIVE
;;;;;;;;;;;;;;;;;;TEMPORARY;;;;;;;;;;;;;;;;;;;;;;;;;;;;;;
          JMP     RAD1B
;;;;;;;;;;;;;;;;;END OF TEMPORARY;;;;;;;;;;;;;;;;;;;;;;;;
          MOV     A,#TRSDIS       ; DISABLE USART
          MOV     DPTR,#RADSTS
          MOVX    @DPTR,A

CLR     A
          MOV     DPTR,#RCVFLG    ;CLEAR RECEIVE FLAGS
          MOVX    @DPTR,A
          MOV     DPTR,#TRCVE     ;RESET RECEIVE TIMER
          MOVX    A,@DPTR

JMP     RAD2            ; CONTINUE
RAD1B:
          MOV     DPTR,#TRCVE     ;RECEIVE TIMER TIMER OUT?
          MOVX    A,@DPTR
          JNZ     RECXIT          ; NO CONTINUE

MOV     DPTR,#MESINP    ;RECEIVE IN PROCESS

MOVX    A,@DPTR         ;
          ANL     A,#RCVINP       ; YES GO INITIALIZE
          JNZ     RAD1A           ;
```

```
            MOV     DPTR,#RCVFLG    ;ALREADY INITIALIZED?
            MOVX    A,@DPTR
            ANL     A,#RECIND
            JZ      RAD1A

MOV     DPTR,#TRDRNT    ;SEE IF RECEIVING INTERRUPTS
            MOVX    A,@DPTR
            JZ      RAD1A           ; NO REINITIALIZE

JMP     RAD2            ; NO CONTINUE

;   CHECK RECEIVE

RAD1A:
            MOV     DPTR,#RCVFLG
            MOV     A,#RECIND       ;SET RECEIVE INITIALIZED FLAG
            MOVX    @DPTR,A

MOV     DPTR,#MESINP    ;CLEAR MESSAGE INPROCESS FLAG
            CLR     A
            MOVX    @DPTR,A

;ENABLE INTERRUPT RECEIVE

CALL    RADINL          ;REINITIALIZE

MOV     DPTR,#RADSTS    ;ENABLE RECEIVE
            MOV     A,#RADRCS
            MOVX    @DPTR,A

MOV     DPTR,#TRDRNT    ;RESET RECEIVE TIMER
            MOV     A,#VRDRNT
            MOVX    @DPTR,A

MOV     DPTR,#RDTLTB    ;SET POINTER TO BEG.
            MOV     R4,DPL          ; OF MESSAGE INPUT BUFFER
            MOV     A,DPH
            MOV     DPTR,#MINPTR
            MOVX    @DPTR,A
            MOV     A,R4
            INC     DPTR
            MOVX    @DPTR,A
RECXIT:
            JMP     REXIT           ;EXIT MODULE
;END OF RECEIVE

;BEGINNING OF TRANSMIT

;   SEE IF MESSAGE IS READY TO GO OUT

RAD2:
            MOV     DPTR,#LRTRDF    ;MESSAGE READY TO GO OUT
            MOVX    A,@DPTR         ;
            JZ      RECXIT          ; NO CONTINUE

MOV     DPTR,#RCVFLG    ;IS RECEIVE IN PROCESS
            MOVX    A,@DPTR         ;LOOK AT 1ST SYNC CHAR RECEIVED
            ANL     A,#SC1RCD
            JNZ     RECXIT          ; YES DO NOT TRANSMIT

MOV     DPTR,#PORTA1    ;IS CARRIER ACTIVE SENSE HIGH
            MOVX    A,@DPTR
            ANL     A,#CARR
            JZ      RAD2B           ;NO GO TRANSMIT IF TIMER EXPIRED?
;;;;;;;;;;;;;;;;;;TEMPORARY;;;;;;;;;;;;;;;;;;;;;;;;;;;;;
            JMP     RAD2B
;;;;;;;;;;;;;;;;;;END OF TEMPORARY;;;;;;;;;;;;;;;;;;;;;;;

MOV     DPTR,#TWATXT    ; IS WAIT TIMER SET
            MOVX    A,@DPTR
            JNZ     RAD2C           ; YES DON'T RESET MAX. WAIT TIMER
```

```
              MOV     DPTR,#TMAXTX      ;RESET MAX WAIT TIMER
              MOV     A,#VMAXTX
              MOVX    @DPTR,A
RAD2C:
              MOV     DPTR,#TMAXTX      ;MAX WAIT TIMER EXPIRED?
              MOVX    A,@DPTR
              JZ      RAD4

MOV     DPTR,#VRNTIM      ;GET ENTERED VALUE FROM EEPROM
              MOVX    A,@DPTR           ;
              MOV     DPTR,#TWATXT      ;SET WAIT TIMER
              MOVX    @DPTR,A           ;
              JMP     RECXIT            ;CONTINUE
RAD2B:
              MOV     DPTR,#TWATXT      ;WAIT TIMER EXPIRED?
              MOVX    A,@DPTR           ;
              JNZ     RECXIT            ; NO EXIT

;     SET UP TO TRANSMIT

RAD4:
              CALL    LOADMG            ;LOAD MESSAGE IN RADOTB
                                        ; AND ENABLE INTERRUPTS

MOV     DPTR,#RCVFLG      ;CLEAR RECEIVE FLAGS (ALL OF THEM)
              CLR     A
              MOVX    @DPTR,A

MOV     DPTR,#TWATCH      ;GET WATCH DOG TIMER COUNTER
              MOV     A,#VWATCH         ; RESET
              MOVX    @DPTR,A

;ASSERT PUSH TO TALK AND TRANSMIT SWITCH

MOV     DPTR,#PTT_TK      ;GET PUSH TO TALK
              MOV     A,#SETLOW
              MOVX    @DPTR,A           ;SET LOWI

MOV     DPTR,#RADOTB      ;GET START ADDRESS
              MOV     R3,DPL            ;SAVE LSD'S

MOV     DPTR,#STTRAN      ;GET START OF TRANSMIT BUFFER

RAD3:
              ;PUT SYNC CHARACTERS IN BUFFER

MOV     A,#SC1            ;GET FIRST SYNCH CHARACTOR
              MOVX    @DPTR,A           ;SAVE
              CALL    DINSERT           ;INSERT IN ALL MESSAGES
              INC     DPTR              ;INC.
              MOV     A,#SC2            ;GET SECOND SYNCH CHARACTOR
              MOVX    @DPTR,A           ;SAVE
              CALL    DINSERT           ;INSERT IN ALL MESSAGES
              INC     DPTR              ;INC.
              MOV     A,R3              ;ARE WE DONE
              CJNE    A,DPL,RAD3        ; NO JUMP

;COPY MESSAGE
RAD5:
              MOV     R5,#MSGLEN        ;GET JUST LENGTH OF MESSAGE
RAD6:
              MOVX    A,@DPTR           ; GET DATA
              INC     DPTR
              CALL    DINSERT           ;INSERT DATA
              DJNZ    R5,RAD6           ;TILL END OF MESSAGE

;COMPUTE AND INSERT CHECKSUM

MOV     R5,#MSGLEN        ;GET TOTAL LENGTH OF MESSAGE

MOV     DPTR,#RADOTB      ;GET START OF MESSAGE
              CALL    CHKADD            ;ADD CHECKSUM TO ACC
              MOVX    @DPTR,A           ;PUT IN MESSAGE BUFFER
              CALL    DINSERT           ;INSERT DATA
```

;SET OUTPUT POINTER

```
        MOV     DPTR,#STTRAN     ;GET START OF TRANSMIT BUFFER
        MOV     R4,DPL
        MOV     A,DPH
        MOV     DPTR,#MUTPTR     ;GET MESSAGE POINTER
        MOVX    @DPTR,A          ; SAVE MSB
        MOV     A,R4             ; SAVE LSB
        INC     DPTR             ;
        MOVX    @DPTR,A          ;
```

;ENABLE INTERRUPT TRANSMIT

```
        MOV     R6,#XWAIT
RAD3L:  MOV     R3,#XWAITS       ;WAIT ABOUT XWAIT * 10 MS
RAD2L:  MOV     R4,#9BH          ;
RAD2LL: NOP                      ;
        DJNZ    R4,RAD2LL        ;
        DJNZ    R3,RAD2L         ;
        DJNZ    R6,RAD3L         ;

MOV     DPTR,#MESINP     ;SET MESSAGE IN PROCESS
        MOV     A,#TRNINP        ; TRANSMIT
        MOVX    @DPTR,A          ;

CLR     EA               ;DISABLE ALL INTERRUPTS

CALL    RADINL           ;REINITIALIZE

MOV     DPTR,#RADSTS     ;ENABLE RADIO TRANSMIT
        MOV     A,#RADTRS
        MOVX    @DPTR,A

SETB    EA               ;ENABLE INTERRUPTS
REXIT:
        RET                      ;END OF MAIN PROGRAM
```

;END OF MAIN PROGRAM
$EJECT

```
;       **********************************************
;       **********************************************
;       * *                                        * *
;       * *        I N I T I A I Z A T I O N       * *
;       * *                                        * *
;       **********************************************
;       **********************************************
```

;The following is for the initialization of the Synchronous
; USART

RADINL:

;RESET FOR MODE INSTRUCTION FORMAT

```
        MOV     DPTR,#RADSTS     ;GET STATUS REGISTER
        MOV     A,#RADRES        ;RESET FOR MODE INSTRUCTION
        MOVX    @DPTR,A

MOV     R7,#3FH          ;WAIT A BIT
        DJNZ    R7,$

; MODE INSTRUCTION FORMAT

MOV     A,#RADMIF        ;SET MODE INSTRUCTION FORMAT
        MOVX    @DPTR,A

MOV     R7,#3FH          ;WAIT A BIT
        DJNZ    R7,$

RET                      ;EXIT TEST
```

```
;
$EJECT

;        ************************************
;        ************************************
;        * *                              * *
;        * *       S U B R O U T I N E S  * *
;        * *                              * *
;        ************************************
;        ************************************
;
;The following subroutine loads the message in the buffer RADOTB
; from the altimeter, Loran Receiver and the nonvolatile EEPROM LOADMG:
        MOV     DPTR,#RADOTB    ;GET START OF BUFFER
        MOV     R3,DPH          ; SAVE DPTR
        MOV     R4,DPL MOV     DPTR,#AIRCID    ;GET AIRCRAFT ID LOCATION
        MOV     R7,#AIRIDN      ;GET NUMBER OF DIGITS IN AIRCRAFT ID
        CALL    R7DOUT          ;OUTPUT THE AIRCRAFT ID.

MOV     DPTR,#PLTBUF    ;GET THE LATITUDE
        MOV     R7,#PLTLEN      ;GET LENGTH FOR LATITUDE
        CALL    R7DOUT          ;OUTPUT THE LATITUDE

MOV     DPTR,#PLNBUF    ;GET THE LONGITUDE
        MOV     R7,#PLNLEN      ;GET LENGTH FOR LONGITUDE
        CALL    R7DOUT          ;OUTPUT THE LONGITUDE

MOV     DPTR,#ALTBUF    ;GET ALTITUDE BUFFER
        MOV     R7,#ALTLEN      ;GET ALTITUDE LENGTH
        CALL    R7DOUT          ;OUTPUT THE ALTITUDE

MOV     DPTR,#SLFFLG    ;GET SELFTEST FLAG
        MOVX    A,@DPTR
        CALL    HEXOUT          ; OUTPUT

MOVX    A,@DPTR         ;GET SELFTEST FLAGS
        ORL     A,#NOLRRD       ;SET NO LORAN UPDATE
        ORL     A,#TRLTST       ;SET NO MESSAGE TO LAP TOP
        MOV     R7,A            ;SAVE

MOV     A,#TRRDST       ;CLEAR MSG. SENT RADIO
        CPL     A
        ANL     A,1FH
        MOVX    @DPTR,A

MOV     DPTR,#STSBUF    ;GET STATUS BUFFER
        MOV     R7,#STSLEN      ;GET LENGTH OF BUFFER
        CALL    LORCON          ;OUTPUT LORAN STATUS

RET                     ;EXIT SUBROUTINE

;The following subroutine converts the data in the buffer STSBUF of
; length STSLEN and puts the hex characters in the Transmit buffer.

LORCON:
        MOV     R1,#4           ;GET NUMBER OF BITS TO GO OUT
        MOV     R2,#0           ; CLEAR MEMORY
LORCN1:
        MOVX    A,@DPTR         ;GET CHARACTOR
        INC     DPTR
        CJNE    A,#2DH,LORCN2   ;IS FLAG SET
        CLR     C               ; NO CLEAR
        JMP     LORC2A
LORCN2:
        SETB    C
LORC2A:
        MOV     A,R2
        RLC     A
        MOV     R2,A
```

```
            DJNZ      R7,LORCN3           ; WHEN DONE EXIT
            DEC       R1
            JMP       LORCN4
LORCN3:
            DJNZ      R1,LORCN1           ; CONTINUE TIL BYTE IS SET

CALL      BINOUT              ;OUTPUT WHEN FULL
            JMP       LORCON              ; AND CONTINUE
LORCN4:
            CLR       C
            RLC       A
            DJNZ      R1,LORCN4           ; CONTINUE TIL BYTE IS SET
            CALL      BINOUT              ;OUTPUT FULL

RET                           ;EXIT SUBROUTINE

; The following subroutine outputs data at dptr for the number
;   of times found in R7.

R7DOUT:
            MOVX      A,@DPTR             ;GET ID NUMBER
            CALL      RADBLD              ; OUTPUT
            INC       DPTR
            DJNZ      R7,R7DOUT           ;  UNTIL DONE

RET                           ;EXIT SUBROUTINE

;The following subroutine puts the data in the ACC when called
; in the RADOTB buffer pointed to by the pointer found in RADOPT RADBLD:
            PUSH      DPL                 ;SAVE DPTR
            PUSH      DPH MOV       DPH,R3              ;GET NEW DPTR FOR RADOTB
            MOV       DPL,R4
            MOVX      @DPTR,A
            INC       DPTR
            MOV       R3,DPH
            MOV       R4,DPL

POP       DPH                 ;RESTORE DATA POINTER
            POP       DPL

RET                           ;EXIT SUBROUTINE

;THE FOLLOWING SUBROUTINE CONVERTS THE DATA IN THE ACC TO ASCII AND
; OUTPUTS IT

HEXOUT:
            PUSH      ACC

SWAP      A                   ;GET MSB
            CALL      BINOUT              ;OUTPUT IT

POP       ACC
            CALL      BINOUT              ;GET LSB
                                          ; AND OUTPUT IT
            RET

;This subroutine take the ACC and converts to ASCII and outputs it
; to the console

BINOUT:
            ANL       A,#0FH              ;STRIP OFF MSB

%JAG      (9,BINOT1)          ;GREATER THAT 9

ORL       A,#30H              ;MAKE ASCII
            JMP       BINOT2              ;CONTINUE
```

```
BINOT1:
        ADD         A,#37H                  ;MAKE ASCII
BINOT2:
        CALL        .RADBLD                 ;OUTPUT TO BUFFER
        RET                                 ;EXIT SUBROUTINE

;THE FOLLOWING SUBROUTINE ADDS UP THE DATA STARTING AT DPTR FOR
; THE CHECKSUM CALCULATION.

CHKADD:
        PUSH        1FH                     ;SAVE R7
        PUSH        1EH                     ;SAVE R6

CLR         C                       ;CLEAR CARRY
        CLR         A                       ;CLEAR ACC
        MOV         R6,A                    ;CLEAR R6
        MOV         R7,A                    ;CLEAR R7
CHKLOP:
        MOVX        A,@DPTR                 ;GET DATA

INC         DPTR                    ;INC POINTER

ADDC        A,R7                    ;ADD DATA TO CHECKSUM
        MOV         R7,A                    ;SAVE

JNC         CHKLP1                  ;CONTINUE IF CARRY NOT SET
        MOV         R6,#0FFH                ; SET R6
CHKLP1:
        DJNZ        R5,CHKLOP               ;

MOV         A,R6                    ;SEE IF ALL ZERO'S
        ORL         A,R7                    ;
        JNZ         CHKLP2                  ; NO CONTINUE
        MOV         R7,#0F0H                ;CHANGE R7
CHKLP2:
        MOV         A,R7                    ;GET CHECKSUM

POP         1EH                     ;GET R6
        POP         1FH

RET                                 ;EXIT SUBROUTINE

;THE FOLLOWING SUBROUTINE INSERTS THE DATA AT THE DIFFERENT MESSAGE

; LEVELS TO BE TRANSMITTED TRNMAX NUMBER OF TIMES.

DINSERT:

MOV         R6,#TRNMAX              ;GET NUMBER OF TIMES TO TRANSMIT
        DJNZ        R6,DINLOP               ;NOT ZERO CONTINUE
        JMP         DINLP4                  ; DO NOT INSERT ANY

PUSH        DPL                     ;SAVE DPTR
        PUSH        DPH                     ;

DINLOP:
        MOV         R4,#MSGTLN              ;GET TOTAL MESSAGE LENGTH
DINLP3:
        INC         DPTR                    ;GET NEXT ADDRESS
        DJNZ        R4,DINLP3               ;NOT DONE LOOP
        MOVX        @DPTR,A                 ;SAVE IN OUTPUT BUFFER

DJNZ        R6,DINLOP               ;NOT DONE LOOP

POP         DPH                     ;GET DPTR
        POP         DPL                     ;

DINLP4:

RET
```

$EJECT
;
;
;       ****************************************
;       ****************************************
;       * *                                  * *
;       * *   I N T E R R U P T   H A N D L E R   * *
;       * *                                  * *
;       ****************************************
;       ****************************************
;
;TRANSMIT
; 2.   Determine if an error has occurred.  If so ALERT
;      RADIO.
; 3.   Determine if the message has completed, if so:
;      A.  Clear flag (LRTRDF) so that RADIO can enter
;          another message.
;      B.  Disable interrupts.

```
RADTIN:
        MOV     DPTR,#MESINP        ;TRANSMIT IN PROCESS
        MOVX    A,@DPTR             ;
        ANL     A,#TRNINP
        JNZ     TRNINT              ;TRANSMIT INTERRUPT

MOVX    A,@DPTR             ;RECEIVE IN PROCESS
        ANL     A,#RCVINP
        JNZ     RDNTX1              ; YES CONTINUE
        MOV     A,#RADRCS
        JMP     RDNTX2              ;RESET USART
RDNTX1:
        MOV     A,#RADRCS           ;SET RECEIVE MODE
RDNTX2:
        MOV     DPTR,#RADSTS
        MOVX    @DPTR,A

MOV     DPTR,#RADDAT        ; DUMMY WRITE
        MOVX    @DPTR,A

JMP     INEXAL              ;BAD INTERRUPT EXIT

TRNINT:

PUSH    1DH                 ;REG 5
        PUSH    1CH                 ;REG 4

MOV     DPTR,#EDTRAN        ;GET END OF BUFFER
        MOV     R5,DPL

MOV     DPTR,#MUTPTR        ;GET MESSAGE POINTER
        MOVX    A,@DPTR             ; MSB
        MOV     R4,A                ; AND SAVE
        INC     DPTR                ; GET LSB
        MOVX    A,@DPTR             ;
        MOV     DPL,A               ;GET NEW DPTR
        MOV     DPH,R4               ; FOR MESSAGE
        CJNE    A,1DH,TOUT          ;MORE CONT.

;NO MORE DATA QUIT

MOV     DPTR,#RADSTS        ;DISABLE TRANSMIT INTRERRUPT
        MOV     A,#TRSDIS           ;
        MOVX    @DPTR,A             ;

MOV     DPTR,#LRTRDF        ; CLEAR TRANSMIT
        CLR     A
        MOVX    @DPTR,A             ;

MOV     DPTR,#MESINP        ;CLEAR ALL MESSAGE INPROCES FLAGS
        CLR     A
        MOVX    @DPTR,A

JMP     INEXIT
```

```
TOUT:
        MOVX    A,@DPTR             ;GET DATA
        MOV     R5,A                ;SAVE
        INC     DPTR                ;GO TO NEXT BYTE
        MOV     R4,DPL              ;SAVE DATA POINTER
        MOV     A,DPH               ; IN MESSAGE POINTER
        MOV     DPTR,#MUTPTR        ;
        MOVX    @DPTR,A             ;
        MOV     A,R4                ;
        INC     DPTR                ;
        MOVX    @DPTR,A             ;
        MOV     DPTR,#RADDAT        ; OUTPUT DATA
        MOV     A,R5                ;
        MOVX    @DPTR,A             ;
        JMP     INEXIT              ; AND EXIT

;END OF TRANSMIT INTERRUPT HANDLER

;RECEIVE
; 1.   After the interrupt routine RDINTS has set the sync flags
;      this routine is enabled to start receiving the message.
; 2.   It will read in and buffer the message.
; 3.   The message will be ignored if the checksum is bad.
; 4.   Determine end of message, when the message has completed
;      do the following:
;      A.  Set flag (RADFIN) to alert RADIO that message has
;          arrived.
;      B.  Disable interrupts so that message will not be
;          overrun.

RADRIN:
        PUSH    1DH                 ;
        PUSH    1CH                 ;
        PUSH    1FH

MOV     DPTR,#MESINP        ; MESSAGE INPROCESS
        MOVX    A,@DPTR
        ANL     A,#TRNINP           ; TRANSMIT EXIT
        JNZ     RDITR2              ;

MOV     DPTR,#PORTA1        ;GET CHANNEL BUSY OR CARRIER
        MOVX    A,@DPTR             ; ACTIVE SENSE
        ANL     A,#CARR             ;
;;;;;;;;;;;;;;;;;;TEMPORARY;;;;;;;;;;;;;;;;;;;;;;;;;;;;;;;;
        JMP     TEMP
;;;;;;;;;;;;;;;;;;END OF TEMPORARY;;;;;;;;;;;;;;;;;;;;;;;;;
        JZ      RDITR1              ; NO DON'T TRY TO RECEIVE
;;;;;;;;;;;;;;;;;;TEMPORARY;;;;;;;;;;;;;;;;;;;;;;;;;;;;;;;;
TEMP:
;;;;;;;;;;;;;;;;;;END OF TEMPORARY;;;;;;;;;;;;;;;;;;;;;;;;;
        MOV     DPTR,#RADSTS        ;FRAMING OVERRUN OR
        MOVX    A,@DPTR             ; PARITY ERROR
        ANL     A,#TRSERR
        JZ      RDINGD              ; NO GET DATA
RDITR1:
        MOV     A,#RADRCS           ;REFRESH USART
        MOV     DPTR,#RADSTS
        MOVX    @DPTR,A
        JMP     RDITR3
RDITR2:
        MOV     A,#RADTRS           ;REFRESH USART
        MOV     DPTR,#RADSTS
        MOVX    @DPTR,A

RDITR3:
        MOV     DPTR,#RADDAT        ;GET DATA
        MOVX    A,@DPTR             ;

JMP     INEXIR              ;ERROR GO EXIT

;       GOOD DATA PROCESS
RDINGD:

MOV     DPTR,#TRDRNT        ;RESET RECEIVE TIMER
```

```
         MOV     A,#VRDRNT
         MOVX    @DPTR,A

MOV     DPTR,#RADDAT        ;GET DATA
         MOVX    A,@DPTR             ;
         MOV     R5,A                ;SAVE

MOV     DPTR,#RCVFLG        ;GET RECEIVE FLAGS
         CJNE    A,#SC1,RCVCK2       ;IS DATA 1ST SYNC CHARACTER
                                     ; YES SET   1SYNC CHARACTER REC
         MOVX    A,@DPTR
         ORL     A,#SC1RCD
         MOVX    @DPTR,A
RCVCK1:
         MOVX    A,@DPTR             ;SEE IF MESSAGE ALREADY INPROCESS
         ANL     A,#RINPFG
         JNZ     RCVI2D              ;   YES CONTINUE
         JMP     INEXIR              ;NO EXIT
RCVCK2:
         MOVX    A,@DPTR             ; GET FLAGS
         ANL     A,#SC1RCD           ;1ST SYNC CHARACTER RECEIVED?
         JZ      RCVCK1              ; NO CONTINUE

MOV     A,#SC1RCD           ;YES CLEAR 1ST REC FLAG
         CPL     A
         MOV     R4,A
         MOVX    A,@DPTR
         ANL     A,1CH
         MOVX    @DPTR,A

MOV     A,R5                ; GET CHARACTER
         CJNE    A,#SC2,RCVCK1       ;SECOND SYNC CHARACTER?
         MOVX    A,@DPTR             ; YES

ORL     A,#RINPFG           ;   SET IN PROCESS FLAG
         MOVX    @DPTR,A

MOV     DPTR,#MESINP        ; SET RECEIVE MESSAGE INPROCESS
         MOV     A,#RCVINP
         MOVX    @DPTR,A

MOV     DPTR,#TRCVE         ;SET RECEIVE TIMER
         MOV     A,#VRCVE
         MOVX    @DPTR,A

JMP     RCVI3A              ;CLEAR AND EXIT

;       DATA IS GOOD AND RECEIVED SYNC CHARACTORS

RCVI2D:
         MOV     DPTR,#TRCVE         ;SET RECEIVE TIMER
         MOV     A,#VRCVE
         MOVX    @DPTR,A

MOV     DPTR,#MINPTR        ;GET MESSAGE POINTER
         MOVX    A,@DPTR             ;   MSB
         MOV     R4,A                ;
         INC     DPTR                ; LSB
         MOVX    A,@DPTR             ;
         MOV     DPL,A               ;AND SET IN DPTR
         MOV     DPH,R4              ;
         MOV     A,R5                ;
         CALL    PRTCOM              ;*****TEMP
         MOVX    @DPTR,A             ;SAVE DATA IN BUFFER
         INC     DPTR                ;INCREAMENT POINTER
         MOV     A,DPL               ; SAVE POINTER
         MOV     R4,DPH              ;

MOV     DPTR,#MINCKS+1      ; SEE IF AT END OF MESSAGE
         CJNE    A,DPL,RCVIN4        ;    NO CONTINUE
RCVI2E:
         MOV     R7,#00              ;
         MOV     R5,#MSGLEN          ;GET CHECKSUM MESG LENGTH
         MOV     DPTR,#RDTLTB        ;
```

```
                CALL    CHKADD              ;ADD UP CHECKSUM

MOV     R5,A                ;SAVE CHECKSUM
                MOV     DPTR,#MINCKS        ;GET RECEIVED CHECKSUM
                MOVX    A,@DPTR             ;SEE IF RIGHT
RCVI2F:
                CJNE    A,1DH,RCVIN3        ; NOT RIGHT EXIT
RCVI2K:
                MOV     DPTR,#RDTLTF        ;SET MESSAGE IN FLAG
                MOV     A,#0FFH             ;
                MOVX    @DPTR,A             ;

MOV     DPTR,#TRCVE         ;CLEAR RECEIVE TIMER
                CLR     A
                MOVX    @DPTR,A

RCVIN3:
                MOV     DPTR,#RADSTS        ;DISABLE ALL INTERRUPTS
                MOV     A,#TRSDIS
                MOVX    @DPTR,A

MOV     DPTR,#RCVFLG        ;CLEAR RECEIVE FLAGS
                CLR     A
                MOVX    @DPTR,A

RCVI3A:
                MOV     DPTR,#RDTLTB        ;SET POINTER TO BEG.
                MOV     A,DPL               ; OF MESSAGE INPUT BUFFER
                MOV     R4,DPH              ;
RCVIN4:
                MOV     DPTR,#MINPTR        ;SAVE POINTER
                MOV     R5,A                ;
                MOV     A,R4                ;
                MOVX    @DPTR,A             ;
                MOV     A,R5                ;
                INC     DPTR                ;
                MOVX    @DPTR,A             ;

INEXIR:
                POP     1FH

INEXIT:
                POP     1CH                 ;
                POP     1DH                 ;
INEXAL:
                RET                         ;EXIT INTERUPT

;
END

10 REM LORRAN SIMULATOR   FEB 23 90   12:13
20 PRINT"ENTER LON DIR"
30 LN$ = INPUT$ (1)
40 PRINT "ENTER LONGITUDE (7 DIGITS)"
50 INPUT N
60 PRINT "ENTER LAT DIR"
70 LT$ = INPUT$ (1)
80 PRINT "ENTER LATITUDE (6 DIGITS)"
90 INPUT T
100 PRINT "ENTER CHANGE FOR LONGITUDE"
110 INPUT NC
120 PRINT "ENTER CHANGE FOR LATITUDE"
130 INPUT TC
160 OPEN "COM:" FOR OUTPUT AS#1
200 PRINT "LAT ";LT$;USING "######"; CDBL(T)
210 PRINT "LON ";LN$;USING "#######"; CDBL(N)
220 IF T <100000 THEN   PRINT#1,"LAT ";LT$;USING "0#####";CDBL(T)
230 IF T >99999 THEN    PRINT#1,"LAT ";LT$;USING "######";CDBL(T)
240 IF N <1E+06 THEN PRINT#1,"LON ";LN$;USING "0######";CDBL(N)
250 IF N >999999 THEN PRINT#1,"LON ";LN$;USING "#######";CDBL(N)
260 PRINT#1,"WRN SD-----------"
270 FOR I = 0 TO 1000
```

```
280 NEXT I
290 LET N=N+NC
300 LET T=T+TC
310 GOTO 200
320 END $TITLE   (LORHAN 8052 BASED)
NAME LORHAN

;VA001  2 Nov 89  ORIGINAL RELEASE

;LAST MODIFIED   23 FEB 90  10:51

;VA002 15 FEB 90  ADDED LORAN STATUS
;VA003 23 FEB 90  CHANGED LORAN METHOD OF UPDATE

;Basic Description of Module
;
;  This module will monitor and control the transmitting of messages
;  to and from the Loran Receiver.  The following is a breif description
;  of how this module is organized and the function of each section.

;  LORHAN  This is the main section or the part that is called from the
;          Executive Loop.  When the DIN flags are set (see LORRIN) it will
;          rebuffer the data in the TLXBUF buffers to the PLXBUF buffers.

;  LORRIN  This is the receive interrupt handler from the Loran Receiver.
;          Messages comming from the Loran Receiver will ignore spaces and
;          look for the words "LAT" and "LON" and put the Data in the buffers
;          TLTBUF and TLNBUF.  When it is through receiving lat. and lon.
;          it will set the LATDIN and LONDIN flags for LORHAN.

;  LORINL  This is the initialization routine for this module.  It is
;          called once by the Initialization or Selftest module, and is called
;          internally by this module if the receive lock up during a lat. or
;          a lon. input.  This module  Sets up the CPU UART and timer as well
;          as clears the MESINP flags.

$EJECT
;
;              ******************************************
;              ******************************************
;              * *                                    * *
;              * *                                    * *
;              * *           P U B L I C S            * *
;              * *                                    * *
;              ******************************************
;              ******************************************
;
;
PUBLIC    LORHAN          ;INPUT TO THIS MODULE
PUBLIC    LORINL          ;INITIALIZATION OF MODULE
PUBLIC    LORRIN          ;RECEIVE INTERRUPT HANDLER $EJECT
;
;              ******************************************
;              ******************************************
;              * *                                    * *
;              * *          E X T E R N A L S         * *
;              * *                                    * *
;              ******************************************
;              ******************************************

EXTRN XDATA  (LRRCNT)          ;RECEIVE INTERRUPT COUNT

EXTRN XDATA  (TLRRTO)          ;RECEIVE TIMEOUT TIMER

;     LORAN RECEIVER INTERFACE

EXTRN XDATA (LRTLTF)           ;Data ready for Lap Top

;       RADIO INTERFACE
```

```
EXTRN XDATA (LRTRDF)            ;Data ready for radio

;       POSITION BUFFERS

EXTRN XDATA  (PLTBUF,PLNBUF)    ;LONGITUDE AND LATITUDE
EXTRN XDATA  (TLTBUF,TLNBUF)    ;TEMP. LONGITUDE AND LATITUDE
EXTRN NUMBER (PLTLEN,PLNLEN)    ;LENGHT OF LATITUDE AND LONGITUDE

;       STATUS BUFFER AND LENGTH

EXTRN XDATA  (STSBUF)           ;STATUS BUFFER
EXTRN NUMBER (STSLEN)           ;STATUS BUFFER LENGTH

;       LORAN ACTIVE (DO NOT PROCESS)

EXTRN XDATA (TTRCNT,VTRCNT)     ;VALUE & TIMER FOR HOW LONG TO WAIT
                                ; TO TRANSMIT TO RADIO
EXTRN XDATA (TLRCNT,VLRCNT)     ;VALUE & TIMER FOR HOW LONG TO WAIT
                                ; TO SEND MESSAGE TO LAP TOP

;       SELFTEST INTERFACE

EXTRN XDATA (SLFFLG)            ;SELFTEST FLAG

EXTRN NUMBER (NOLRRD)           ;NO LORAN UPDATE FOR RADIO
EXTRN NUMBER (NOLRLT)           ;NO LORAN UPDATE FOR LAPTOP

;       MISC
EXTRN NUMBER (TRUE)             ;INPUT TRUE

;       ****************************************
;       ****************************************
;       * *                                  * *
;       * *           D A T A                * *
;       * *                                  * *
;       ****************************************
;       ****************************************

;THIS IS DATA USED INTERNAL TO THIS FILE ONLY

DATA_AREA       segment XDATA
PROG_S          segment CODE
RSEG            DATA_AREA MESINP:         DS      01H     ;MESSAGE INPROCESS FLAGS
                ; DONE FLAGS MUST BE 10H*INPROCESS FLAGS ; NOTE INPORCESS FLAGS ARE 1ST NIBBLE
LONINP          EQU     01H     ;LONGITUDE DATA COMMING IN
LATINP          EQU     02H     ;LATITUDE DATA COMMING IN
STSINP          EQU     04H     ;STATUS DATA COMMING IN ; NOTE DONE FLAGS ARE ONLY 2ND NIBBLE
LONDIN          EQU     10H*LONINP      ;LONGITUDE DATA COMPLETE
LATDIN          EQU     10H*LATINP      ;LATITUDE DATA COMPLETE
STSDIN          EQU     10H*STSINP      ;STATUS DATA COMPLETE

LORIPT:         DS      02H     ;LORAN RECEIVE INPUT POINTER

LORNCH:         DS      01H     ;NUMBER OF CHARACTORS TO READ

FILOLN          EQU     03H     ;LENGTH OF FILO BUFFER

FILODT:         DS      FILOLN  ;FIRST IN LAST OUT BUFFER
```

```
;       ****************************************
;       ****************************************
;       * *                                  * *
;       * *          E Q U A T E S           * *
;       * *                                  * *
;       ****************************************
;       ****************************************
;

;       FOR MESINP FLAGS SEE DATA ABOVE

VLRRTO      EQU       04                ;REINITIALIZE AFTER > 1/2 SECOND $EJECT
;

;       ****************************************
;       ****************************************
;       * *                                  * *
;       * *          T A B L E S             * *
;       * *                                  * *
;       ****************************************
;       ****************************************

RSEG    PROG_S

; The following tables are trigger compare tables for Loran
; receiver inputs, they must be backwards from how received:

LATTRG:     DB        'TAL'

LONTRG:     DB        'NOL'

STSTRG:     DB        'NRW'

;       ****************************************
;       ****************************************
;       * *                                  * *
;       * *          P R O G R A M           * *
;       * *                                  * *
;       ****************************************
;       ****************************************

LORHAN:

;       CHECK FOR MESSAGE FROM LORAN

MOV       DPTR,#MESINP      ;SEE IF MSG COMPL. FROM LORAN
            MOVX      A,@DPTR
            ANL       A,#LONDIN+LATDIN+STSDIN   ;CHECK FOR BOTH LAT. LON. AND STATU
            CJNE      A,#LONDIN+LATDIN+STSDIN,CHKRAD
            CPL       A                 ;GOT THEM SO CLEAR
            MOV       R2,A
            MOVX      A,@DPTR
            ANL       A,R2
            MOVX      @DPTR,A           ; AND SAVE

MOV       DPTR,#SLFFLG      ;CLEAR SELFTEST FLAG
            MOV       A,#NOLRLT         ; FOR LORAN
            ORL       A,#NOLRRD         ; NOT RECEIVED
            CPL       A
            MOV       R7,A
            MOVX      A,@DPTR
            ANL       A,1FH
            MOVX      @DPTR,A

;       REBUFFER DATA FOR REST OF MODULES
            ;LONGITUDE

MOV       DPTR,#PLNBUF      ;GET START OF DESTINY
            MOV       R0,DPL
            MOV       R2,DPH
            MOV       DPTR,#TLNBUF      ;GET START OF SOURCE
```

```
            MOV     R7,#PLNLEN         ;GET LENGTH
            CALL    TRNDAT             ;TRANSFER DATA

;LATITUDE

MOV     DPTR,#PLTBUF       ;GET START OF DESTINY
            MOV     R0,DPL
            MOV     R2,DPH
            MOV     DPTR,#TLTBUF       ;GET START OF SOURCE
            MOV     R7,#PLTLEN         ;GET LENGTH
            CALL    TRNDAT             ;TRANSFER DATA

;           TIME TO SEND MESSAGES TO RADIO

CHKRAD:
            MOV     DPTR,#VTRCNT       ;FIRST CHECK TO SEE IF DISABLED
            MOVX    A,@DPTR
            MOV     R3,A               ;  SAVE
            JZ      CHKLAP             ;  DISABLED GO CHECK LAPTOP

MOV     DPTR,#TTRCNT       ;TIMER EXPIRED?
            MOVX    A,@DPTR
            ANL     PSW,#18H           ;  CLEAR CARRY ETC
            DA      A                  ;  DECIMAL ADJUST
            MOVX    @DPTR,A
            JNZ     CHKLAP             ;  NO CONTINUE
            MOV     A,R3
            MOVX    @DPTR,A            ;  RESET TIMER

MOV     A,#TRUE
            MOV     DPTR,#LRTRDF       ;SET FLAG FOR MESSAGE TO RADIO
            MOVX    @DPTR,A

;           SEE IF MESSAGE TO LAP TOP COMPUTER
CHKLAP:
            MOV     DPTR,#VLRCNT       ;FIRST CHECK TO SEE IF DISABLED
            MOVX    A,@DPTR
            MOV     R3,A               ;  SAVE
            JZ      INPCHK             ;  DISABLED GO CHECK LAPTOP

MOV     DPTR,#TLRCNT       ;TIMER EXPIRED?
            MOVX    A,@DPTR
            ANL     PSW,#18H           ;  CLEAR CARRY ETC
            DA      A                  ;  DECIMAL ADJUST
            MOVX    @DPTR,A
            JNZ     INPCHK             ;  NO CONTINUE
            MOV     A,R3
            MOVX    @DPTR,A            ;  RESET TIMER

MOV     A,#TRUE
            MOV     DPTR,#LRTLTF       ;SET FLAG FOR MESSAGE TO LAP TOP
            MOVX    @DPTR,A

INPCHK:
        ;   CHECK TO SEE IF INPROCESS TO LONG

MOV     DPTR,#MESINP       ; SEE IF INPROCESS
            MOVX    A,@DPTR
            ANL     A,#LATINP+LONINP+STSINP  ;LOOK AT LAT, LON & STATUS
            JZ      LOREXT             ; NOT INPROCESS EXIT

MOV     DPTR,#TLRRTO       ;SEE IF INPROCESS TIMER HAS
            MOVX    A,@DPTR            ; EXPIRED
            JNZ     LOREXT             ; NO EXIT

CALL    LRINL3             ; REINITIALIZE LORAN RECEIVER
                                       ; HANDLER INPUT
LOREXT:
            RET $EJECT
```

```
;       **********************************************
;       **********************************************
;       * *                                       * *
;       * *          I N I T I A I Z A T I O N    * *
;       * *                                       * *
;       **********************************************
;       **********************************************

;This is the initialization routine for this module.  It is
; called once by the Initialization or Selftest module, and is called
; internally by this module if the receive lock up during a lat. or
; a lon. input.  This module  Sets up the CPU UART and timer as well
; as clears the MESINP flags.

;The following is for the initialization of the serial port used
; for transmitting to the Computer.  It is initialized, and enabled.

;***********************************
;Baud Rate  -   9600
;Start Bits -   1
;Data Bits  -   8
;Stop Bits  -   2
;Parity     -   None
;***********************************

LORINL:
        MOV     A,#'9'
        MOV     R7,#PLNLEN      ; GET LONGITUDE LENGTH
        MOV     DPTR,#PLNBUF    ;FILL WITH '9''S
LRINL1:
        MOVX    @DPTR,A         ; SAVE
        INC     DPTR
        DJNZ    R7,LRINL1       ; LOOP UNTIL DONE

MOV     R7,#PLTLEN      ; GET LATITUDE LENGTH
        MOV     DPTR,#PLTBUF    ;FILL WITH '9''S
LRINL2:
        MOVX    @DPTR,A         ; SAVE
        INC     DPTR
        DJNZ    R7,LRINL2       ; LOOP UNTIL DONE
LRINL3:
        MOV     DPTR,#MESINP    ; CLEAR INPROCESS FLAGS
        CLR     A
        MOVX    @DPTR,A

RET                     ;EXIT INITIALIZATION $EJECT

;       **********************************************
;       **********************************************
;       * *                                       * *
;       * *          S U B R O U T I N E S        * *
;       * *                                       * *
;       **********************************************
;       **********************************************

;This subroutine transfers the data at the DPTR to the destiny in R0,R2
; for the length found in R7.

TRNDAT:
        MOVX    A,@DPTR         ;GET SOURCE
        INC     DPTR            ; GO TO NEXT DATA
        MOV     R1,DPL          ;SAVE SOURCE
        MOV     R3,DPH
        MOV     DPL,R0          ;RETREIVE DESTINY
        MOV     DPH,R2
        MOVX    @DPTR,A         ;SAVE DATA
        INC     DPTR
        MOV     R0,DPL          ;SAVE DESTINY
        MOV     R2,DPH
        MOV     DPL,R1
```

```
            MOV     DPH,R3              ;RETRIEVE SOURCE
            DJNZ    R7,TRNDAT           ; LOOP UNTIL DONE
            RET                         ;EXIT SUBROUTINE

;This subroutine determines if the last R6 number of charactors
; match the trigger value found at the Code address or the DPTR.
; If so Acc = 0, if not Acc = 0FFH FILOCK:
            PUSH    1BH                 ; SAVE R3
            PUSH    DPH                 ; SAVE DPTR
            PUSH    DPL MOV     DPTR,#FILODT        ;GET DATA FROM LAST INTERRUPTS
            MOV     R5,DPH
            MOV     R7,DPL
FILOLP:
            CLR     A
            POP     DPL
            POP     DPH                 ;RESTORE DPTR
            MOVC    A,@A+DPTR           ;GET DATA FROM TABLE
            MOV     R3,A                ; SAVE IN REG 3
            INC     DPTR
            PUSH    DPH                 ; SAVE DPTR
            PUSH    DPL MOV     DPL,R7
            MOV     DPH,R5               ;GET FILO DATA POINTER
            MOVX    A,@DPTR             ; GET FILO DATA
            INC     DPTR
            MOV     R5,DPH
            MOV     R7,DPL

CJNE    A,1BH,FILONE        ;NOT EQUAL GO EXIT

DJNZ    R6,FILOLP
            CLR     A                   ;CLEAR ACC BECAUSE IT IS EQUAL
            JMP     FILOXT              ; AND EXIT
FILONE:
            MOV     A,#0FFH             ;SET ACC NOT EQUAL
FILOXT:
            POP     DPL
            POP     DPH                 ;RESTORE DPTR
            POP     1BH                 ; RESTORE R3

RET                         ;EXIT SUBROUTINE $EJECT

;           ************************************
;           ************************************
;           * *                              * *
;           * *     INTERRUPT   HANDLER      * *
;           * *                              * *
;           ************************************
;           ************************************
;

; This interrupt handler handles the data comming into
; the CPU from the Loran Receiver.

LORRIN:
            CLR     EA                  ;DISABLE INTERRUPTS
            PUSH    PSW                 ;SAVE PROGRAM STATUS WORD
            PUSH    ACC                 ;SAVE ACCUMULATOR
            PUSH    DPH                 ;SAVE DPTR
            PUSH    DPL
            PUSH    1FH                 ;SAVE R7
            PUSH    1EH                 ;SAVE R6
            PUSH    1DH                 ;SAVE R5
            PUSH    1CH                 ;SAVE R4
```

```
            MOV     DPTR,#LRRCNT        ;INC COUNT
            MOVX    A,@DPTR             ;FOR INTERRUPTS
            INC     A
            MOVX    @DPTR,A

;SEE IF RECEIVE OR TRANSMIT INTERRUPT

JB      RI,LORRN1           ;CONTINUE IF RECEIVE INTERRUPT
            JMP     LORRXT

LORRN1:

;       READ DATA AND PUT IN FIRST IN LAST OUT BUFFER

MOV     DPTR,#FILODT        ;GET FILO 3 POS BUFFER
            MOV     A,SBUF              ;GET COM PORT DATA
            MOV     R5,A                ; AND SAVE FOR LATER
            MOV     R7,A                ; AND SAVE FOR FILO BUFFER
            MOV     R6,#FILOLN          ;GET NUMBER OF CHARACTERS IN BUFFER
FILOFL:
            MOVX    A,@DPTR             ;GET DATA IN FIRST POSITION
            MOV     R4,A                ; SAVE
            MOV     A,R7                ;GET NEW DATA
            MOVX    @DPTR,A             ;SAVE
            MOV     1FH,R4              ; PUT DATA FROM R4 IN TO R7
            INC     DPTR
            DJNZ    R6,FILOFL           ;CONTINUE FOR WHOLE BUFFER

;       CHECK TO SEE IF A MESSAGE IS ALREADY IN PROCESS

MOV     DPTR,#MESINP        ;MESSAGE IN PROCESS
            MOVX    A,@DPTR
            ANL     A,#LATINP+LONINP+STSINP   ; CHECK LAT LON AND STATUS
            JZ      LATCHK              ; NO GO CHECK TO SEE IF COMMING

;       THE FOLLOWING READS IN THE DATA FOR A MESSAGE INPROCESS

MOV     A,R5                ;GET DATA, IS IT A SPACE
            CJNE    A,#' ',DATSAV       ; NO GO SAVE DATA
            JMP     LORRXT              ; YES EXIT
DATSAV:
            MOV     DPTR,#LORIPT        ;GET DATA POINTER
            MOVX    A,@DPTR             ; GET DPH
            MOV     R7,A                ; SAVE
            INC     DPTR                ; GET DPL
            MOVX    A,@DPTR
            MOV     DPL,A
            MOV     DPH,R7              ;SET UP DPTR

MOV     A,R5                ;STORE DATA
            MOVX    @DPTR,A

INC     DPTR                ;INC. POINTER AND STORE
            MOV     R7,DPL
            MOV     A,DPH
            MOV     DPTR,#LORIPT        ; SAVE
            MOVX    @DPTR,A
            MOV     A,R7
            INC     DPTR
            MOVX    @DPTR,A

MOV     DPTR,#LORNCH        ;NUMBER OF CHARACTORS = 0
            MOVX    A,@DPTR             ; AFTER DEC.
            DEC     A
            MOVX    @DPTR,A

JNZ     LORRXT              ; NO CONTINUE

MOV     DPTR,#MESINP        ;GET WHICH MESSAGE IT IS
            MOVX    A,@DPTR
            ANL     A,#0F0H             ;SAVE ANY DONE FLAGS
            MOV     R7,A                ; IN R7
```

```
            MOVX    A,@DPTR          ;GET FLAGS AGAIN
            ANL     A,#0FH           ;SAVE ONLY INPROCESS FLAGS
            SWAP    A
            ORL     A,R7             ; GET ALL FLAGS
            MOVX    @DPTR,A          ; AND SAVE

JMP     LORRXT           ; EXIT MODULE

;       CHECK TO SEE IF A MESSAGE IS IN

LATCHK:
            MOV     DPTR,#LATTRG     ; GET LATIUDE TRIGGER
            MOV     R6,#FILOLN       ;GET NUMBER OF CHARACTERS TO COMPARE
            CALL    FILOCK           ; CHECK TO SEE IF LATTIUDE
            JNZ     LONCHK

;       IS LATITUDE MESSAGE SET FLAGS AND EXIT

MOV     R5,#LATINP       ;GET LATITUDE IN PROCESS MSG.
            MOV     R7,#PLTLEN       ;GET MESSAGE LENGTH
            MOV     DPTR,#TLTBUF     ;GET POINTER FOR OUTPUT
            JMP     CHKEXT           ; GO QUIT

LONCHK:
            MOV     DPTR,#LONTRG     ; GET LONGITUDE TRIGGER
            MOV     R6,#FILOLN       ;GET NUMBER OF CHARACTERS TO COMPARE
            CALL    FILOCK           ; CHECK TO SEE IF LATTIUDE
            JNZ     STSCHK           ; NO GO CHECK STATUS

;       IS LONGITUDE MESSAGE SET FLAGS AND EXIT

MOV     R5,#LONINP       ;GET LONGITUDE IN PROCESS MSG.
            MOV     R7,#PLNLEN       ;GET MESSAGE LENGTH
            MOV     DPTR,#TLNBUF     ;GET POINTER FOR OUTPUT
            JMP     CHKEXT           ; GO QUIT

STSCHK:
            MOV     DPTR,#STSTRG     ; GET STATUS TRIGGER
            MOV     R6,#FILOLN       ;GET NUMBER OF CHARACTERS TO COMPARE
            CALL    FILOCK           ; CHECK TO SEE IF STATUS
            JNZ     LORRXT           ; NO GO EXIT

;       IF STATUS GO SET FLAGS AND EXIT

MOV     R5,#STSINP       ;GET STATUS IN PROCESS MSG.
            MOV     R7,#STSLEN       ;GET MESSAGE LENGTH
            MOV     DPTR,#STSBUF     ;GET POINTER FOR OUTPUTI

CHKEXT:
            MOV     R6,DPL           ;SAVE DPTR
            MOV     A,DPH
            MOV     DPTR,#LORIPT     ; IN LORAN INPUT POINTER
            MOVX    @DPTR,A
            INC     DPTR
            MOV     A,R6
            MOVX    @DPTR,A

MOV     DPTR,#LORNCH     ;STORE # OF CHAR. IN CHAR BUFFER
            MOV     A,R7
            MOVX    @DPTR,A

MOV     DPTR,#MESINP     ;SET MESSAGE INPROCESS
            MOVX    A,@DPTR
            ORL     A,R5
            MOVX    @DPTR,A
TIMSET:
            MOV     DPTR,#TLRRTO     ;SET LORAN GOOD MESSAGE TIMER
            MOV     A,#VLRRTO
            MOVX    @DPTR,A

LORRXT:
            CLR     RI               ;CLEAR RECEIVE INTERRUPT
```

```
            CLR     TI                      ;CLEAR TRANSMIT INTERRUPT IF ANY

SETB    EA                      ;ENABLE INTERRUPTS

POP     1CH                     ;RESTORE R4
            POP     1DH                     ;RESTORE R5
            POP     1EH                     ;RESTORE R6
            POP     1FH                     ;RESTORE R7
            POP     DPL
            POP     DPH                     ;RESTORE DPTR
            POP     ACC                     ;RESTORE ACCUMULATOR
            POP     PSW                     ;RESTORE PROGRAM STATUS WORD
           ·SETB    EA                      ;ENABLE INTERRUPTS

RETI

END $TITLE   (ALTHAN 8052 BASED)
NAME ALTHAN

;ORIGIONAL RELEASE 12 JAN 90   VERSION A001
;LAST MODIFIED 02 FEB 90   10:49

;VA001 12 JAN 90

;Basic Description of Module

; +note+  This module and the label ALTLEN must change if the number
;         ALTLEN is changed from 3.
;
;  This module gets the 9 bit input from the Altimeter multiplys it times
;  3 to and adds to the base of the table to get the 3 digit ASCII code in
;  the table ALTTAB. It then puts the three digit ASCII code in the buffer
;  ALTTUD for use by other modules.

;            ****************************************
;            ****************************************
;            * *                                  * *
;            * *            P U B L I C S         * *
;            * *                                  * *
;            ****************************************
;            ****************************************

PUBLIC    ALTHAN                    ;Input to this module $EJECT
;            ****************************************
;            ****************************************
;            * *                                  * *
;            * *          E X T E R N A L S       * *
;            * *                                  * *
;            ****************************************
;            ****************************************
;

EXTRN XDATA (ALTBUF)        ;ADDRESS FOR ALTITUDE
EXTRN XDATA (ALTINH)        ;ALTIMTER INHIBIT

EXTRN NUMBER (PORTA1,PORTB1) ;ALTITUDE INPUTS
EXTRN NUMBER (ALT9IN)        ;9 INPUT ALTIMETER
;
;            ****************************************
;            ****************************************
;            * *                                  * *
;            * *            M A C R O S           * *
;            * *                                  * *
;            ****************************************
;            ****************************************

;  DEFINE BYTE WITH LISTING
```

```
%*DEFINE (DBE (CODEDATA)) (

DB      %CODEDATA
     )

$EJECT
;              ******************************************
;              ******************************************
;              * *                                    * *
;              * *         ALTITUDE TABLE             * *
;              * *                                    * *
;              ******************************************
;              ******************************************

PROG_S      segment         CODE
RSEG PROG_S

ALTTAB:
            %DBE        ('998998-10998-08998-09998998-03-05-04')
            %DBE        ('-07998-06998998007005006003998004998')
            %DBE        ('998-02000-01002998001998998027025026')
            %DBE        ('023998024998998018020019022998021998')
            %DBE        ('998008010009012998011998998017015016')
            %DBE        ('013998014998998067065066063998064998')
            %DBE        ('998058060059062998061998998048050049')
            %DBE        ('052998051998998057055056053998054998')
            %DBE        ('998028030029032998031998998037035036')
            %DBE        ('033998034998998047045046043998044998')
            %DBE        ('998038040039042998041998998147145146')
            %DBE        ('143998144998998138140139142998141998')
            %DBE        ('998128130129132998131998998137135136')
            %DBE        ('133998134998998108110109112998111998')
            %DBE        ('998117115116113998114998998127125126')
            %DBE        ('123998124998998118120119122998121998')
            %DBE        ('998068070069072998071998998077075076')
            %DBE        ('073998074998998087085086083998084998')
            %DBE        ('998078080079082998081998998107105106')
            %DBE        ('103998104998998098100099102998101998')
            %DBE        ('998088090089092998091998998097095096')
            %DBE        ('093998094998998307305306303998304998')
            %DBE        ('998298300299302998301998998288290289')
            %DBE        ('292998291998998297295296293998294998')
            %DBE        ('998268270269272998271998998277275276')
            %DBE        ('273998274998998287285286283998284998')
            %DBE        ('998278280279282998281998998228230229')
            %DBE        ('232998231998998237235236233998234998')
            %DBE        ('998247245246243998244998998238240239')
            %DBE        ('242998241998998267265266263998264998')
            %DBE        ('998258260259262998261998998248250249')
            %DBE        ('252998251998998257255256253998254998')
            %DBE        ('998148150149152998151998998157155156')
            %DBE        ('153998154998998167165166163998164998')
            %DBE        ('998158160159162998161998998187185186')
            %DBE        ('183998184998998178180179182998181998')
            %DBE        ('998168170169172998171998998177175176')
            %DBE        ('173998174998998227225223998224998')
            %DBE        ('998218220219222998221998998208210209')
            %DBE        ('212998211998998217215216213998214998')
            %DBE        ('998188190189192998191998998197195196')
            %DBE        ('193998194998998207205206203998204998')
            %DBE        ('998198200199202998201998998627625626')
            %DBE        ('623998624998998618620619622998621998')
            %DBE        ('998608610609612998611998998617615616')
            %DBE        ('613998614998998588590589592998591998')
            %DBE        ('998597595596593998594998998607605606')
            %DBE        ('603998604998998598600599602998601998')
            %DBE        ('998548550549552998551998998557555556')
            %DBE        ('553998554998998567565566563998564998')
            %DBE        ('998558560559562998561998998587585586')
            %DBE        ('583998584998998578580579582998581998')
            %DBE        ('998568570569572998571998998577575576')
            %DBE        ('573998574998998468470469472998471998')
```

```
    $DBE        ('99847747547647399847499899848774854861')
    $DBE        ('48399848499899847848047948299848119981')
    $DBE        ('99850750550650399850499899849850049991')
    $DBE        ('50299850199899848849048949299849199811')
    $DBE        ('99849749549649399849499899854754554691')
    $DBE        ('54399854499899853854053954299854199811')
    $DBE        ('99852853052953299853199899853753553611')
    $DBE        ('53399853499899850851050951299851199811')
    $DBE        ('99851751551651399851499899852752552611')
    $DBE        ('52399852499899851852051952299852199811')
    $DBE        ('99830831030931299831199899831731531611')
    $DBE        ('31399831499899832732532632399832499811')
    $DBE        ('99831832031932299832199899834734534611')
    $DBE        ('34399834499899833834033934299834199811')
    $DBE        ('99832833032933299833199899833733533611')
    $DBE        ('33399833499899838738538638399838499811')
    $DBE        ('99837838037938299838199899836837036911')
    $DBE        ('37299837199899837737537637399837499811')
    $DBE        ('99834835034935299835199899835735535611')
    $DBE        ('35399835499899836736536636399836499811')
    $DBE        ('99835836035936299836199899846746546611')
    $DBE        ('46399846499899845846045946299846199811')
    $DBE        ('99844845044945299845199899845745545611')
    $DBE        ('45399845499899842843042943299843199811')
    $DBE        ('99843743543643399843499899844744544611')
    $DBE        ('44399844499899843844043944299844199811')
    $DBE        ('99838839038939299839199899839739539611')
    $DBE        ('39399839499899840740540640399840499811')
    $DBE        ('99839840039940299840199899842742542611')
    $DBE        ('42399842499899841842041942299842199811')
    $DBE        ('99840841040941299841199899841741541611')
    $DBE        ('413998414998')
```

$EJECT

```
;       ****************************************
;       ****************************************
;       * *                                  * *
;       * *        P R O G R A M             * *
;       * *                                  * *
;       ****************************************
;       ****************************************
```

;The following gets the 11 bit input from the altimeter and puts
; it in the registers R6 and R7. The most significant bit is bit 2
; of R6 in desending order, the eight in descending order in R7.

ALTHAN:
        ;SEE IF ALTIMETER INHIBIT IS ON

MOV     DPTR,#ALTINH            ;GET ALTIMETER INHIBIT FLAG
        MOVX    A,@DPTR
        JZ      ALTHN1                  ; NO CONTINUE
        JMP     ALTEXT

;THE FOLLOWING READS AND FORMATS THE ALTIMETER INPUTS
ALTHN1:
        MOV     DPTR,#PORTA1            ;GET PORT A1  FOR MOST SIG
        MOVX    A,@DPTR                 ; INPUTS
        CPL     A                       ; INVERT
        MOV     R6,A

MOV     DPTR,#PORTB1            ;GET PORT B1 FOR REST
        MOVX    A,@DPTR
        CPL     A                       ; INVERT
        MOV     R7,A

; THE FOLLOWING CONDITIONS THE DATA

MOV     A,R6                    ;GET MSB PART OF INPUT
        ANL     A,#ALT9IN               ;GET USED BITS
        MOV     R6,A                    ; AND SAVE

```
        JZ      GET_DATA                ;CONTINUE IF TOTAL # <1024

MOV     R5,#'9'                 ;SET ERROR CODE '999'
        MOV     R6,#'9'
        MOV     R7,#'9'
        JMP     STORE_DATA              ; GO SEND ERROR

; The following checks adds R6 + R7 to DPL three times, then gets
; the 3 digit altitude from the table and stores it in the buffer ALTTUD.

GET_DATA:
        MOV     DPTR,#ALTTAB            ; GET TABLE ADDRESS
        MOV     R3,#3                   ;GET HOW MANY TIMES TO REPEAT
GET_DAT1:
        MOV     A,R7                    ;GET LEAST SIG PART OF ADDRESS
        ADD     A,DPL
        MOV     DPL,A                   ; ADD AND STORE

MOV     A,R6                    ;GET NEXT MOST SIG DIGIT
        ADDC    A,DPH                   ; AND ADD W/CARRY TO DPH
        MOV     DPH,A

DJNZ    R3,GET_DAT1             ;ADD THREE TIMES TO LOOP

CLR     A
        MOVC    A,@A+DPTR               ;GET MOST SIG DIGIT
        MOV     R5,A                    ; AND SAVE

INC     DPTR
        CLR     A
        MOVC    A,@A+DPTR               ;GET MIDDLE DIGIT
        MOV     R6,A                    ; AND SAVE

INC     DPTR
        CLR     A
        MOVC    A,@A+DPTR               ;GET LEAST SIG DIGIT
        MOV     R7,A                    ; AND SAVE

STORE_DATA:
        ;THE FOLLOWING STORES THE DATA FOR THE RADIO AND
        ; THE LAP TOP COMPUTER

MOV     DPTR,#ALTBUF            ;GET OUTPUT ADDRESS
        MOV     A,R5                    ;GET MOST SIG DIGIT
        MOVX    @DPTR,A                 ; OUTPUT

INC     DPTR                    ; GET NEXT ADDRESS
        MOV     A,R6                    ;GET MOST SIG DIGIT
        MOVX    @DPTR,A                 ; OUTPUT

INC     DPTR
        MOV     A,R7                    ;GET MOST SIG DIGIT
        MOVX    @DPTR,A                 ; OUTPUT

ALTEXT:
        RET                             ; EXIT MODULE
        END $TITLE  (LAPHAN 8052 BASED)
NAME LAPHAN

;VA001 ORIGIONAL RELEASE
;STARTED  16 OCT 89

;LAST CHANGE  VA005 21 MAY 90  16:13

;VA002   14 FEB 90   ADDED LORAN STATUS
;                    CHANGED RESET
;VA003   23 FEB 90   CHANGED LORAN METHOD OF UPDATE
;VA004   15 MAY 90   ADDED RECEIVE LED
;                    RESET TRANSMIT TIMER WHEN RECEIVE
;VA005   21 MAY 90   CHANGED RESET MESSAGE
```

```
;Basic Description of Module
;
;   MESSAGES IN:

;This module will interface with the Lap Top Computer, both transmit
; and receive.  When LAPCOM is called it will put the charactor in the
; ACC in the transmit buffer and begin transmitting if not already
; transmitting.  If a reset message "R" is received from the computer,
; this module will set the NWDRST flag which will cause the watchdog
; to expire and reset the system.  If a Time message "T" is received
; the VTMCNT value for the TIMCNT counter will be adjusted.  This counter
; reflects how many counts must expire before the location data goes to
; the radio and to the Lap Top computer.  This module will be responsible
; for generating the # message to the Computer.  This message will be sent
; just after initialization.

;   MESSAGES OUT:
;
;  From Loran Receiver:

; This module will monitor the flag LATOFT to see if a message is to go to
; the Lap Top Computer, then it will send the start bracket and the message
; found at AIRCID, PLTBUF, PLNBUF, ALTBUF, Data-V-Com flags and Loran Status
; insert the spaces and then send the check sum and End Bracket.

;   From Radio:

; This module will monitor the RDTLTF flag when it is set it will send the
; message found at RDTLTB and add a carriage return.

$EJECT

;            ******************************************
;            ******************************************
;            * *                                    * *
;            * *            P U B L I C S           * *
;            * *                                    * *
;            ******************************************
;            ******************************************

PUBLIC      LAPHAN       ;INPUT TO THIS MODULE
PUBLIC      LAPINL       ;INITIALIZATION OF MODULE
PUBLIC      LAPRIN       ;RECEIVE INTERRUPT HANDLER
PUBLIC      LAPTIN       ;TRANSMIT INTERRUPT HANDLER $EJECT
;            ******************************************
;            ******************************************
;            * *                                    * *
;            * *          E X T E R N A L S         * *
;            * *                                    * *
;            ******************************************
;            ******************************************

EXTRN CODE    (PRTCOM)              ;SEND TO PRINTER

EXTRN NUMBER  (LAPSTS,LAPDAT)       ;USART STATUS AND DATA
EXTRN NUMBER  (RECVON,RECVOF)       ;COMMAND INSTRUCTIONS
EXTRN NUMBER  (TRANON,TRANOF)       ;FOR RECEIVE AND TRANSMIT
EXTRN NUMBER  (RXRDY)               ;RECEIVE READY
EXTRN NUMBER  (TXRDY,TXEMPT)        ;TRANSMIT READY/EMPTY

EXTRN XDATA   (LAPRCT)              ;RECEIVE INTERRUPT COUNT
EXTRN XDATA   (LAPTCT)              ;TRANSMIT INTERRUPT COUNTER

EXTRN XDATA   (RERUNA)              ;RESET AND RERUN
EXTRN NUMBER  (RERUNV)              ; RESET VALUE
EXTRN XDATA   (NWDRST)              ;IGNORE WATCH DOG RESET

EXTRN XDATA   (TLPRTO)              ;RECEIVE TIMEOUT TIMER
EXTRN XDATA   (TLPART)              ;UART REFRESH TIMER
```

```
EXTRN XDATA   (VTRCNT)              ;VALUE FOR MESSAGE WAIT TIMER (RADIO)
EXTRN XDATA   (TTRCNT)              ;MESSAGE COUNTER BUFFER (RADIO)

EXTRN XDATA   (VLRCNT)              ;VALUE FOR MESSAGE WAIT TIMER (LAP TOP)
EXTRN XDATA   (TLRCNT)              ;MESSAGE COUNTER BUFFER (LAP TOP)

EXTRN NUMBER  (LAPMIF)              ; MODE INSTRUCTION FORMAT
EXTRN NUMBER  (TRSRES)              ;SOFTWARE RESET

;     LORAN RECEIVER INTERFACE

EXTRN XDATA   (LRTLTF)              ;DATA READY FOR LAP TOP COMPUTER
EXTRN XDATA   (PLTBUF,PLNBUF)       ;LATTITUDE AND LONGITUDE BUFFERS
EXTRN NUMBER  (PLTLEN,PLNLEN)       ;LATTITUDE AND LONGITUDE LENGTH
EXTRN XDATA   (STSBUF)              ;LORAN STATUS BUFFER
EXTRN NUMBER  (STSLEN)              ;LORAN STATUS BUFFER LENGTH

;     ALTIMETER INTERFACE

EXTRN XDATA (ALTBUF)                ;ALTIMETER DATA
EXTRN NUMBER (ALTLEN)               ;ALTIMETER DATA LENGTH

;       SPACES FOR RADIO AND LORAN MESSAGE

EXTRN NUMBER (LATSPC)

;       RADIO INTERFACE

EXTRN XDATA (RDTLTF,RDTLTB,RDTLTE)

;     # MESSAGE DEFINITION

EXTRN XDATA (AIRCID)                ;AIRCRAFT ID IN NONVOLATILE RAM
EXTRN NUMBER (AIRIDN)               ;LENGTH OF AIRCRAFT ID
EXTRN NUMBER (RSTSPC)               ;NUMBER OF SPACES FOR RESET MESSAGE
EXTRN NUMBER (MSGTOT)               ;MESSAGE LENGTH

;       SELFTEST INTERFACE

EXTRN XDATA (SLFFLG)                ;SELFTEST FLAG

EXTRN NUMBER (NOLRLT)               ;NO LORAN UPDATE FOR LAPTOP
EXTRN NUMBER (TRRDST)               ;NOT TRANSMITTED TO RADIO
EXTRN NUMBER (TRLTST)               ;NOT TRANSMITTED TO LAPTOP
EXTRN NUMBER (OUTFLG)               ;NOT ACCEPTING OTHER AIRCRAFT MSG'S

EXTRN XDATA  (TRCLED)               ;RECEIVE TIME ON

;       MISC.
EXTRN NUMBER (CR)
EXTRN NUMBER (ENDBRK)               ;END BRACKET
EXTRN NUMBER (STTBRK)               ;START BRACKET
;
;               *****************************************
;               *****************************************
;               * *                                   * *
;               * *           D  A  T  A              * *
;               * *                                   * *
;               *****************************************
;               *****************************************

;THIS IS DATA USED INTERNAL TO THIS FILE ONLY

DATA_AREA       segment XDATA
PROG_S           segment CODE
RSEG            DATA_AREA XTODPO:         DS      2           ;OUTPUT POINTER FOR BUFFER
XTODPI:         DS      2           ;INPUT POINTER FOR BUFFER

CHKDPI:         DS      2           ;CHECK SUM POINTER

XTODBF:         DS      500         ;DATA BUFFER FOR BUFFER
XTDEND:         DS      1           ;END OF BUFFER
```

```
RFMDPT:         DS  2           ;RECEIVE POINTER FROM LAP TOP

LTTDVB:         DS  4           ;MESSAGE BUFFER FROM LAP TOP COMPUTER
LTTDVE:         DS  1           ;ENT OF LAPTOP BUFFER

RCVINP:         DS  1           ;PROPER RECEIVE MESSAGE BEGUN

TRNINP:         DS  1           ;TRANSMIT IN PROCESS

RSTMSG:         DS  1           ;RESET OR LP MESSAGE SENT

RDDCMN:         DS  1           ;LAST USART COMMAND
```

```
;               *****************************************
;               *****************************************
;               * *                                   * *
;               * *          E Q U A T E S            * *
;               * *                                   * *
;               *****************************************
;               *****************************************
;

VRFDTO      EQU     12          ;REINITIALIZE AFTER 3 SECONDS
VDUART      EQU     8           ;USART REFRESH TIMER

VRCLED      EQU     04          ;RECEIVE LED ON TIME $EJECT
;               *****************************************
;               *****************************************
;               * *                                   * *
;               * *            M A C R O S            * *
;               * *                                   * *
;               *****************************************
;               *****************************************

;JUMP (LONG JUMP) IF A> CDATA

%*DEFINE (JAG (CDATA,DEST))LOCAL LABEL(
        PUSH    ACC
        CLR     C
        SUBB    A,#%CDATA
        JZ      %LABEL
        JC      %LABEL
        POP     ACC
        JMP     %DEST
%LABEL:
        POP     ACC
        )

$EJECT
;               *****************************************
;               *****************************************
;               * *                                   * *
;               * *           P R O G R A M           * *
;               * *                                   * *
;               *****************************************
;               *****************************************

RSEG    PROG_S

LAPHAN:

;THE FOLLOWING IS TO REFRESH BAUD RATE IF NESCESSARY

MOV     DPTR,#TRNINP    ;TRANSMIT IN PROCESS
        MOVX    A,@DPTR         ;
        JZ      REFREC          ; NO GO REFRESH RECEIVE

MOV     DPTR,#LAPSTS    ;GET STATUS
```

```
        MOVX    A,@DPTR             ;TX EMPTY
        ANL     A,#TXEMPT
        JNZ     REFREC              ; NO CONTINUE

MOV     DPTR,#RDDCMN        ;GET PAST STATUS
        MOVX    A,@DPTR
        ORL     A,#TRANON
        MOVX    @DPTR,A
        MOV     DPTR,#LAPSTS        ;REFRESH USART
        MOVX    @DPTR,A             ;

REFREC:
        ;SEE IF NEED TO REFRESH USART

MOV     DPTR,#TLPRTO        ;HAS MESSAGE TIMED OUT
        MOVX    A,@DPTR             ;
        JNZ     LAPLBM              ; NO CONTINUE

MOV     DPTR,#RCVINP        ;RECEIVE IN PROCESS
        MOVX    @DPTR,A
        JZ      LAPLBM              ; NO CONTINUE

MOV     DPTR,#RDDCMN        ;GET PAST STATUS
        MOVX    A,@DPTR
        ORL     A,#RECVON
        MOVX    @DPTR,A

MOV     DPTR,#LAPSTS        ;REFRESH RECEIVE
        MOVX    @DPTR,A             ;

CALL    LPRINL              ;REINITIALIZE

LAPLBM:
        ;SEE IF RESET OR # MESSAGE NEEDS TO GO OUT

MOV     DPTR,#RERUNA        ;GET RERUN ADDRESS
        MOVX    A,@DPTR
        CJNE    A,#RERUNV,LAPLOR    ; NOT READY

MOV     DPTR,#RSTMSG        ;FLAG SET MESSAGE HAS GONE OUT
        MOVX    A,@DPTR
        JNZ     LAPLOR
        CPL     A                   ;MAKE ACC FF
        MOVX    @DPTR,A             ; SET RESET MESSAGE FLAG
        CALL    RSTOUT              ; SEND OUT RESET MESSAGE

;THE FOLLOWING CHECKS TO SEE IF MESSAGES ARE READY TO
        ; GO TO THE LAP TOP COMPUTER.

LAPLOR:

CLR     EA                  ;DISABLE INTERRUPTS

MOV     DPTR,#LRTLTF        ;MESSAGE FROM LORAN RECEIVER
        MOVX    A,@DPTR
        JZ      LAPRAD

CLR     A
        MOVX    @DPTR,A             ; YES CLEAR FLAG

MOV     DPTR,#XTODPI        ;SAVE POINTER FOR CHECKSUM
        MOVX    A,@DPTR
        MOV     R0,A                ;
        INC     DPTR
        MOVX    A,@DPTR
        MOV     R3,A

MOV     A,#STTBRK           ;SEND START BRACKET
        CALL    LAPCOM

MOV     DPTR,#AIRCID        ;GET AIRCRAFT ID LOCATION
        MOV     R7,#AIRIDN          ;GET NUMBER OF DIGITS IN AIRCRAFT ID
        CALL    R7DOUT              ;OUTPUT THE AIRCRAFT ID.
```

```
           MOV     DPTR,#PLTBUF      ;GET THE LATITUDE
           MOV     R7,#PLTLEN        ;GET LENGTH FOR LATITUDE
           CALL    R7DOUT            ;OUTPUT THE LATITUDE

MOV     DPTR,#PLNBUF      ;GET THE LONGITUDE
           MOV     R7,#PLNLEN        ;GET LENGTH FOR LONGITUDE
           CALL    R7DOUT            ;OUTPUT THE LONGITUDE

MOV     DPTR,#ALTBUF      ;GET ALTITUDE BUFFER
           MOV     R7,#ALTLEN        ;GET ALTITUDE LENGTH
           CALL    R7DOUT            ;OUTPUT THE ALTITUDE

MOV     DPTR,#SLFFLG      ;GET SELFTEST FLAG
           MOVX    A,@DPTR
           CALL    HEXOUT            ; OUTPUT

MOVX    A,@DPTR           ;GET SELFTEST FLAGS
           ORL     A,#NOLRLT         ;SET NO LORAN UPDATE
           ORL     A,#TRRDST         ;SET NO MESSAGE TO RADIO
           MOV     R7,A              ;SAVE

MOV     A,#TRLTST         ;CLEAR MSG. SENT LAT TOP
           CPL     A
           ANL     A,1FH
           MOVX    @DPTR,A

MOV     DPTR,#STSBUF      ;GET STATUS BUFFER
           MOV     R7,#STSLEN        ;GET LENGTH OF BUFFER
           CALL    LORCON            ;OUTPUT LORAN STATUS

MOV     A,#' '            ;GET A SPACE
           MOV     R7,#LATSPC        ; GET HOW MANY TO OUTPUT
LPLRLP:
           CALL    LAPCOM            ; OUTPUT
           DJNZ    R7,LPLRLP         ; ALL OF THEM

MOV     R5,#MSGTOT-3      ;GET TOTAL LENGTH OF MESSAGE

MOV     DPTR,#XTDEND      ;GET END OF BUFFER
           MOV     R4,DPL            ; AND SAVE
           MOV     R6,DPH

MOV     DPH,R0            ;GET START OF MESSAGE
           MOV     DPL,R3
           CALL    CHKADD            ;ADD CHECKSUM TO ACC
           CALL    HEXOUT            ;PUT IN BUFFER

MOV     A,#ENDBRK         ; OUTPUT CARRIAGE RETURN
           CALL    LAPCOM

LAPRAD:
           SETB    EA                ;ENABLE INTERRUPTS

;MESSAGE FROM RADIO RECEIVER

MOV     DPTR,#RDTLTF      ;MESSAGE FROM LORAN RECEIVER
           MOVX    A,@DPTR
           JZ      LAPEXT
           CLR     A
           MOVX    @DPTR,A           ; YES CLEAR FLAG

MOV     DPTR,#TRCLED      ; SET LED TIMER
           MOV     A,#VRCLED
           MOVX    @DPTR,A

MOV     DPTR,#VTRCNT      ;GET WAIT COUNT
           MOVX    A,@DPTR
           RR      A                 ;DIVIDE BY 2
           MOV     DPTR,#TTRCNT      ; AND RESET OUT
           MOVX    @DPTR,A

MOV     DPTR,#SLFFLG      ;MESSAGES ON
           MOVX    A,@DPTR
```

```
            ANL     A,#OUTFLG
            JNZ     LAPEXT              ; NO CONTINUE

CLR     EA                  ;DISABLE INTERRUPTS

MOV     DPTR,#XTODPI        ;SAVE POINTER FOR CHECKSUM
            MOVX    A,@DPTR
            MOV     R0,A                ;
            INC     DPTR
            MOVX    A,@DPTR
            MOV     R1,A

MOV     A,#STTBRK           ;SEND START BRACKET
            CALL    LAPCOM

MOV     DPTR,#RDTLTE        ;GET END OF MESSAGE
            MOV     R7,DPL              ; AND SAVE

DEC     R7                  ;DON'T GET CHECKSUM

MOV     DPTR,#RDTLTB        ;GET START OF MESSAGE
RADLOP:
            MOVX    A,@DPTR

CALL    LAPCOM              ;OUTPUT TO BUFFER

INC     DPTR
            MOV     A,DPL               ;SEE IF AT END OF MESSAGE
            CJNE    A,1FH,RADLOP        ; NO CONTINUE

MOV     A,#' '              ;GET A SPACE
            MOV     R7,#LATSPC          ; GET HOW MANY TO OUTPUT
LPRDLP:
            CALL    LAPCOM              ; OUTPUT

DJNZ    R7,LPRDLP           ; ALL OF THEM

MOV     R5,#MSGTOT-3        ;GET TOTAL LENGTH OF MESSAGE

MOV     DPTR,#XTDEND        ;GET END OF BUFFER
            MOV     R4,DPL              ; AND SAVE
            MOV     R6,DPH

MOV     DPH,R0              ;GET START OF MESSAGE
            MOV     DPL,R1

CALL    CHKADD              ;ADD CHECKSUM TO ACC
            CALL    HEXOUT              ;PUT IN BUFFER

MOV     A,#ENDBRK           ; OUTPUT CARRIAGE RETURN
            CALL    LAPCOM

LAPEXT:
            SETB    EA                  ;ENABLE INTERRUPTS

MOV     DPTR,#TRCLED        ;RECEIVE LED ON?
            MOVX    A,@DPTR
            SETB    P1.7                ;TURN OFF
            JZ      LAPET0              ; AND LEAVE OFF
            CLR     P1.7                ;  NO TURN ON
LAPET0:
            RET                         ;EXIT THIS MODULE $EJECT

;           ****************************************************
;           ****************************************************
;           * *                                              * *
;           * *        I N I T I A I Z A T I O N             * *
;           * *                                              * *
;           ****************************************************
;           ****************************************************
```

;
; The following is called once by the INIT module.
;
;The following is for the initialization of the serial port used
; for transmitting to the Computer. It is initialized, and enabled.
;************************************
;Baud Rate -   1200
;Start Bits -  1
;Data Bits -   8
;Stop Bits -   2
;Parity    -   None
;************************************

LAPINL:

```
        MOV     DPTR,#SLFFLG         ;SET OUTFLG
        MOVX    A,@DPTR
        ORL     A,#OUTFLG
        MOVX    @DPTR,A              ; WILL NOT TRANSMIT TO OTHER AIRCRAFT

MOV     DPTR,#LAPSTS         ;
        MOV     A,#TRSRES            ;RESET USART
        MOVX    @DPTR,A              ;

MOV     R7,#3FH              ;WAIT A BIT
        DJNZ    R7,$

MOV     A,#LAPMIF            ;SET MODE INSTRUCTION FORMAT
        MOVX    @DPTR,A              ;

MOV     A,#RECVON            ;GET COMMAND INSTRUCTION FORMAT

MOVX    @DPTR,A              ;SET

MOV     DPTR,#RDDCMN         ;SET IN MEMORY
        MOVX    @DPTR,A

MOV     DPTR,#LAPDAT         ;DO A DUMMY READ
        MOVX    A,@DPTR              ;
```

;SET ROTATING BUFFER POINTERS (OUTPUT)

```
        MOV     DPTR,#XTODBF         ;GET START OF BUFFER
        MOV     R4,DPL               ;SAVE LSB
        MOV     R5,DPH               ;SAVE MSB

MOV     DPTR,#XTODPO         ;SET COM. OUT POINTER
        MOV     A,R5                 ;
        MOVX    @DPTR,A              ;SAVE MSB
        INC     DPTR                 ;
        MOV     A,R4                 ;SAVE LSB
        MOVX    @DPTR,A              ;

MOV     DPTR,#XTODPI         ;SET COM. IN POINTER
        MOV     A,R5                 ;
        MOVX    @DPTR,A              ;SAVE MSB
        INC     DPTR                 ;
        MOV     A,R4                 ;SAVE LSB
        MOVX    @DPTR,A              ;
```

;The following sets the input pointer

LPRINL:
```
        MOV     DPTR,#LTTDVB         ; RESET INPUT POINTER
        MOV     R4,DPL               ;
        MOV     A,DPH                ; TO START OF BUFFER
        MOV     R5,A                 ;
        MOV     DPTR,#RFMDPT         ;
        MOVX    @DPTR,A              ;
        INC     DPTR                 ;
        MOV     A,R4                 ;
        MOVX    @DPTR,A              ;
```

```
        MOV     DPTR,#RCVINP        ;CLEAR RECEIVE INPROCESS
        CLR     A
        MOVX    @DPTR,A

RET                         ;EXIT INITIALIZATION $EJECT

;       ****************************************
;       ****************************************
;       * *                                  * *
;       * *    S U B R O U T I N E S         * *
;       * *                                  * *
;       ****************************************
;       ****************************************

;The following subroutine converts the data in the buffer STSBUF of
; length STSLEN and puts the hex characters in the Transmit buffer.

LORCON:
        MOV     R1,#4               ;GET NUMBER OF BITS TO GO OUT
        MOV     R2,#0               ; CLEAR MEMORY
LORCN1:
        MOVX    A,@DPTR             ;GET CHARACTOR
        INC     DPTR
        CJNE    A,#2DH,LORCN2       ;IS FLAG SET
        CLR     C                   ; NO CLEAR
        JMP     LORC2A
LORCN2:
        SETB    C
LORC2A:
        MOV     A,R2
        RLC     A
        MOV     R2,A

DJNZ    R7,LORCN3           ; WHEN DONE EXIT
        DEC     R1
        JMP     LORCN4
LORCN3:
        DJNZ    R1,LORCN1           ; CONTINUE TIL BYTE IS SET

CALL    BINOUT              ;OUTPUT WHEN FULL
        JMP     LORCON              ; AND CONTINUE
LORCN4:
        CLR     C
        RLC     A
        DJNZ    R1,LORCN4           ; CONTINUE TIL BYTE IS SET
        CALL    BINOUT              ;OUTPUT FULL

RET                         ;EXIT SUBROUTINE

;THE FOLLOWING SUBROUTINE ADDS UP THE DATA STARTING AT DPTR FOR
; THE CHECKSUM CALCULATION.

CHKADD:
        MOV     R7,#0               ;CLEAR R7
CHKLOP:
        MOVX    A,@DPTR             ;GET DATA

ADD     A,R7                ;ADD DATA TO CHECKSUM
        MOV     R7,A                ;SAVE

INC     DPTR                ;INC POINTER

MOV     A,DPL

CJNE    A,1CH,CHKL1         ; NOT AT END CONTINUE

MOV     A,DPH               ;NOW CHECK MSB
        CJNE    A,1EH,CHKL1
```

```
CHKL1:  MOV     DPTR,#XTODBF        ;AT END RESET

DJNZ    R5,CHKLOP

MOV     A,R7

RET                         ;EXIT SUBROUTINE

;THE FOLLOWING SUBROUTINE CONVERTS THE DATA IN THE ACC TO ASCII AND
; OUTPUTS IT

HEXOUT:
        PUSH    ACC

SWAP    A                   ;GET MSB
        CALL    BINOUT              ;OUTPUT IT

POP     ACC
        CALL    BINOUT              ;GET LSB
                                    ; AND OUTPUT IT
        RET

;This subroutine take the ACC and converts to ASCII and outputs it
; to the console

BINOUT:
        ANL     A,#0FH              ;STRIP OFF MSB

%JAG    (9,BINOT1)          ;GREATER THAT 9

ORL     A,#30H              ;MAKE ASCII
        JMP     BINOT2              ;CONTINUE
BINOT1:
        ADD     A,#37H              ;MAKE ASCII
BINOT2:
        CALL    LAPCOM              ;OUTPUT TO LAP TOP
        RET                         ;EXIT SUBROUTINE

; This subroutine when called saves all microprocessor pointers
; acc etc. and takes the value that is in the acc. and outputs it
; serialy.

LAPCOM:

PUSH    PSW                 ;SAVE PSW
        PUSH    DPH                 ;SAVE DPTR
        PUSH    DPL                 ;
        PUSH    ACC                 ;SAVE ACC
        PUSH    1CH                 ;R4
        PUSH    1DH                 ;R5
        PUSH    1FH                 ;R7
        PUSH    1EH                 ;R6

MOV     R5,A                ;SAVE DATA

;       PUT IN BUFFER AT POINT POINTED TO BY XTODPI

MOV     DPTR,#XTDEND        ;GET END OF BUFFER
        MOV     R4,DPL              ; AND SAVE
        MOV     R6,DPH

MOV     DPTR,#XTODPI        ;PUT IN BUFFER AT XTODPI
        MOVX    A,@DPTR             ;GET MSB
        MOV     R7,A                ;SAVE
        INC     DPTR                ;
        MOVX    A,@DPTR             ;GET LSB
        MOV     DPL,A               ;AND SAVE
        MOV     DPH,R7              ;SAVE MSB
```

```
NOCONB:
        MOV     A,R5                    ;GET DATA
        MOVX    @DPTR,A                 ;SAVE DATA IN BUFFER

;       RESET POINTER

INC     DPTR                    ;INC POINTER
        MOV     A,DPL                   ;AT END OF BUFFER
        CJNE    A,1CH,COM1              ; NOT AT END CONTINUE

MOV     A,DPH                   ;NOW CHECK MSB
        CJNE    A,1EH,COM1

MOV     DPTR,#XTODBF            ;AT END RESET
COM1:
        MOV     R5,DPL                  ;GET LSB
        MOV     A,DPH                   ;GET MSB
        MOV     DPTR,#XTODPI            ;IN COM IN POINTER
        MOVX    @DPTR,A                 ;SAVE MSB
        INC     DPTR                    ;
        MOV     A,R5                    ;SAVE LSB
        MOVX    @DPTR,A                 ;

MOV     DPTR,#TRNINP            ;TRANSMIT IN PROCESS?
        MOVX    A,@DPTR                 ;
        JNZ     COM2                    ; YES CONTINUE
        MOV     A,#0FFH                 ; NO SET FLAG
        MOVX    @DPTR,A                 ;

MOV     DPTR,#RDDCMN            ;ENABLE TRANSMIT
        MOVX    A,@DPTR                 ; MEMORY
        ORL     A,#TRANON
        MOVX    @DPTR,A

MOV     DPTR,#LAPSTS            ;ENABLE TRANSMIT
        MOVX    @DPTR,A                 ;

COM2:
        POP     1EH                     ;R6
        POP     1FH                     ;R7
        POP     1DH                     ;R5
        POP     1CH                     ;R4
        POP     ACC
        POP     DPL
        POP     DPH
        POP     PSW

RET

;The following subroutine sends out the # message or reset message
; after the system has been initialized and is up and running in the
; main loop.

RSTOUT:

MOV     DPTR,#XTODPI            ;SAVE POINTER FOR CHECKSUM
        MOVX    A,@DPTR

MOV     R0,A
        INC     DPTR
        MOVX    A,@DPTR
        MOV     R1,A

MOV     A,#STTBRK               ;OUTPUT A START BRACKET
        CALL    LAPCOM

MOV     A,#'#'                  ;GET LB SYMBOL
        CALL    LAPCOM                  ;OUTPUT

MOV     DPTR,#AIRCID            ;GET AIRCRAFT ID LOCATION
        MOV     R7,#AIRIDN              ;GET NUMBER OF DIGITS IN AIRCRAFT ID

CALL    R7DOUT                  ;OUTPUT AIRCRAFT ID.
```

```
        MOV     DPTR,#SLFFLG     ;GET SELFTEST FLAG
        MOVX    A,@DPTR
        CALL    HEXOUT           ; OUTPUT

MOV     R7,#RSTSPC       ;GET NUMBER OF SPACES FOR
                                 ; THIS MESSAGE
        MOV     A,#' '           ;GET SPACE
RSTSPS:
        CALL    LAPCOM           ; OUTPUT SPACES
        DJNZ    R7,RSTSPS        ; UNTIL DONE

MOV     R5,#MSGTOT-3     ;GET TOTAL LENGTH OF MESSAGE

MOV     DPTR,#XTDEND     ;GET END OF BUFFER
        MOV     R4,DPL           ; AND SAVE
        MOV     R6,DPH

MOV     DPH,R0           ;GET START OF MESSAGE
        MOV     DPL,R1
        CALL    CHKADD           ;ADD CHECKSUM TO ACC
        CALL    HEXOUT           ;PUT IN BUFFER

MOV     A,#ENDBRK        ;OUTPUT A END BRACKET
        CALL    LAPCOM

RET

; The following subroutine outputs data at dptr for the number
;   of times found in R7.

R7DOUT:

MOVX    A,@DPTR          ;GET ID NUMBER
        CALL    LAPCOM           ; OUTPUT
        INC     DPTR

DJNZ    R7,R7DOUT        ; UNTIL DONE

RET                      ;EXIT SUBROUTINE
$EJECT

;           *******************************************
;           *******************************************
;           * *                                     * *
;           * *      INTERRUPT    HANDLER           * *
;           * *                                     * *
;           *******************************************
;           *******************************************
;
; THIS INTERRUPT HANDLER HANDLES THE OUTPUTS TO THE DATA CONTROL HEAD
; AS WELL AS A JUMP FOR THE FIRST OUTPUT.
; A ROTATING BUFFER IS USED WITH THE INPUT TO THE BUFFER POINTED TO BY
; XTODPI AND THE OUTPUT POINTED TO BY XTODPO.  WHEN THE LSB OF THE OUTPUT
; POINTER IS POINTING TO THE SAME POINT AS THE INPUT POINTER THE NOTHING
; IS TRANSMITTED AND THE INTERRUPT IS DISABLED.
LAPTIN:

PUSH    1BH              ;SAVE R3
        PUSH    1CH              ;SAVE R4
        PUSH    1DH              ;SAVE R5
        PUSH    1EH              ;SAVE R6
        PUSH    1FH              ;SAVE R7

; INC INTERRUPT COUNT

MOV     DPTR,#LAPTCT     ;INC COUNT
        MOVX    A,@DPTR          ;FOR INTERRUPTS
        INC     A
        MOVX    @DPTR,A
```

; CHECK TO SEE IF INPUT EQUALS OUTPUT POINTER

```
           MOV     DPTR,#XTDEND       ;GET END
           MOV     R7,DPL             ; OF BUFFER
           MOV     R6,DPH

MOV     DPTR,#XTODPI       ;GET INPUT POINTER
           MOVX    A,@DPTR            ;MSB
           MOV     R3,A
           INC     DPTR               ;LSB
           MOVX    A,@DPTR            ;
           MOV     R4,A               ;SAVE
           MOV     DPTR,#XTODPO       ;GET OUTPUT POINTER
           MOVX    A,@DPTR            ;MSB
           MOV     R5,A               ;SAVE

INC     DPTR               ;GET LSB
           MOVX    A,@DPTR            ;

CJNE    A,1CH,INTE41       ;NOT THE SAME CONTINUE

MOV     A,R5               ;GET MSB
           CJNE    A,1BH,INTE41

MOV     DPTR,#RDDCMN       ;GET MEMORY
           MOVX    A,@DPTR
           ANL     A,#TRANOF          ;DISABLE TRANSMIT
           MOVX    @DPTR,A

MOV     DPTR,#LAPSTS       ;DISABEL TRANSMIT FOR USART
           MOVX    @DPTR,A

MOV     DPTR,#TRNINP       ;CLEAR TRANSMIT IN PROCESS FLAG
           CLR     A
           MOVX    @DPTR,A

JMP     IN4END             ;GO TO END OF INTERRUPT
INTE41:
           MOV     DPL,A              ;SET POINTER TO OUTPUT
           MOV     DPH,R5             ;

MOVX    A,@DPTR            ;GET DATA TO OUTPUT
           MOV     R5,A               ; AND SAVE

INC     DPTR               ;INCREMENT AND SAVE POINTER

MOV     A,DPL              ;SEE IF AT END OF BUFFER
           CJNE    A,1FH,INTE42       ; NO CONTINUE
           MOV     A,DPH              ; CHECK MSB
           CJNE    A,1EH,INTE42       ; SEE IF DONE

MOV     DPTR,#XTODBF       ;YES SAVE START OF BUFFER
INTE42:
           MOV     A,DPH              ;GET MSB
           MOV     R7,DPL             ;GET LSB

MOV     DPTR,#XTODPO       ;GET OUT POINTER
           MOVX    @DPTR,A            ;SAVE MSB
           INC     DPTR               ;
           MOV     A,R7               ;
           MOVX    @DPTR,A            ;SAVE LSB
COUTDT:                               ; OUTPUT DATA
           MOV     DPTR,#LAPDAT       ;GET DATA OUTPUT ADDRESS
           MOV     A,R5               ;
           MOVX    @DPTR,A            ;OUTPUT TO LAP TOP
           CALL    PRTCOM             ; OUTPUT TO PRINTER
IN4END:
           POP     1FH                ;POP R7
           POP     1EH                ;POP R6
```

```
        POP     1DH             ;POP R5
        POP     1CH             ;POP R4
        POP     1BH             ;POP R3

RET

; This interrupt handler handles the data comming into
; the USART.

LAPRIN:
        PUSH    1EH             ;SAVE R6
        PUSH    1DH             ;SAVE R5
        PUSH    1CH             ;SAVE R4
        PUSH    1BH             ;SAVE R3

MOV     DPTR,#LAPRCT    ;INC COUNT
        MOVX    A,@DPTR         ;FOR INTERRUPTS
        INC     A
        MOVX    @DPTR,A

MOV     DPTR,#TLPRTO    ;SET RECEIVE TIME OUT
        MOV     A,#VRFDTO       ;TIMER
        MOVX    @DPTR,A

MOV     DPTR,#LAPDAT    ;READ DATA
        MOVX    A,@DPTR         ;
        MOV     R5,A            ; AND SAVE

CALL    PRTCOM          ;OUTPUT TO PRINTER

MOV     DPTR,#RCVINP    ;RECEIVE IN PROCESS?
        MOVX    A,@DPTR
        JNZ     LPRSAV          ; YES CONTINUE

MOV     A,R5            ;IS IT A VALID START OF MESSAGE?
        CJNE    A,#'T',LAPRN1
        JMP     LAPRNE          ; YES SET FLAG
LAPRN1:
        CJNE    A,#'R',LAPRN2   ; NOT A VALID START OF MESSAGE
        JMP     LAPRNE          ; YES SET FLAG
LAPRN2:
        CJNE    A,#'L',LAPRN4
        JMP     LAPRNE          ; YES SET FLAG
LAPRN3:
        JMP     LPRRST          ; GO RESET

LAPRN4:
        CJNE    A,#'O',LAPRN3   ; NO GO RESET
LAPRNE:
        MOV     DPTR,#RCVINP    ;VALID START, SET RECEIVE FLAG
        MOV     A,#0FFH
        MOVX    @DPTR,A

LPRSAV:
        MOV     DPTR,#RFMDPT    ;GET MESSAGE POINTER
        MOVX    A,@DPTR         ; MSB
        MOV     R4,A            ;
        INC     DPTR            ; LSB
        MOVX    A,@DPTR         ;
        MOV     DPL,A           ;AND SET IN DPTR
        MOV     DPH,R4          ;
        MOV     A,R5            ;
        MOVX    @DPTR,A         ;SAVE DATA IN BUFFER
        INC     DPTR            ;INCREAMENT POINTER
        MOV     A,DPL           ; SAVE POINTER
        MOV     R4,DPL          ;
        MOV     R6,DPH          ;

MOV     DPTR,#LTTDVE+1  ;AT END OF BUFFER
        MOV     R3,DPL          ;

CJNE    A,1BH,LPRSV1    ; NO CONTINUE
        JMP     LPRHAN          ; YES GO HANDLE RECEIVED MESSAGE
```

```
LPJMPE:
        JMP     LPREND              ;EXIT
LPRSV1:
        MOV     A,R5                ;CARRIAGE RETURN
        CJNE    A,#CR,LPJMPE        ; NO CONTINUE
LPRHAN:
        MOV     DPTR,#LTTDVB        ;SEE WHAT KIND OF A MESSAGE IT IS
        MOVX    A,@DPTR

CJNE    A,#'R', LPRHN1      ; RESET MESSAGE

; YES HANDLE RESET MESSAGE

MOV     DPTR,#VTRCNT        ; CLEAR RADTIO
        CLR     A
        MOVX    @DPTR,A

MOV     DPTR,#VLRCNT        ;CLEAR LORAN
        MOVX    @DPTR,A

MOV     DPTR,#SLFFLG        ;TURN OFF OTHERS
        MOVX    A,@DPTR
        ORL     A,#OUTFLG
        MOVX    @DPTR,A

MOV     DPTR,#NWDRST        ;SET IGNORE WATCHDOG FLAG
        MOV     A,#0FFH
        MOVX    @DPTR,A

JMP     LPRRST              ; CONTINUE
LPRHN1:
        CJNE    A,#'O',LPRHN2       ;NO AN O MESSAGE CONTINUE

MOV     DPTR,#LTTDVB+1      ;GET LEAST SIG TIME DIGIT
        MOVX    A,@DPTR
        CJNE    A,#'0',LPOCLR       ; SET RECEIVE CLEAR
        INC     DPTR
        MOVX    A,@DPTR             ;GET MIDDLE DIGIT
        CJNE    A,#'0',LPOCLR
        INC     DPTR
        MOVX    A,@DPTR             ;GET LEAST SIG. DIGIT
        CJNE    A,#'0',LPOCLR
        MOV     DPTR,#SLFFLG        ;SET NO INPUT FROM OTHER AIRCRAFT
        MOVX    A,@DPTR
        ORL     A,#OUTFLG
        MOVX    @DPTR,A
        JMP     LPRRST              ; CONTINUE
LPOCLR:
        MOV     DPTR,#SLFFLG        ;CLEAR NO INPUT FROM OTHER AIRCRAFT
        MOVX    A,@DPTR
        MOV     R7,A
        MOV     A,#OUTFLG
        CPL     A
        ANL     A,1FH
        MOVX    @DPTR,A
        JMP     LPRRST              ; CONTINUE

LPRHN2:
        CJNE    A,#'T',LPRHN3       ; NOT A T CONTINUE

; HANDLE TIME MESSAGE

;       SEE IF TIME MESSAGE IS COMPLETE

MOV     DPTR,#LTTDVB+5      ; GET END
        MOV     A,DPL
        CJNE    A,1CH,LPRRST        ; NOT RIGHT NUMBER OF CHAR.

;       MOST SIG TIME DIGIT IS NOT USED AT PRESENT

MOV     DPTR,#LTTDVB+2      ;GET SEC. MOST SIG. TIME DIGIT
        MOVX    A,@DPTR
        ANL     A,#0FH              ;MAKE BCD
        MOV     R6,A                ;SAVE
```

```
        RL      A               ;MULTIPLY BY 10
        RL      A
        RL      A
        ADD     A,R6
        ADD     A,R6

MOV     R6,A            ; SAVE
        INC     DPTR            ;GET LEAST SIG DIGIT
        MOVX    A,@DPTR
        ANL     A,#0FH          ;MAKE BCD

ADD     A,R6            ;COMBINE MSB AND LSB

MOV     DPTR,#VTRCNT    ; SET IN TIMER
        MOVX    @DPTR,A

CLR     A
        MOV     DPTR,#TTRCNT    ; CLEAR RADIO COUNTER TO RESTART
        MOVX    @DPTR,A

LPRHN3:
        CJNE    A,#'L',LPRRST   ; NOT A L CONTINUE

;       HANDLE TIME MESSAGE

;       SEE IF TIME MESSAGE IS COMPLETE

MOV     DPTR,#LTTDVB+5  ; GET END
        MOV     A,DPL
        CJNE    A,1CH,LPRRST    ; NOT RIGHT NUMBER OF CHAR.

;       MOST SIG TIME DIGIT IS NOT USED AT PRESENT

MOV     DPTR,#LTTDVB+2  ;GET SEC. MOST SIG. TIME DIGIT
        MOVX    A,@DPTR
        ANL     A,#0FH          ;MAKE BCD
        MOV     R6,A            ;SAVE

RL      A               ;MULTIPLY BY 10
        RL      A
        RL      A
        ADD     A,R6
        ADD     A,R6

MOV     R6,A            ; SAVE
        INC     DPTR            ;GET LEAST SIG DIGIT
        MOVX    A,@DPTR
        ANL     A,#0FH          ;MAKE BCD

ADD     A,R6            ;COMBINE MSB AND LSB

MOV     DPTR,#VLRCNT    ; SET IN TIMER
        MOVX    @DPTR,A

CLR     A
        MOV     DPTR,#TLRCNT    ; CLEAR LORAN COUNTER TO RESTART
        MOVX    @DPTR,A

;       RESET MESSAGE BUFFER
LPRRST:
        MOV     DPTR,#RCVINP    ; CLEAR RECEIVE INPROCESS FLAG
        CLR     A
        MOVX    @DPTR,A
        MOV     DPTR,#LTTDVB    ; RESET POINTER
        MOV     R4,DPL
        MOV     R6,DPH          ; AT BEGINNING OF BUFFER
LPREND:
        MOV     DPTR,#RFMDPT    ;SAVE POINTER
        MOV     A,R6            ;
        MOVX    @DPTR,A         ;
        MOV     A,R4            ;
        INC     DPTR            ;
        MOVX    @DPTR,A         ;
```

```
        POP     1BH             ;SAVE R3
        POP     1CH             ;SAVE R4
        POP     1DH             ;SAVE R5
        POP     1EH             ;SAVE R6

RET                     ;EXIT INTERRUPT HANDLER
;
END $TITLE  (PRINTER 8052 BASED)
NAME PRINTER

;ORIGIONAL RELEASE   01 FEB 90

;LAST CHANGE   06 FEB 90    15:13

;Basic Description of Module
; This module handles the message monitoring to the printer or whatever
; type of monitor is being used
;
;               ****************************************
;               ****************************************
;               * *                                  * *
;               * *           P U B L I C S          * *
;               * *                                  * *
;               ****************************************
;               ****************************************
;
PUBLIC    PRTCOM                ;Input to this module
PUBLIC    PRTIAL                ;Initialization Routine
PUBLIC    PRTTIN                ;Interrupt Module $EJECT ;               ****************************************
;               ****************************************
;               * *                                  * *
;               * *         E X T E R N A L S        * *
;               * *                                  * *
;               ****************************************
;               ****************************************

EXTRN NUMBER  (PRTSTS,PRTDAT)   ;ADDRESS AND DATA FOR PRINTER USART
EXTRN NUMBER  (PRTMIF)          ; PRINTER MODE INSTRUCTION FORMAT
EXTRN NUMBER  (PRTCMP)          ; COMPARE VALUE FOR SELFTEST
EXTRN NUMBER  (TRSRES,TRSDIS)   ; PRINTER USART CONTROL
EXTRN NUMBER  (TRANON)          ; RESET TRANSMIT
EXTRN XDATA   (PRTTCT)          ; INTERRUPT COUNTER

EXTRN NUMBER  (PRTVAL)          ;VALUE FOR ENABLE OF PRINTER
EXTRN XDATA   (PRTFLG)

;               ****************************************
;               ****************************************
;               * *                                  * *
;               * *             D A T A              * *
;               * *                                  * *
;               ****************************************
;               ****************************************

DATA_AREA       segment XDATA
PROG_S          segment CODE
RSEG            DATA_AREA XTODPO:         DS    2         ;OUTPUT POINTER FOR BUFFER
XTODPI:         DS    2         ;INPUT POINTER FOR BUFFER XTODBF:         DS    500       ;DATA BUFFER FOR BUFFER
XTDEND:         DS    1         ;END OF BUFFER

PRTINP:         DS    1         ;PRINTER FLAG
```

```
;       ****************************************
;       ****************************************
;       * *                                  * *
;       * *          P R O G R A M           * *
;       * *                                  * *
;       ****************************************
;       ****************************************
;
;
RSEG PROG_S

; This routine is called only by LAPHAN when called saves all
; microprocessor pointers acc etc. and takes the value that is in
; the acc. and outputs it serialy.

PRTCOM:

PUSH    PSW             ;SAVE PSW
        PUSH    DPH             ;SAVE DPTR
        PUSH    DPL             ;
        PUSH    ACC             ;SAVE ACC

MOV     DPTR,#PRTFLG    ;PRINTER ENABLED
        MOVX    A,@DPTR
        CJNE    A,#PRTVAL,PRTCME ; NO EXIT

POP     ACC             ;RESTORE ACC
        PUSH    ACC

PUSH    1CH             ;R4
        PUSH    1DH             ;R5
        PUSH    1FH             ;R7
        PUSH    1EH             ;R6

MOV     R5,A            ;SAVE DATA

;       PUT IN BUFFER AT POINT POINTED TO BY XTODPI

MOV     DPTR,#XTDEND    ;GET END OF BUFFER
        MOV     R4,DPL          ; AND SAVE
        MOV     R6,DPH

MOV     DPTR,#XTODPI    ;PUT IN BUFFER AT XTODPI
        MOVX    A,@DPTR         ;GET MSB
        MOV     R7,A            ;SAVE
        INC     DPTR            ;
        MOVX    A,@DPTR         ;GET LSB
        MOV     DPL,A           ;AND SAVE
        MOV     DPH,R7          ;SAVE MSB
NOCONB:
        MOV     A,R5            ;GET DATA
        MOVX    @DPTR,A         ;SAVE DATA IN BUFFER

;       RESET POINTER

INC     DPTR            ;INC POINTER
        MOV     A,DPL           ;AT END OF BUFFER
        CJNE    A,1CH,COM1      ; NOT AT END CONTINUE

MOV     A,DPH           ;NOW CHECK MSB
        CJNE    A,1EH,COM1

MOV     DPTR,#XTODBF    ;AT END RESET
COM1:
        MOV     R5,DPL          ;GET LSB
        MOV     A,DPH           ;GET MSB
        MOV     DPTR,#XTODPI    ;IN COM IN POINTER
        MOVX    @DPTR,A         ;SAVE MSB
        INC     DPTR            ;
        MOV     A,R5            ;SAVE LSB
        MOVX    @DPTR,A         ;

MOV     DPTR,#PRTINP    ;TRANSMIT IN PROCESS?
```

```
        MOVX    A,@DPTR         ;
        JNZ     COM2            ; YES CONTINUE
        MOV     A,#0FFH         ;  NO SET FLAG
        MOVX    @DPTR,A         ;

MOV     A,#TRANON
        MOV     DPTR,#PRTSTS    ;ENABLE TRANSMIT
        MOVX    @DPTR,A         ;

COM2:

POP     1EH             ;R6
        POP     1FH             ;R7
        POP     1DH             ;R5
        POP     1CH             ;R4
PRTCME:
        POP     ACC
        POP     DPL
        POP     DPH
        POP     PSW

RET

;END OF MAIN PROGRAM
$EJECT

;       ******************************************
;       ******************************************
;       * *                                    * *
;       * *   I N I T I A L I Z A T I O N      * *
;       * *                                    * *
;       ******************************************
;       ******************************************

;ENABLE PRINTER FOR TRANSMIT, BUT FOR NOT FOR INTERRUPT

PRTIAL:

MOV     DPTR,#PRTSTS    ;
        MOV     A,#TRSRES       ;RESET USART
        MOVX    @DPTR,A         ;

MOV     R7,#3FH         ;WAIT A BIT
        DJNZ    R7,$

MOV     A,#PRTMIF       ;SET MODE INSTRUCTION FORMAT
        MOVX    @DPTR,A         ;

;SET ROTATING BUFFER POINTERS (OUTPUT)

MOV     DPTR,#XTODBF    ;GET START OF BUFFER
        MOV     R4,DPL          ;SAVE LSB
        MOV     R5,DPH          ;SAVE MSB

MOV     DPTR,#XTODPO    ;SET COM. OUT POINTER
        MOV     A,R5            ;
        MOVX    @DPTR,A         ;SAVE MSB
        INC     DPTR            ;
        MOV     A,R4            ;SAVE LSB
        MOVX    @DPTR,A         ;

MOV     DPTR,#XTODPI    ;SET COM. IN POINTER
        MOV     A,R5            ;
        MOVX    @DPTR,A         ;SAVE MSB
        INC     DPTR            ;
        MOV     A,R4            ;SAVE LSB
        MOVX    @DPTR,A         ;

RET                     ;EXIT INITIALIZATION
```

$EJECT

```
;        ******************************************
;        ******************************************
;        * *                                   * *
;        * *      INTERRUPT    HANDLER         * *
;        * *                                   * *
;        ******************************************
;        ******************************************
; THIS INTERRUPT HANDLER HANDLES THE OUTPUTS TO THE DATA CONTROL HEAD
; AS WELL AS A JUMP FOR THE FIRST OUTPUT.
; A ROTATING BUFFER IS USED WITH THE INPUT TO THE BUFFER POINTED TO BY
; XTODPI AND THE OUTPUT POINTED TO BY XTODPO. WHEN THE LSB OF THE OUTPUT
; POINTER IS POINTING TO THE SAME POINT AS THE INPUT POINTER THE NOTHING
; IS TRANSMITTED AND THE INTERRUPT IS DISABLED.

PRTTIN:

PUSH    1BH             ;SAVE R3
        PUSH    1CH             ;SAVE R4
        PUSH    1DH             ;SAVE R5
        PUSH    1EH             ;SAVE R6
        PUSH    1FH             ;SAVE R7

; INC INTERRUPT COUNT

MOV     DPTR,#PRTTCT    ;INC COUNT
        MOVX    A,@DPTR         ;FOR INTERRUPTS
        INC     A
        MOVX    @DPTR,A

; CHECK TO SEE IF INPUT EQUALS OUTPUT POINTER

MOV     DPTR,#XTDEND    ;GET END
        MOV     R7,DPL          ; OF BUFFER
        MOV     R6,DPH

MOV     DPTR,#XTODPI    ;GET INPUT POINTER
        MOVX    A,@DPTR         ;MSB
        MOV     R3,A
        INC     DPTR            ;LSB
        MOVX    A,@DPTR         ;
        MOV     R4,A            ;SAVE
        MOV     DPTR,#XTODPO    ;GET OUTPUT POINTER
        MOVX    A,@DPTR         ;MSB
        MOV     R5,A            ;SAVE
        INC     DPTR            ;GET LSB
        MOVX    A,@DPTR         ;

CJNE    A,1CH,INTE41    ;NOT THE SAME CONTINUE
        MOV     A,R5            ;GET MSB
        CJNE    A,1BH,INTE41

MOV     A,#TRSDIS
        MOV     DPTR,#PRTSTS    ;DISABEL TRANSMIT FOR USART
        MOVX    @DPTR,A

MOV     DPTR,#PRTINP    ;CLEAR TRANSMIT IN PROCESS FLAG
        CLR     A
        MOVX    @DPTR,A

JMP     IN4END          ;GO TO END OF INTERRUPT

INTE41:
        MOV     DPL,A           ;SET POINTER TO OUTPUT
        MOV     DPH,R5          ;

MOVX    A,@DPTR         ;GET DATA TO OUTPUT
        MOV     R5,A            ; AND SAVE

INC     DPTR            ;INCREMENT AND SAVE POINTER
```

```
           MOV      A,DPL                  ;SEE IF AT END OF BUFFER
           CJNE     A,1FH,INTE42           ; NO CONTINUE
           MOV      A,DPH                  ; CHECK MSB
           CJNE     A,1EH,INTE42           ; SEE IF DONE

MOV      DPTR,#XTODBF           ;YES SAVE START OF BUFFER
INTE42:
           MOV      A,DPH                  ;GET MSB
           MOV      R7,DPL                 ;GET LSB

MOV      DPTR,#XTODPO           ;GET OUT POINTER
           MOVX     @DPTR,A                ;SAVE MSB
           INC      DPTR                   ;
           MOV      A,R7                   ;
           MOVX     @DPTR,A                ;SAVE LSB
COUTDT:                                    ; OUTPUT DATA
           MOV      DPTR,#PRTDAT           ;GET DATA OUTPUT ADDRESS
           MOV      A,R5                   ;
           MOVX     @DPTR,A                ;OUTPUT TO PRINTER

IN4END:

POP      1FH                    ;POP R7
           POP      1EH                    ;POP R6
           POP      1DH                    ;POP R5
           POP      1CH                    ;POP R4
           POP      1BH                    ;POP R3

RET
END
$TITLE  (RFMDEC 8052 BASED)
NAME RFMDEC

;10 AUG 89    15 :00

;VA1.0  ORIGIONAL RELEASE   14 JUN 89

;Basic Description of Module
;
; This module is to receive data from the DEC Computer
; and save it in the buffer RFMDBF incrementing the counter
; RFMDCT which will indicate the number of messages in que
; when the message is completly received ; This module will initialize the receive interrupt to
; receive a message.  After it has completely received a
; message it will set the RFMRFG flag and the message will
; be found in the RFMRBF buffer.  If a receive is inprocess
; for a long period of time it will time out and reinitialize
; the receive input.  Should the message not be completely
; received before timing out the message will be ignored and
; another message will be able to be received.
;
; Interrupt Routine: RFMDIN
; Initialization Routine: RFMDIT
;
;
$EJECT ;
;                ****************************************
;                ****************************************
;                * *                                  * *
;                * *           P U B L I C S          * *
;                * *                                  * *
;                ****************************************
;                ****************************************
;
;
;
;
```

```
PUBLIC    RFMDEC              ;Input to this module
PUBLIC    RFMDIN              ;Receive Interrupt Handler
PUBLIC    RFMDIT              ;Initialization called by INIT
$EJECT
```

;
;
;           *******************************************
;           *******************************************
;           * *                                    * *
;           * *        E X T E R N A L S           * *
;           * *                                    * *
;           *******************************************
;           *******************************************
;

```
EXTRN CODE    (XTOTER)               ;OUTPUT TO TERMINAL
;
EXTRN XDATA   (RFMDBF)               ;BEGINNING OF ROTATING BUFFER
EXTRN XDATA   (RFMDPT)               ;DEC INPUT BUFFER POINTER
EXTRN XDATA   (RFMDBE)               ;END OF ROTATING BUFFER
EXTRN XDATA   (MFMDPT)               ;DEC OUTPUT BUFFER POINTER
EXTRN XDATA   (RFMDCT)               ;MESSAGE COUNTER
EXTRN NUMBER  (VRFDCT)               ;MESSAGE COUNTER MAX

EXTRN NUMBER  (ICW1,OCW1,OCW2)       ;ENABLE 8259
EXTRN NUMBER  (MASKVL)               ;MASK MEMORY
EXTRN NUMBER  (MASK)                 ;MASK VALUE
EXTRN NUMBER  (MASKE)                ;MASK VALUE FOR EXECLP

EXTRN NUMBER  (CR)                   ;CARRIAGE RETURN
EXTRN XDATA   (RDCCNT)               ;INTERRUPT COUNTER

EXTRN NUMBER  (SDCSTS,SDCDAT)        ;USART STATUS AND DATA
EXTRN XDATA   (RDDCMN)               ;MEMORY FOR USART COMMANDS
EXTRN NUMBER  (RECVON,RECVOF)        ;COMMAND INSTRUCTIONS
EXTRN NUMBER  (TRANON,TRANOF)        ;FOR RECEIVE AND TRANSMIT
EXTRN NUMBER  (RXRDY)                ;RECEIVE READY
EXTRN NUMBER  (TXRDY)                ;TRANSMIT READY

EXTRN XDATA   (TRFDTO)               ;RECEIVE TIMEOUT TIMER
EXTRN XDATA   (TDUART)               ;UART REFRESH TIMER

EXTRN XDATA   (DTRINP)               ;TRANS. TO DEC IN PROCESS

EXTRN XDATA   (ASCCON)               ;ASCII CONVERSION

EXTRN NUMBER  (ASCFLG)               ;CONVERT TO ASCII
;
$EJECT
```

;
;           *******************************************
;           *******************************************
;           * *                                    * *
;           * *           D A T A                  * *
;           * *                                    * *
;           *******************************************
;           *******************************************

;THIS IS DATA USED INTERNAL TO THIS FILE ONLY

```
DATA_AREA      segment XDATA
RSEG           DATA_AREA

CHARCT:   DS     1         ;CHARACTOR COUNTER FOR BAD MESSGES
SCPDPT:   DS     2         ;SCRATCH PAD POINTER FOR LAST GOOD
                           ;MESSAGE
;
```

```
;       ****************************************
;       ****************************************
;       * *                                  * *
;       * *          E Q U A T E S           * *
;       * *                                  * *
;       ****************************************
;       ****************************************
;

VRFDTO   EQU       12           ;REINITIALIZE AFTER 3 SECONDS
VDUART   EQU       8            ;USART REFRESH TIMER
VCHRCT   EQU       07H          ;CHARACTER COUNTER (NEVER MORE THAN 7)

;       ****************************************
;       ****************************************
;       * *                                  * *
;       * *          P R O G R A M           * *
;       * *                                  * *
;       ****************************************
;       ****************************************

PROG_S   segment    CODE
RSEG     PROG_S

RFMDEC:
        ;THE FOLLOWING IS TO REFRESH BAUD RATE IF NESCESSARY

MOV       DPTR,#DTRINP     ;TRANSMIT IN PROCESS
         MOVX      A,@DPTR          ;
         JZ        REFREC           ; NO GO REFRESH RECEIVE

MOV       DPTR,#SDCSTS     ;GET STATUS
         MOVX      A,@DPTR          ;TX EMPTY
         ANL       A,#TXRDY
         JNZ       REFREC           ; NO CONTINUE

MOV       DPTR,#RDDCMN     ;GET PAST STATUS
         MOVX      A,@DPTR
         ORL       A,#TRANON
         MOVX      @DPTR,A
         MOV       DPTR,#SDCSTS     ;REFRESH RECEIVE
         MOVX      @DPTR,A          ;

JMP       REFEND           ; CONTINUE

REFREC:
        ;SEE IF NEED TO REFRESH USART

MOV       DPTR,#TDUART     ;TIMER EXPIRED?
         MOVX      A,@DPTR          ;
         JNZ       REFEND           ; NO DO NOT REFRESH
         MOV       A,#VDUART        ; YES REFRESH
         MOVX      @DPTR,A          ;

MOV       DPTR,#RDDCMN     ;GET PAST STATUS
         MOVX      A,@DPTR
         ORL       A,#RECVON
         MOVX      @DPTR,A
         MOV       DPTR,#SDCSTS     ;REFRESH RECEIVE
         MOVX      @DPTR,A          ;
REFEND:
         MOV       DPTR,#TRFDTO     ;HAS MESSAGE TIMED OUT
         MOVX      A,@DPTR          ;
         JNZ       KYEXIT           ; NO CONTINUE

MOV       DPTR,#SCPDPT+1   ;MESSAGE COMMING IN
         MOVX      A,@DPTR          ;
         MOV       R4,A             ;SAVE LSB OF BUFFER
         MOV       DPTR,#RFMDPT+1   ;
         MOVX      A,@DPTR          ;GET LSB OF POINTER
         CJNE      A,1CH,RFMDE1     ; YES CONTINUE
         JMP       KYEXIT           ;NO EXIT
RFMDE1:
```

```
        CALL    RFMDIT              ;REINITIALIZE
KYEXIT:
        RET
;END OF MAIN PROGRAM $EJECT

;       ***********************************************
;       ***********************************************
;       * *                                         * *
;       * *        I N I T I A I Z A T I O N       * *
;       * *                                         * *
;       ***********************************************
;       ***********************************************
;
; The following is called once by the INIT module.

RFMDIT:
        ;The following sets the input pointer

MOV     DPTR,#RFMDBF        ; RESET INPUT POINTER
        MOV     R4,DPL              ;
        MOV     A,DPH               ;
        MOV     R5,A                ; TO START OF BUFFER
        MOV     DPTR,#RFMDPT        ;
        MOVX    @DPTR,A             ;
        INC     DPTR                ;
        MOV     A,R4                ;
        MOVX    @DPTR,A             ;

MOV     DPTR,#MFMDPT        ; RESET OUTPUT POINTER
        MOV     A,R5                ; TO START OF BUFFER
        MOVX    @DPTR,A             ;
        INC     DPTR                ;
        MOV     A,R4                ;
        MOVX    @DPTR,A             ;

MOV     DPTR,#SCPDPT        ; RESET SCRATCH PAD COUNTER
        MOV     A,R5                ; TO START OF BUFFER
        MOVX    @DPTR,A             ;
        INC     DPTR                ;
        MOV     A,R4                ;
        MOVX    @DPTR,A             ;

RET                         ;EXIT INITIALIZATION
;
$EJECT

;       *******************************************
;       *******************************************
;       * *                                     * *
;       * *      INTERRUPT    HANDLER          * *
;       * *                                     * *
;       *******************************************
;       *******************************************

; This interrupt handler handles the data comming into
; the USART.

RFMDIN:
        PUSH    1EH                 ;SAVE R6
        PUSH    1DH                 ;SAVE R5
        PUSH    1CH                 ;SAVE R4
        PUSH    1BH                 ;SAVE R3
; INC INTERRUPT COUNT

MOV     DPTR,#RDCCNT        ;INC COUNT
        MOVX    A,@DPTR             ;FOR INTERRUPTS
        INC     A
        MOVX    @DPTR,A
```

```
RFDIN2:
        MOV     DPTR,#TRFDTO        ;SET RECEIVE TIME OUT
        MOV     A,#VRFDTO           ;TIMER
        MOVX    @DPTR,A

MOV     DPTR,#SDCDAT        ;READ DATA
        MOVX    A,@DPTR             ;
        MOV     R5,A                ; AND SAVE

CLR     ASCFLG              ;CLEAR ASCFLG

MOV     DPTR,#ASCCON        ;CONVERT?
        MOVX    A,@DPTR             ;
        CJNE    A,#'A',NOCONA       ; NO CONTINUE

MOV     A,R5                ;RETRIEVE DATA

CALL    ASCBIN              ;CONVERT TO BINARY
        JMP     NOCONB              ; AND CONTINUE
NOCONA:
        MOV     A,R5                ;GET DATA

CJNE    A,#CR,NOCONC        ;CARRIAGE RETURN EXIT
        SETB    ASCFLG              ;SET FOR ASCII

MOV     A,#'X'              ;OUTPUT X FOR TRANSMIT
        CALL    XTOTER              ; OUTPUT TO TERMINAL
        MOV     A,#' '              ;OUTPUT SPACE
        CALL    XTOTER              ; OUTPUT TO TERMINAL
        CLR     ASCFLG              ;CLEAR ASCFLG
        JMP     NOCONB              ;
NOCONC:
        CALL    XTOTER              ; OUTPUT TO TERMINAL
NOCONB:
        MOV     DPTR,#RFMDCT        ;CHECK MESSAGE COUNTER
        MOVX    A,@DPTR             ; FOR OVERFLOW
        CJNE    A,#VRFDCT,RFDIN3    ;   NOT OVERFLOW CONTINUE
        JMP     KEYEXT              ;   OVERFLOW EXIT

RFDIN3:
        MOV     DPTR,#RFMDPT        ;GET MESSAGE POINTER
        MOVX    A,@DPTR             ;  MSB
        MOV     R4,A                ;
        INC     DPTR                ; LSB
        MOVX    A,@DPTR             ;
        MOV     DPL,A               ;AND SET IN DPTR
        MOV     DPH,R4               ;
        MOV     A,R5                ;
        MOVX    @DPTR,A             ;SAVE DATA IN BUFFER
        INC     DPTR                ;INCREAMENT POINTER
        MOV     A,DPL               ; SAVE POINTER
        MOV     R4,DPL              ;
        MOV     R6,DPH              ;

MOV     DPTR,#RFMDBE        ;AT END OF BUFFER
        MOV     R3,DPL              ;

CJNE    A,1BH,RFDIN4        ;

MOV     DPTR,#RFMDBF        ; YES GET BEGINNING OF BUFFER
        MOV     R4,DPL              ;
        MOV     R6,DPH              ;
RFDIN4:
        MOV     A,R5                ;CARRIAGE RETURN
        CJNE    A,#CR,RFDIN6        ; NO CONTINUE

MOV     DPTR,#CHARCT        ; GET CHARCTOR COUNT
        CLR     A                   ;  AND CLEAR
        MOVX    @DPTR,A             ;

MOV     DPTR,#RFMDCT        ;CHECK MESSAGE COUNTER
        MOVX    A,@DPTR             ; FOR OVERFLOW
```

```
           CJNE    A,#VRFDCT,RFDN5A    ; AT MAX NO JUMP
           JMP     RFDIN7              ;AT MAX JUMP
RFDN5A:
           INC     A
           MOVX    @DPTR,A             ; INCREAMENT AND SAVE
                                       ;

MOV     DPTR,#SCPDPT        ;RESET SCRATCH PAD POINTER
           MOV     A,R6                ;
           MOVX    @DPTR,A             ;
           INC     DPTR                ;
           MOV     A,R4                ;
           MOVX    @DPTR,A             ;

JMP     RFMEND              ;YES RESET POINTER
RFDIN6:
           MOV     DPTR,#CHARCT        ; GET CHARACTOR COUNT
           MOVX    A,@DPTR             ;
           INC     A                   ; INCREAMENT
           CJNE    A,#VCHRCT,RFMEND    ; NOT AT MAX EXIT
           CLR     A                   ;
           MOVX    @DPTR,A

RFDIN7:
           MOV     DPTR,#SCPDPT        ;RESET ROTATING BUFFER
           MOVX    A,@DPTR             ;
           MOV     R6,A
           INC     DPTR                ; TO LAST KNOWN GOOD MESSAGE
           MOVX    A,@DPTR             ;
           MOV     R4,A                ;

RFMEND:
           MOV     DPTR,#RFMDPT        ;SAVE POINTER
           MOV     A,R6                ;
           MOVX    @DPTR,A             ;
           MOV     A,R4                ;
           INC     DPTR                ;
           MOVX    @DPTR,A             ;

KEYEXT:
           MOV     DPTR,#ICW1          ;RESET
           MOV     A,#1FH              ;ICW1
           MOVX    @DPTR,A             ;

MOV     DPTR,#OCW1          ;UNMASK
           MOV     A,#0H               ;
           MOVX    @DPTR,A             ;

MOV     DPTR,#OCW1          ;UNMASK
           MOV     A,#80H              ;
           MOVX    @DPTR,A             ;

MOV     A,MASKVL            ;SET INTERRUPT MASK
           ORL     A,MASK
           ORL     A,MASKE

MOV     DPTR,#OCW1          ;RESET MASK
           MOVX    @DPTR,A

POP     1BH                 ;SAVE R3
           POP     1CH                 ;SAVE R4
           POP     1DH                 ;SAVE R5
           POP     1EH                 ;SAVE R6
           POP     ACC
           POP     DPL
           POP     DPH
           POP     PSW                 ;PUSHED ON INTERRUPT

SETB    EA                  ;ENABLE INTERRUPTS

RETI

;SUBROUTINE
; THIS SUBROUTINE CONVERTS FROM ASCII TO BINARY
```

```
ASCTAB:
        DB      00H
        DB      01H
        DB      02H
        DB      03H
        DB      04H
        DB      05H
        DB      06H
        DB      07H
        DB      08H
        DB      09H
        DB      0FFH
        DB      0FFH
        DB      0FFH
        DB      0FFH
        DB      0FFH
        DB      0FFH
        DB      0FFH
        DB      0AH
        DB      0BH
        DB      0CH
        DB      0DH
        DB      0EH
        DB      0FH
        DB      00H

ASCBIN:
        SETB    ASCFLG              ;SET FOR ASCII
        CJNE    A,#CR,ASCBN0        ;CARRIAGE RETURN EXIT

MOV     A,#'X'              ;OUTPUT X FOR TRANSMIT
        CALL    XTOTER              ; OUTPUT TO TERMINAL
        MOV     A,#' '              ;OUTPUT SPACE
        CALL    XTOTER              ; OUTPUT TO TERMINAL
        JMP     ASCEXT              ;

ASCBN0:
        CALL    XTOTER              ;OUTPUT TO CONSOLE

MOV     DPTR,#ASCTAB

CLR     C                   ;GET BINARY CHARACTOR
        SUBB    A,#'0'
        MOVC    A,@A+DPTR           ;

RR      A
        RR      A
        RR      A                   ;GET AS MSB
        RR      A

PUSH    ACC

ASCBN1:
        MOV     DPTR,#SDCSTS        ;RECEIVE BUFFER FULL
        MOVX    A,@DPTR             ;
        ANL     A,#RXRDY            ;
        JZ      ASCBN1

MOV     DPTR,#SDCDAT        ;GET DATA
        MOVX    A,@DPTR             ;
        CALL    XTOTER              ;OUTPUT TO CONSOLE

MOV     DPTR,#ASCTAB
        CLR     C                   ;GET BINARY CHARACTOR
        SUBB    A,#'0'
        MOVC    A,@A+DPTR           ;

POP     1DH

ORL     A,R5                ;COMBINE
        MOV     R5,A                ;SAVE

ASCEXT:
        CLR     ASCFLG              ;CLEAR ASCII FLAG
```

```
    RET
;
END

A:\APPENDA
D:\jnh\116601.APP
```

United States Patent Application of

Edward J. Fraughton and

Philip H. Berger for

A UNIVERSAL DYNAMIC NAVIGATION,
SURVEILLANCE, EMERGENCY LOCATION, AND
COLLISION AVOIDANCE SYSTEM AND METHOD

APPENDIX B
PROGRAMMING CODE

Copyright 1990 TERRASTARR, INC.

```
/*                      POSITION.C                                         */
/*                                                                         */
/*              Collision Avoidance System Software                        */
/*              Copyright 1990 by TERRASTARR Corporation                   */
/*                                                                         */
/* <900116.1646>   Basic display system                                    */
/* <900205.1250>   Interupt driven serial input                            */
/* <900208.2326>   Conditional compilation for input from comm port/disk   */
/* <900215.1006>   Error checking and realignment                          */
/* <900220.0228>   Fixed heading error on plot                             */
/* <900221.0038>   Added variable scale factor                             */
/* <900301.1233>   Changed scale factor, increased range                   */
/* <900307.1337>   Changed float variables to double                       */
/* <900312.1005>   Added check for repeat loran position                   */
/* <900319.2357>   Added bitmapped airplanes                               */
/* <900329.0810>   Added altitude readout                                  */
/* <900405.1201>   Added "operator" controlled character plotting          */
/* <900521.1040>   Fixed floating point termination error                  */
/* <900610.1334>   Fixed altitude position, added averaging (lookback var) */
/* <900611.0937>   Hdg arrow, hdg rounding                                 */
/* <900617.1228>   Added data logging                                      */
/* <900617.1229>   Last revision date                                      */
/*-------------------------------------------------------------------------*/
/*  INCLUDES                                                               */
#include    <stdio.h>
#include    <time.h>
#include    <conio.h>
#include    <math.h>
#include    <string.h>
#include    <stdlib.h>
#include    <ctype.h>
#include    "colors.h"
#include    "gtools.h"
#include    "pgdraws.h"
#include    "ghead.h"
#include    "xc.h"
#include    "fkeys.h"
extern      long int xc_test();
/*-------------------------------------------------------------------------*/
```

```
/* DEFINES                                                                          */
#define     true        1
#define     false       0
#define     NACFT       10              /* number of aircraft                       */
#define     NDATA       10              /* number of data per aircraft              */
#define     PORT        COM1            /* I/O port to data-V-com                   */
#define     RATE        BAUD1200        /* I/O data rate to data-V-com              */
#define     COMP        1               /* 1=data from file, 2=commport             */
#define     NOGRAPH     0               /* 1=graph off,-1 rec count                 */
#define     LOOKBACK    5               /* number of points to "average"            */
/*---------------------------------------------------------------------------------*/
/* FUNCTIONS                                                                        */
void        initialize();               /* Initialize system */
void        plotem();                   /* data plotting function */
int         data_in();                  /* read data from file / port */
void        process_data();             /* parse data */
int         search();                   /* Search table for aircraft ID */
int         find_empty();               /* Find slot for new aircraft   */
void        clear_entry();              /* relase ID entry */
float       dist();                     /* calc dist & abs bearing */
float       relative();                 /* function to calc rel bearing */
void        distance_circles();         /* plot distance circles */
void        center_airplane();          /* plot airplane in center */
void        airplane();                 /* plot target airplane */
int         clip();                     /* keep graphics within bounds */
void        plot_airplane();            /* bit mapped airplane plot    */
void        plot_previous_large();      /* plot prev position as a dot */
void        plot_previous_small();      /* plot prev position as a dot */
void        update();                   /* replt all acft when center moves*/
int         check();                    /* verify number is within 0..9 */
void        check_keyboard();           /* keyboard input & dispatch */
int         toggle();                   /* toggle a variable true/false */
void        zoom();                     /* zoom screen in/out */
int         validate();                 /* check for brackets * checksum */
void        checksum();                 /* calculate checksum of a string */
void        align();                    /* read new data until data aligns*/
void        open_port();                /* open up communications port */
int         read_buffer();              /* interupt serial port read */
void        terminate();                /* end the program gracefully */
void        open_file();
void        open_save_file();
void        read_rec();
void        plot_read_string();
/*---------------------------------------------------------------------------------*/
/* DIMENSIONED GLOBAL VARIABLES                                                     */
double      latitude    [NACFT][NDATA]; /* storage for latitude             */
double      longitude   [NACFT][NDATA]; /* storage for longitude            */
float       heading     [NACFT][NDATA]; /* storage for heading              */
float       speed       [NACFT][NDATA]; /* storage for speed                */
float       v_speed     [NACFT][NDATA]; /* storage for v_speed              */
float       distance    [NACFT][NDATA]; /* storage for distance             */
float       rel_bearing [NACFT][NDATA]; /* storage for relative bearing     */
float       rel_heading [NACFT][NDATA]; /* storage for relative heading     */
long        sample_time [NACFT][NDATA]; /* time data was received           */
int         altitude    [NACFT][NDATA]; /* storage for altitude             */
int         status      [NACFT][NDATA]; /* loran / xmitter status           */
int         data_pointer[NACFT];        /* data pointer for each aircraft   */
int         plotted     [NACFT][NDATA]; /* indicates data plotted           */
char        nnumber     [NACFT][7];     /* aircraft identifier              */
char        read_string [40];           /* character input variable         */

/* SINGLE GLOBAL VARIABLES                                                          */
double      mylat, mylon, hislat, hislon; /* current variables              */
float       myheading, myspeed;
long        t_start, mytime, histime;   /* time variables                   */
int         myalt, hisalt;
int         file_record_count;          /* reset counter for data save      */

/* GLOBAL CONSTANTS                                                                 */
double      pi = 3.141592654;
double      c  = .01745329252;          /* pi/180.                          */
float       circle_ratio = 1.0;         /* make circles round               */
float       scale = .25;                /* set scale to 4 mi / circle       */
```

```
int        radius = 50;              /* radius increment of rings    */
int        myplane=LIGHTBLUE;        /* aircraft color               */
int        hisplane=YELLOW;          /* aircraft color               */
int        bogey=LIGHTMAGENTA;       /* aircraft color               */
int        ctr = 0;                  /* debugging counter */
int        records_read = 0;         /* record counter */

/* GLOBAL FLAGS                                                       */
int        vector_flag = false;      /* turn on/off velocity vectors */
int        autoread_flag = false;    /* turn on/off auto disk read   */
int        altitude_flag = false;    /* turn on/off altitude display */
int        nnumber_flag = false;     /* turn on/off nnumber display  */
int        previous_flag = false;    /* turn on/off previous position*/
int        hold_rewrite = false;     /* flag to hold off clearing image*/
int        print_string_flag = false; /* print-plot input string     */
int        data_save_flag = false;   /* save data to file            */

/* FILE CONTROLS                                                      */
FILE       *save_file;

/* CONDITIONAL  VARIABLES                                             */
#if COMP==1
FILE       *fp;
#endif
/*------------------------------------------------------------------*/
main()
{
   initialize();
   open_save_file();
   adapt = getAdapter();
   save_mode = getMode(&ncols);
   LINEWIDTH = 1;
#if NOGRAPH < 1
   mode = 0x12;
   setMode(mode);
   cls(BLACK);
   distance_circles();
#endif
loop:
#if COMP == 2
   if (data_in())
      process_data();
#endif
#if NOGRAPH < 1
   plotem();
#endif
   check_keyboard();
   goto loop;
}
/*------------------------------------------------------------------*/ void initialize()
           /* Routine to initialize arrays: puts null in nnumber   */
           /* string, sets data_pointer to -1, sets plotted flag   */
           /* positive for all data points,puts 0's in position    */
           /* array, sets up com port, inits Data-V-Com, gets my   */
           /* nnumber, puts it into the  0 position                */
{
   register int   i, j, k;
   static int     try = 0;
   int            two = 2, three = 3, five = 5, six = 6;
   int            err;
   char           dv_status[2], buffer[81];

buffer[35] = '\0';                /* make sure we don't run away */
   vector_flag = false;              /* turn off velocity vector plot */
   altitude_flag = false;            /* turn off altitude vector plot */
   time(&t_start);                   /* get reference time */ for (i=0;i<NACFT;i++)             /* clear all arrays and set    */
   {                                 /* pointers to -1 (empty condition*/
      nnumber[i][0] = '\0';
      data_pointer[i] = -1;
```

```c
        for (j=0;j<NDATA;j++)
        {
            latitude    [i][j] = 9999.;
            longitude   [i][j] = 9999.;
            altitude    [i][j] = 0;
            sample_time [i][j] = 0;
            heading     [i][j] = 0.;
            speed       [i][j] = 0.;
            v_speed     [i][j] = 0.;
            distance    [i][j] = 0.;
            rel_bearing [i][j] = 0.;
            rel_heading [i][j] = 0.;
            status      [i][j] = 0;
            plotted     [i][j] = true;
        }
#if COMP == 1
    open_file();
    read_rec();
    i = strcspn(read_string,"#");
        if (i != 1)
            terminate;
        else
        {
            strncpy(nnumber[0],&read_string[2],6);
            nnumber[0][7] = '\0';
        }
#endif
if COMP == 2
    open_port();
    try = 0;
    if (++try < 5)
    {
        xc_put(PORT,"R\r\n",&three);          /* initialize Data-V-Com */
        do
        {
            i = read_buffer(buffer,35);
        } while (i == 0);
        if (!(err = validate(buffer)))        /* see if the characters are ok */
        {
            i = strcspn(buffer,"#");
            if (i == 1)
                goto ok;
        }
    }
    else
        terminate();
ok:
    memmove(nnumber[0],&buffer[2],6);         /* grab my ID */
    nnumber[0][6] = '\0';                     /* terminate the line */
    memmove(dv_status,&buffer[8],2);          /* save Data-V-Com status */
    xc_put(PORT,"L003\r\n",&six);             /* signal ready to recieve loran */
    xc_put(PORT,"T004\r\n",&six);             /* signal start transmit position */
    xc_put(PORT,"O001\r\n",&six);             /* receive other signals */
#endif
}

/*--------------------------------------------------------------------------*/ void plotem()
{
    register int    i, j;

for (i=0;i<NACFT;i++)
    {
        j = data_pointer[i];                  /* anybody home ? */
        if (j != -1)
        {
            if (!plotted[i][j])               /* has it already been plotted */
            {
                if (i==0)
                {
```

```
                    center_airplane(j);
                    plotted[i][j] = true;
                    update();
                    }
                else if (stricmp(nnumber[i],"") && i!=0)
                {
                    color = hisplane;
                    OPERATOR = XOR;
                    if (!hold_rewrite)
                        airplane (i,j-1);
                    airplane (i,j);
/*                  plot_previous(rel_bearing[i][j-1],distance[i][j-1]); */
                }
            }
        }
    }
    hold_rewrite = false;
}
/*------------------------------------------------------------------*/ int data_in()
                            /* Routine to accept input data from file or */
                            /* I/O port         */
{
    int    j, err;

#if COMP==1
    read_rec();
    if (feof(fp))
        terminate();
    records_read++;
    read_string[35]='\0';
#if NOGRAPH == 1
    printf("%s\n",read_string);
#else
    if (print_string_flag)
        plot_read_string();
#endif
    if (data_save_flag)
    {
        fprintf(save_file,"%s\n",read_string);
        file_record_count++;
        if (file_record_count>20)
        {
            fclose(save_file);
            open_save_file();
        }
    }
    return 1;
endif if COMP == 2
    j = read_buffer(read_string,35);
    if (j)
    {
        records_read++;
        err = validate(read_string);
/*      printf("err = %i\n",err);*/
        while (err)
        {
            align(read_string);
            check_keyboard;
        }
        read_string[35]='\0';
#if NOGRAPH == 1
    printf("%s\n",read_string);
#else
        if (print_string_flag)
            plot_read_string();
    if (data_save_flag)
    {
```

```c
            fprintf(save_file,"%s\n",read_string);
            file_record_count++;
            if (file_record_count>20)
            {
                fclose(save_file);
                open_save_file();
            }
        }
    #endif
        }
        return j;
#endif
}
/*-------------------------------------------------------------------*/ void process_data()
                            /* Routine to parse input data, and calculate */
                            /* heading,speed,verticle speed, distance and */
                            /* relative bearing          */
{
    double  temp_num, intpart, fraction;
    float   direction, length;
    int     entry, j, previous, err_status;
    long    tnow, deltatime;
    char    temp_char[10], id[7];

memmove (temp_char,&read_string[25],2);       /* get error status */
    temp_char[2] = '\0';
    err_status = atoi(temp_char);
    if (!(err_status & 2))               /* if its not new data, ignore it */
    {
        mylat = latitude[0][data_pointer[0]];    /* get                    */
        mylon = longitude[0][data_pointer[0]];   /*    current             */ myalt = altitude[0][data_pointer[0]];    /*         data           */
        myheading = heading[0][data_pointer[0]]; /*            for my      */
        myspeed = speed[0][data_pointer[0]];     /*               plane    */
        memmove(id,&read_string[1],6);           /* peel off aircraft id   */
        id[6] = '\0';
        entry = search(id);                      /* insert into data base  */
        if (entry<0)
        {
            entry = find_empty();
            memmove(nnumber[entry],id,6);
        }
        data_pointer[entry] = j = check(data_pointer[entry] + 1);
        status[entry][j] = err_status;
        memmove (temp_char,&read_string[8],6);                /* get latitude  */
        temp_char[6] = '\0';                                  /*               */
        temp_num = atof(temp_char) * .0001;                   /*               */
        fraction = modf(temp_num,&intpart);                   /*               */
        latitude[entry][j] = hislat = intpart + fraction / .6;/*               */
        memmove (temp_char,&read_string[15],7);               /* get longitude */
        temp_char[7] = '\0';                                  /*               */
        temp_num = atof(temp_char) * .0001;                   /*               */
        fraction = modf(temp_num,&intpart);                   /*               */
        longitude[entry][j] = hislon = intpart + fraction / .6;/*              *
        memmove (temp_char,&read_string[22],3);               /* get altitude  */
        temp_char[3] = '\0';                                  /*               */
        altitude[entry][j] = hisalt = atoi(temp_char);        /*               */
        sample_time[entry][j] = histime = time(&tnow) - t_start; /* time       */
        distance[entry][j] = dist(mylat,mylon,hislat,hislon,
            &direction);                                      /* distance     */
        rel_bearing[entry][j] = relative(myheading,direction);

previous = check(j - LOOKBACK);                       /* old data ptr */
        length = dist(latitude[entry][previous],longitude
            [entry][previous],hislat,hislon,&direction);      /* how far      */
        heading[entry][j] = direction;                        /* heading      */
        rel_heading[entry][j] = relative(myheading,direction);/* relative hdg */
        deltatime = histime - sample_time[entry][previous];
        if (deltatime)
```

```c
      {
         speed[entry][j] = length / deltatime;              /* speed    */
         v_speed[entry][j] = (hisalt - myalt) / deltatime;  /* vert speed  */
         }
      else
         {
         speed[entry][j] = 0.;                              /* no time  */
         v_speed[entry][j] = 0.;                            /* no speed */
         }
      plotted[entry][j] = false;
      }
}
/*-----------------------------------------------------------------*/ int search(char *ident)
                        /* Search table of nnumbers for an aircraft    */
                        /* identifier which matches ident.  Return the */
                        /* entry number of matching ident, or -1 if fail */
{
   register int i;

for(i=0;i<NACFT;i++)
      {
      if(!strnicmp(nnumber[i],ident,6)) return i;
      }
   return -1;                                           /* id not found */
   }
/*-----------------------------------------------------------------*/ int find_empty()
                        /* Routine to find empty slot for new aircraft  */
                        /* depends on data_pointer being set to -1 for  */
                        /* empty slots                                  */
{
   register int i;
   for (i=1;i<NACFT;i++)
      if (data_pointer[i] == -1)
         return i;
      else
         return -1;        /* only way this can happen is if array is full*/
}
/*-----------------------------------------------------------------*/ void clear_entry(i)

register int i;
{
   register int   j;

data_pointer[i] = -1;
   nnumber[i][0] = '\0';
   for (j=0;j<NDATA;j++)
      plotted[i][j] = true;
}
/*-----------------------------------------------------------------*/ float dist(double mlat, double mlon, double hlat, double hlon,
      float *bearing)
                        /* Routine to calculate the distance and bearing */
                        /* to a target, given latitudes and longitudes of*/
                        /* my aircraft and the target aircraft           */
{
   double   deltalat, deltalong, avelat;
   float    length;

deltalat = (hlat - mlat) * 60.;
   avelat = (hlat + mlat) / 2.;
   deltalong = (mlon - hlon)  * cos (avelat * c) * 60.;
   length = sqrt (deltalat * deltalat + deltalong * deltalong);
   if (deltalong)
      {
      *bearing = 90. - atan (deltalat / deltalong) / c;
      if (deltalong < 0.)  *bearing = *bearing + 180.;
```

```
          }
       else
       {
          if (deltalat < 0.)
             *bearing = 180.;
          else
             *bearing = 360.;
       }
       return length;
}
/*-------------------------------------------------------------------*/
float relative(hdg, abs_heading)
                        /* this routine calculates relative bearing to   */
                        /* target, given my heading and an absolute      */
                        /* bearing to a target                           */
float    hdg, abs_heading;
{
    float   rel;

rel = 360. - hdg + abs_heading;
    if (rel>360.) rel -= 360.;
    return rel;
}
/*-------------------------------------------------------------------*/
void distance_circles()
                        /* draws distance circles on display             */
{
char    disp_buffer[30];
int     i;

LINEWIDTH = 1;
   for (i=1;i<5;i++)                                    /* draw circles          */
       drawOval(0,0,i*radius,DARKGRAY,circle_ratio);
   gotoxy(60,29);
   sprintf(disp_buffer,"%3.3g MILES / CIRCLE\0",1.0/scale);
   writString(disp_buffer,LIGHTGREEN,0);
   drawLine(0,239,15,230,LIGHTCYAN);          /* draw              */
   drawLine(15,230,15,220,LIGHTCYAN);         /*    heading        */
   drawLine(15,220,-15,220,LIGHTCYAN);        /*         arrow     */
   drawLine(-15,220,-15,230,LIGHTCYAN);       /*             box   */
   drawLine(-15,230,0,239,LIGHTCYAN);         /*                   */
}
/*-------------------------------------------------------------------*/
void center_airplane(int j)
                        /* Draws an airplane at (0,0), puts heading */
                        /* at top of screen                         */
{
   float         hdg;
   static char   disp_heading[5], disp_altitude[5], disp_count[5];
   static int    y = 0;
   int           x;

hdg = myheading;
   LINEWIDTH = 1;
   OPERATOR = REPLACE;
   plot_airplane(0,0,LIGHTBLUE,0);
   plot_horz_str(-11,218,disp_heading,BLACK);        /* erase heading           */
   if (hdg < 0)                                      /* convert                 */
      hdg += 360.;                                   /*     heading             */
   sprintf(disp_heading,"%3.3i",(int)(hdg+.5));      /*         to              */
   disp_heading[3] = '\0';                           /*             string      */
   plot_horz_str(-11,218,disp_heading,LIGHTCYAN);    /* plot new heading value*/
   plot_horz_str(10,-25,disp_altitude,BLACK);        /* erase altitude          */
   drawLine(0,0,0,y,BLACK);                          /* erase vector            */
   if (vector_flag)
   {
      x = 0;
      y = myspeed * 60. * 50. * scale;
```

```
        clip(x,y);
        drawLine(0,0,0,y,LIGHTBLUE);
    } if (altitude_flag)
    {
        sprintf(disp_altitude,"%3.3i",(int)myalt);
        disp_altitude[3] = '\0';
        plot_horz_str(10,-25,disp_altitude,LIGHTBLUE);
    }
#if NOGRAPH < 0
    plot_horz_str(290,-226,disp_count,BLACK);
    sprintf(disp_count,"%4.4i",records_read);
    disp_count[4] = '\0';
    plot_horz_str(290,-226,disp_count,MAGENTA);
#endif
}
/*--------------------------------------------------------------------*/ void airplane(int j, int k)
                        /* Routine to plot an airplane symbol with    */
                        /* appropriate heading                        */
{
    float   length, temp, angle;
    int     x, y, x3, y3, xalt, yalt, picture;
    char    disp_alt[10];

k = check(k);
    temp = rel_heading[j][k];
    LINEWIDTH = 1;
    x = radius * scale * distance[j][k] * cos ((450. - rel_bearing[j][k]) * c);
    y = radius * scale * distance[j][k] * sin ((450. - rel_bearing[j][k]) * c);
    if (!clip(&x,&y))
    {
        temp = temp + 11.25;
        if (temp > 360.)
            temp -= 360.;
        picture = (int) (temp / 22.5);
        plot_airplane(x,y,color,picture);
        if (vector_flag)
        {
            length = speed[j][k] * 60. * 50. * scale;
            angle = (90.0 - rel_heading[j][k]) * c;
            x3 = x + length * cos (angle);
            y3 = y + length * sin (angle);
            clip(&x3,&y3);
            drawLine(x,y,x3,y3,color);
        }
        if (altitude_flag)
        {
            sprintf(disp_alt,"%3.3i",(int)altitude[j][k]);
            disp_alt[3] = '\0';
            xalt = x + 10;
            yalt = y - 25.;
            plot_horz_str(xalt,yalt,disp_alt,color);
        }
    }
    plotted[j][k] = true;
}
/*--------------------------------------------------------------------*/ int clip(x,y)

int     *x, *y;
{
    int     clipped = false;

if (*x < -320)
    {
        *x = -320;
        clipped = true;
    }
    if (*x > 320)
```

```c
    {
        *x = 320;
        clipped = true;
    }
    if (*y < -240)
    {
        *y = -240;
        clipped = true;
    }
    if (*y > 240)
    {
        *y = 240;
        clipped = true;
    }
    return clipped;
}
/*-----------------------------------------------------------------*/ void plot_airplane(int x, int y, int color, int angle)
{
unsigned int        mask;
int                 row, column;
static unsigned int pattern[16][16] = {
    0x0000,0x0000,0x0000,0x0180,0x0180,0x03c0,0xffff,0xffff,0x3ffc,0x03c0,
    0x0180,0x0180,0x0180,0x0180,0x07e0,0x07e0, /* pattern 0     */
    0x0000,0x0000,0x0000,0x6060,0x78e0,0x3ee0,0x1fc0,0x0ff0,0x07fc,0x03ff,
    0x071f,0x2600,0x7e00,0x3c00,0x0f00,0x0700, /* pattern 1     */
    0x0000,0x3000,0x3800,0x1c00,0x1e60,0x0fe0,0x0fc0,0x07c0,0x07e0,0x4ff0,
    0xfcf8,0x783c,0x380c,0x1c00,0x0800,0x0000, /* pattern 2     */
    0x0400,0x0e00,0x0e00,0x0700,0x0700,0x07b8,0x03f8,0x03f0,0xc7c0,0xdfe0,
    0xfde0,0x70f0,0x3070,0x3878,0x1038,0x0010, /* pattern 3     */
    0x00c0,0x00c0,0x01c0,0x01c0,0x01c0,0xc1c0,0xc3e0,0xfff8,0xfff8,0xc3e0,
    0xc1c0,0x01c0,0x01c0,0x01c0,0x00c0,0x00c0, /* pattern 4     */
    0x0000,0x1018,0x3838,0x3070,0x70f0,0xfde0,0xdfe0,0xc7c0,0x03f0,0x03f8,
    0x03b8,0x0780,0x0700,0x0700,0x0600,0x0600, /* pattern 5     */
    0x0400,0x0e00,0x1c06,0x3c1e,0x7e7c,0x27f8,0x03f0,0x03e0,0x07e0,0x07f0,
    0x0f30,0x0e00,0x1c00,0x1800,0x0000,0x0000, /* pattern 6     */
    0x0700,0x0f00,0x3c00,0x7e00,0x2600,0x077f,0x03ff,0x07fc,0x0ff0,0x1fc0,
    0x3ee0,0x78e0,0x6060,0x0000,0x0000,0x0000, /* pattern 7     */
    0x07e0,0x07e0,0x0180,0x0180,0x0180,0x0180,0x03c0,0x3ffc,0xffff,0xffff,
    0x03c0,0x0180,0x0180,0x0000,0x0000,0x0000, /* pattern 8     */
    0x00e0,0x00f0,0x003c,0x007e,0x0064,0xfee0,0xffc0,0x3fe0,0x0ff0,0x03f8,
    0x077c,0x071e,0x0606,0x0000,0x0000,0x0000, /* pattern 9     */
    0x0000,0x0010,0x0038,0x301c,0x3c1e,0x1f3f,0x0ff2,0x07e0,0x03e0,0x03f0,
    0x07f0,0x0678,0x0038,0x001c,0x000c,0x0000, /* pattern 10    */
    0x0000,0x1800,0x1c1c,0x0e0c,0x0f0e,0x07bf,0x07fb,0x03e3,0x0fc0,0x1fe0,
    0x1de0,0x01e0,0x00e0,0x00e0,0x0060,0x0060, /* pattern 11    */
    0x0300,0x0300,0x0380,0x0380,0x0380,0x0383,0x07c3,0x1fff,0x1fff,0x07c3,
    0x0383,0x0380,0x0380,0x0380,0x0300,0x0300, /* pattern 12    */
    0x0060,0x0060,0x00e0,0x00e0,0x01e0,0x1de0,0x1fe0,0x0fc0,0x03e3,0x07fb,
    0x07bf,0x0f0e,0x0e0c,0x1c1c,0x1808,0x0000, /* pattern 13    */
    0x0000,0x0000,0x0018,0x0038,0x0070,0x0cf0,0x0fe0,0x07e0,0x07c0,0x0fc0,
    0x1fe4,0x3e7e,0x783c,0x6038,0x0070,0x0020, /* pattern 14    */
    0x0000,0x0000,0x0000,0x0606,0x071e,0x077c,0x03f8,0x0ff0,0x3fe0,0xffc0,
    0xfee0,0x0064,0x007e,0x003c,0x00f0,0x00e0  /* pattern 15    */
};

for (row = 0; row < 16 ; row++)
        {
        for (column = 0; column < 16; column++)
        { mask = 0x8000 >> column;
            if (pattern[angle][row] & mask)
                    plots(x-8+column,y+8-row,color);
        }
    }
}
/*-----------------------------------------------------------------*/ void plot_previous_large(float bearing, float dist)
                        /* A routine to plot a large dot in the previous */
                        /* position of an aircraft                       */
```

```c
{
   int   x, y ;

x = radius * dist * cos ((450. - bearing) * c);
   y = radius * dist * sin ((450. - bearing) * c);
   fillOval(x,y,2,color,circle_ratio)   ;
}
/*------------------------------------------------------------------*/ void plot_previous_small(float bearing, float dist)
                              /* A routine to plot a small dot in the previous */
                              /* position of an aircraft                       */
{
   int   x, y ;

x = radius * dist * cos ((450. - bearing) * c);
   y = radius * dist * sin ((450. - bearing) * c);
   fillOval(x,y,1,color,circle_ratio)   ;
}
/*------------------------------------------------------------------*/
void update()
                              /* This is a routine to update relative positions*/
                              /* after the position of the primary aircraft    */
                              /* (myplane) changes                             */
{
   register int   i, j, new;
   float          direction;

mylat = latitude[0][data_pointer[0]];
   mylon = longitude[0][data_pointer[0]];
   myalt = altitude[0][data_pointer[0]];
   myheading = heading[0][data_pointer[0]];
   myspeed = speed[0][data_pointer[0]];
   for (i=1;i<NACFT;i++)
      {
      j = data_pointer[i];
      if (j != -1)
         {
         new = check(j+1);
         data_pointer[i] = new;
         latitude[i][new] = latitude[i][j];
         longitude[i][new] = longitude[i][j];
         altitude[i][new] = altitude[i][j];
         sample_time[i][new] = sample_time[i][j];
         heading[i][new] = heading[i][j];
         speed[i][new] = speed[i][j];
         v_speed[i][new] = v_speed[i][j];
         plotted[i][new] = false;

/*-------- calculate new distance ,rel_bearing, rel_heading  --------*/ distance[i][new] = dist(mylat,mylon,latitude[i][new],
               longitude[i][new],&direction);
         rel_bearing[i][new] = relative(myheading,direction);
         rel_heading[i][new] = relative(myheading,heading[i][new]);
         }
      }
}
/*------------------------------------------------------------------*/ int check(register int i)
                              /* This routine checks the value of the data  */
                              /* pointer, and sets it between 0 and NDATA -1 */
{
   if (i > NDATA-1)
      i = i - NDATA;
   if (i<0)
      i = i + NDATA;
   return i;
}
/*------------------------------------------------------------------*/
```

```c
void check_keyboard()
{
    char key;
    if (kbhit())
    {
        key = getch();
        if (key == 0)                       /* if value = 0, its a function key */
            key = getch();                  /* get the key value */
        if (key == F1)
            vector_flag = toggle(vector_flag);
        if (key == F2)
            altitude_flag = toggle(altitude_flag);
        if (key == F3)
            nnumber_flag = toggle(nnumber_flag);
        if (key == F4)
            zoom(1);                        /* zoom in */
        if (key == F5)
            zoom(0);                        /* zoom out */
        if (key == F6)
            data_save_flag = toggle(data_save_flag);   /* save input data */
        if (key == F7)
            print_string_flag = toggle(print_string_flag);

if (key == F11)
            initialize();
#if COMP == 1
        if (key == F10)
        {
            data_in();
            process_data();
        }
        if (key == SF10)
            autoread_flag = toggle(autoread_flag);
#endif
        key = tolower(key);
        if (key == 'q')
            terminate();
    }
#if COMP == 1
    if (autoread_flag)
    {
        data_in();
        process_data();
    }
#endif
}
/*-------------------------------------------------------------------------*/ int toggle( int variable)

{
    if (variable > 0)
        variable = false;
    else
        variable = true;
    return variable;
}
/*-------------------------------------------------------------------------*/ void zoom(int i)
{
    switch (i)
    {
        case 0:
        {
            if (scale > .015625)
                scale = scale / 2.0;
            break;
        }
        case 1:
        {
            if (scale < 4)
                scale = scale * 2.0;
```

```c
            break;
        }
    }
    cls(BLACK);
    distance_circles();
    update();
    hold_rewrite = true;
}
/*--------------------------------------------------------------------*/
int validate(buffer)
    char    buffer[81];
{
    register int    err;
    int             cksum, value;
    char            ascii_cksum[10], temp[10], *stop;

if (buffer[0] != '[')
        return 1;                               /* 1 = no left bracket */
    checksum(buffer,&cksum,ascii_cksum,32);
    memmove(temp,&buffer[32],2);
    temp[2] = '\0';
    value = (int)strtoul(temp,&stop,16);
/*  printf("%i;%i\n",value,cksum);*/
    if (cksum != value)
        return 2;                               /* 2 = bad checksum   */
    else
        return 0;                               /* 0 = no error       */
}
/*--------------------------------------------------------------------*/
void checksum(buffer,cksum,ascii_cksum,nchars)
    char    buffer[81], ascii_cksum[10];
    int     nchars, *cksum;
{
    register int    i;

*cksum = 0;
    for (i=0;i<nchars;i++)
    {
/*      printf("%c,%d\n",buffer[i],buffer[i]);*/
        *cksum = *cksum + buffer[i];
    }
    *cksum = *cksum & 0xFF;
    itoa(*cksum,ascii_cksum,16);
/*  printf("checksum = %d;   %s;   # digits = %d\n",*cksum,ascii_cksum,nchars); */
}
/*--------------------------------------------------------------------*/
void align(buffer)
    char    buffer[81];

{
    register int    i, j, k;
    char            temp[80];

i = strcspn(&buffer[1],"[");                /* search for "[" in string */
    i++;
    if (i < 35)                                 /* found one */
        memmove(buffer,&buffer[i],35);          /* shift to left justify */
    else
    {
        do
        {
            read_buffer(temp,1);                /* go find a "[" */
        } while (!memicmp(temp,"[",1));
    }
    for (j=0;j<i;)                              /* fill the rest of the buffer */
    {
        read_buffer(temp,1);
```

```
      if (!memicmp(temp,"[",1))              /* if start of next one */
      {                                       /* just start over */
         buffer[0] = '[';
         read_buffer(temp,34);                /* so go ahead and read it*/
         memmove(&buffer[1],temp,34);
         buffer[35]='\0';
         return;
      }
      k = 35-i+j;
      memmove(&buffer[k],&temp[0],1);         /* s'ok,put it into buffr*/
      j++;
   }
   buffer[35]='\0';
}
/*-----------------------------------------------------------------*/
void open_port()

{
   if (xc_entr(2) == 0)
   {
      if (PORT == COM3)
         setport(0x2E8,1,4,PORT,0);
      xc_link(PORT,0);
      xc_init(PORT,RATE,NOPAR,DATA8,STOP1);
   }
   else
   {
      printf("Unable to open PORT");
      exit(0);
   }
}
/*-----------------------------------------------------------------*/
int read_buffer(buffer,count)

int    count;
char   buffer[81];

{
char key;

if (xc_test(PORT) >= count)
   {
      xc_get(PORT,buffer,&count);
      buffer[35]='\0';
      return 1;
   }
/*   if (kbhit())
   {
      key = getch();
      key = tolower(key);
      if (key == 'q')
         terminate();
   }*/
   return 0;
}
/*-----------------------------------------------------------------*/
void terminate()
{ if COMP==2
   xc_unlk(PORT);
   xc_exit();
#endif
   setMode(save_mode);
   cls(0) ;
   exit(0);
}
/*-----------------------------------------------------------------*/
#if COMP==1
void open_file()
```

```
                        /* Routine to open a data file               */
{
   if ((fp = fopen("data","r"))   == NULL)
      {
      printf("Cannot open data file\n")        ;
      terminate()                              ;
      }
}
/*------------------------------------------------------------------*/ void read_rec()
                        /* read a file record (terminated with \n)   */
{
   int       i                                 ;
   char      ch                                ;

i=0                                         ;
   ch = getc(fp)                               ;
   while (ch!='\n'&&ch!=EOF)
   {
      read_string[i] = ch                      ;
      i++                                      ;
      ch = getc(fp)                            ;
      }
   read_string[i] = '\0'                       ;
/*  printf ("%s\n",read_string)                ;*/
}
#endif
/*------------------------------------------------------------------*/ void plot_read_string()

{
char  out_string[40];
static char old_string[40] = "                                      ";

OPERATOR = REPLACE;
   sprintf(out_string,"%s\n",read_string);
   out_string[35] = '\0';
   plot_horz_str(-300,-210,old_string,BLACK);
   plot_horz_str(-300,-210,out_string,LIGHTRED);
   memmove(old_string,out_string,36);
}
/*------------------------------------------------------------------*/
void open_save_file()
                        /* Routine to open file to save data         */

{
   if ((save_file = fopen("datasave","a"))   == NULL)
      {
      printf("Cannot open save file\n")        ;
      terminate()                              ;
      }
}
/*------------------------------------------------------------------*/
/*                        END OF PROGRAM                            */
/*------------------------------------------------------------------*/
```

What is claimed and desired to be secured by United States Letters Patent is:

1. A method for announcing the position of a first aircraft at a first position, the first position being within airspace containing a plurality of other aircraft, to a receiver located at a second position not farther than a predetermined range from the first position, the method comprising the steps of:
   (a) determining on board the first aircraft the position of the first aircraft relative to a fixed reference;
   (b) encoding an identification code, the presence or absence of any current operating communication radio frequency and the position of the first aircraft so that the identification code, the presence or absence of current operating communication radio frequency and the position of the first aircraft can be carried by a first radio frequency signal;
   (c) avoiding conflicts with any radio frequency signals present in the airspace which conflict with the first radio frequency signal;
   (d) transmitting from the first aircraft the first radio frequency signal carrying the identification code, the presence or absence of any current operating communication radio frequency and the position of the first aircraft;
   (e) receiving the first radio frequency signal transmitted from the first aircraft at the second position;
   (f) decoding the identification code, the current operating communication radio frequency if any, and the position of the first aircraft from the first radio frequency signal; and
   (g) monitoring on a visual display the identification code, the current operating communication radio frequency if any, and the position of the first aircraft within the airspace at the second position so that the position of the first aircraft within the airspace is known relative to the fixed reference, and so that communication can potentially be undertaken with the specifically identified aircraft.

2. A method for announcing the position of a first aircraft at a first position to a receiver located at a second position as defined in claim 1 wherein the step of determining the position of the first craft comprises the step of receiving a LORAN signal.

3. A method for announcing the position of a first aircraft at a first position to a receiver located at a second position as defined in claim 1 wherein the step of determining the position of the first craft comprises the step of receiving a GPS signal.

4. A method for announcing the position of a first aircraft at a first position to a receiver located at a second position as defined in claim 1 wherein the fixed reference exists both within the airspace and outside the airspace.

5. A method for announcing the position of a first aircraft at a first position to a receiver located at a second position as defined in claim 4 wherein the step of determining the position of the first aircraft comprises the step of determining the position of the first aircraft in reference to the fixed reference.

6. A method for announcing the position of a first aircraft at a first position to a receiver located at a second position as defined in claim 5 wherein the step of determining the position of the first aircraft further comprises the step of determining the altitude of the first aircraft.

7. A method for announcing the position of a first aircraft at a first position to a receiver located at a second position as defined in claim 1 or 5 wherein the step of encoding the position of the first aircraft comprises the step of encoding the position of the aircraft into a digital pulse train.

8. A method for announcing the position of a first aircraft at a first position to a receiver located at a second position as defined in claim 7 wherein the step of encoding the position of the first aircraft further comprises the step of translating the position of the first aircraft into an audio signal.

9. A method for announcing the position of a first aircraft at a first position to a receiver located at a second position as defined in claim 1 wherein the step of avoiding conflicts with any conflicting radio frequency signals in the airspace comprises the step of listening for any conflicting radio frequency signals.

10. A method for announcing the position of a first aircraft at a first position to a receiver located at a second position as defined in claim 9 wherein the step of avoiding conflicts with any conflicting radio frequency signals in the airspace comprises the step of waiting a period of time prior to transmission.

11. A method for announcing the position of a first aircraft at a first position to a receiver located at a second position as defined in claim 10 wherein the step of avoiding conflicts with any conflicting radio frequency signals in the airspace comprises the step of waiting a predetermined period of time prior to transmission.

12. A method for announcing the position of a first aircraft at a first position to a receiver located at a second position as defined in claim 10 wherein the step of avoiding conflicts with any conflicting radio frequency signals in the airspace comprises the step of waiting a random period of time prior to transmission.

13. A method for announcing the position of a first aircraft at a first position to a receiver located at a second position as defined in claim 1 or 10 wherein the step of avoiding conflicts with any conflicting radio frequency signals in the airspace comprises the step of transmitting a radio frequency signal in a non-interrogation manner.

14. A method for announcing the position of a first aircraft at a first position to a receiver located at a second position as defined in claim 1 wherein the step of transmitting the first radio frequency signal comprises the step of transmitting the first radio frequency signal in the frequency range from about and including the VHF band to about and including the SHF band.

15. A method for announcing the position of a first aircraft at a first position to a receiver located at a second position as defined in claim 1 wherein the step of transmitting the first radio frequency signal comprises the step of transmitting the first radio frequency signal in a substantially omnidirectional pattern.

16. A method for announcing the position of a first aircraft at a first position to a receiver located at a second position as defined in claim 1 further comprising the step of repeating steps (a) through (g).

17. A method for announcing the position of a first aircraft at a first position to a receiver located at a second position as defined in claim 16 wherein the step of monitoring the position of the first aircraft comprises the step of repeatedly displaying the position of the first aircraft on a display as the aircraft changes position.

18. A method for announcing the position of a first aircraft at a first position to a receiver located at a second position as defined in claim 17 wherein the step of monitoring the position of the first aircraft further comprises the step of displaying the heading and the speed of the first aircraft on a display.

19. A method for announcing the position of a first aircraft at a first position to a receiver located at a second position as defined in claim 1 wherein the step of monitoring the position of the first aircraft comprises the step of displaying the relative position of the first aircraft on a display over a selected period of time.

20. A method for announcing the position of a first aircraft at a first position to a receiver located at a second position as defined in claim 1 further comprising the step of determining the location of the second position relative to the fixed reference and wherein the step of monitoring the position of the first aircraft comprises the step of displaying the position of the first aircraft and the location of the second position.

21. A method of tracking the position of a first craft by monitoring receiver at a second craft, the first craft and the monitoring receiver being within a predetermined range of each other, the method comprising the steps of:
  (a) determining, internally to the first craft using an external automated navigational system, the first craft's position in at least one plane of space;
  (b) encoding for the first craft an identification code, the presence or absence of any current communication radio frequency and the first craft's position, all in a form which can be carried by a first radio frequency signal;
  (c) determining when the first radio frequency signal should be transmitted;
  (d) transmitting the first radio frequency signal;
  (e) receiving the first radio frequency signal at the monitoring receiver of the second craft;
  (f) decoding at the monitoring receiver of the second craft the first craft's identification code, any current communication radio frequency and the position from the first radio frequency signal;
  (g) displaying the identification code, any current communication radio frequency and the position of the first craft at the monitoring receiver of the second craft; and
  (h) repeating steps (a) through (g).

22. A method of tracking the position of a first craft by a monitoring receiver, the first craft and the monitoring receiver being within a predetermined range of each other, as defined in claim 21 wherein the step of determining the first craft's position comprises the step of determining the first craft's position using a LORAN receiver.

23. A method of tracking the position of a first craft by a monitoring receiver, the first craft and the monitoring receiver being within a predetermined range of each other, as defined in claim 21 wherein the step of determining the first craft's position comprises the step of determining the first craft's position using a GPS receiver.

24. A method of tracking the position of a first craft by a monitoring receiver, the first craft and the monitoring receiver being within a predetermined range of each other, as defined in claim 21 wherein the first craft's position is defined in reference to the latitude and longitude of the first craft.

25. A method of tracking the position of a first craft by a monitoring receiver, the first craft and the monitoring receiver being within a predetermined range of each other, as defined in claim 24 wherein the step of determining the first craft's position further comprises the step of determining the altitude of the first craft.

26. A method of tracking the position of a first craft by a monitoring receiver, the first craft and the monitoring receiver being within a predetermined range of each other, as defined in claim 24 or 25 wherein the step of encoding the first craft's position comprises the step of encoding the position of the first craft into a digital pulse train.

27. A method of tracking the position of a first craft by a monitoring receiver, the first craft and the monitoring receiver being within a predetermined range of each other, as defined in claim 26 wherein the step of encoding the position of the first craft's position further comprises the step of translating the position of the first craft into an audio signal.

28. A method of tracking the position of a first craft by a monitoring receiver, the first craft and the monitoring receiver being within a predetermined range of each other, as defined in claim 21 further comprising the step of avoiding conflicts with any conflicting radio frequency signals in the airspace.

29. A method of tracking the position of a first craft by a monitoring receiver, the first craft and the monitoring receiver being within a predetermined range of each other, as defined in claim 28 wherein the step of avoiding conflicts with any conflicting radio frequency signals in the airspace comprises the step of listening for any conflicting radio frequency signals.

30. A method of tracking the position of a first craft by a monitoring receiver, the first craft and the monitoring receiver being within a predetermined range of each other, as defined in claim 28 wherein the step of avoiding conflicts with any conflicting radio frequency signals in the airspace comprises the step of waiting a period of time prior to transmission.

31. A method of tracking the position of a first craft by a monitoring receiver, the first craft and the monitoring receiver being within a predetermined range of each other, as defined in claim 28 wherein the step of avoiding conflicts with any conflicting radio frequency signals in the airspace comprises the step of waiting a predetermined period of time prior to transmission.

32. A method of tracking the position of a first craft by a monitoring receiver, the first craft and the monitoring receiver being within a predetermined range of each other, as defined in claim 21 or 28 wherein the step of avoiding conflicts with any conflicting radio frequency signals in the airspace comprises the step of transmitting a radio frequency signal in a non-interrogation manner.

33. A method of tracking the position of a first craft by a monitoring receiver, the first craft and the monitoring receiver being within a predetermined range of each other, as defined in claim 21 wherein the step of transmitting the first radio frequency signal comprises the step of transmitting the first radio frequency signal in the frequency range from about and including the VHF band to about and including the SHF band.

34. A method of tracking the position of a first craft by a monitoring receiver, the first craft and the monitoring receiver being within a predetermined range of each other, as defined in claim 21 wherein the step of transmitting the first radio frequency signal comprises the step of transmitting the first radio frequency signal in a substantially omnidirectional pattern.

35. A method of tracking the position of a first craft by a monitoring receiver, the first craft and the monitoring receiver being within a predetermined range of each other, as defined in claim 21 wherein the step of displaying the position of the first craft at the monitoring receiver comprises the step of repeatedly displaying the position of the first craft on a display of the second craft as the first craft changes position.

36. A method of tracking the position of a first craft by a monitoring receiver, the first craft and the monitoring receiver being within a predetermined range of each other, as defined in claim 21 wherein the step of displaying the position of the first craft at the monitoring receiver further comprises the step of displaying the heading and the speed of the first craft on a display at the second craft.

37. A method of tracking the position of a first craft by a monitoring receiver, the first craft and the monitoring receiver being within a predetermined range of each other, as defined in claim 35 comprises the step of displaying the position of the second craft on a display, the second craft having the monitoring receiver on board.

38. A method of tracking the position of a first craft by a monitoring receiver, the first craft and the monitoring receiver being within a predetermined range of each other, as defined in claim 37 further comprising the step of determining the location of the second position relative to the fixed reference and wherein the step of displaying the position of the first craft comprises the step of displaying the position of the first craft and the location of the monitoring receiver on the display.

39. A method of tracking the position of a first craft from on board a second craft, the first and second craft being within a predetermined range of each other, the method comprising the steps of:
 (a) determining on board the first craft using an existing automated navigational system the first craft's position in at least two perpendicular planes of space which are of interest to the second craft;
 (b) encoding for the first craft its identification code and the presence or absence of a current operating communication radio frequency on which voice contact can be initiated to the first craft, and encoding the first craft's position, all in a form which can be carried by a first radio frequency signal;
 (c) determining whether the first radio frequency signal will conflict with any other radio frequency signals;
 (d) transmitting the first radio frequency signal;
 (e) receiving the first radio frequency signal at the second craft;
 (f) decoding and displaying the first craft's identification code, current operating communication radio frequency if any and the first craft's position, all from the first radio frequency signal, such that the first craft can potentially be contacted by voice communication;
 (g) apprising the operator of the second craft when the position of the first craft is within an advisory range; and
 (h) repeating steps (a) through (g).

40. A method of tracking the position of a first craft from on board a second craft, the first and second craft being within a predetermined range of each other, as defined in claim 39 wherein the step (a) of determining the first craft's position comprises the step of receiving a LORAN signal and determining the first craft's position in latitude and longitude.

41. A method of tracking the position of a first craft from on board a second craft, the first and second craft being within a predetermined range of each other, as defined in claim 39 wherein the step (a) of determining the first craft's position comprises the step of receiving a GPS signal.

42. A method of tracking the position of a first craft from on board a second craft, the first and second craft being within a predetermined range of each other, as defined in claim 39 wherein said existing automated navigational system is available both within and outside the predetermined range.

43. A method of tracking the position of a first craft from on board a second craft, the first and second craft being within a predetermined range of each other, as defined in claim 42 wherein the step (a) of determining the first craft's position comprises the step of determining the first craft's position in latitude and longitude.

44. A method of tracking the position of a first craft from on board a second craft, the first and second craft being within a predetermined range of each other, as defined in claim 42 wherein the step (a) of determining the first craft's position further comprises the step of determining the altitude of the first craft.

45. A method for announcing the position of a first aircraft at a first position to a receiver located at a second position as defined in claim 43 or 44 wherein the step of avoiding conflicts with any conflicting radio frequency signals in the airspace comprises the step of transmitting a radio frequency signal in a non-interrogation manner.

46. A method of tracking the position of a first craft from on board a second craft, the first and second craft being within a predetermined range of each other, as defined in claim 43 or 44 wherein the step of encoding the first craft's position comprises the step of encoding the position of the first craft into a digital pulse train.

47. A method of tracking the position of a first craft from on board a second craft, the first and second craft being within a predetermined range of each other, as defined in claim 46 wherein the step of encoding the position of the first aircraft further comprises the step of translating the first craft's position into an audio signal.

48. A method of tracking the position of a first craft from on board a second craft, the first and second craft being within a predetermined range of each other, as defined in claim 46 wherein the step of determining whether the first radio frequency signal will conflict with any other radio frequency signals comprises the steps of:
 listening for any conflicting radio frequency signals; and
 waiting a period of time prior to transmission.

49. A method of tracking the position of a first craft from on board a second craft, the first and second craft being within a predetermined range of each other, as defined in claim 48 wherein the step of waiting a period of time comprises the step of waiting a randomly assigned period of time.

50. A method of tracking the position of a first craft from on board a second craft, the first and second craft being within a predetermined range of each other, as defined in claim 39 wherein the step of encoding the first craft's position comprises the step of encoding an identification code for the first craft so that the identification code can be carried by the first radio frequency signal and wherein the step of transmitting the first radio frequency signal comprises the steps of:
 transmitting the first radio frequency signal in the frequency range from about and including the VHF band to about and including the SHF band; transmitting the first radio frequency signal in a substantially omnidirectional pattern; and transmitting the identification code for the first craft.

51. A method of tracking the position of a first craft from on board a second craft, the first and second craft being within a predetermined range of each other, as defined in claim 39 wherein the step of apprising the operator comprises the step of repeatedly displaying the position of the first craft on a display as the first craft changes position.

52. A method of tracking the position of a first craft from on board a second craft, the first and second craft being within a predetermined range of each other, as defined in claim 51 wherein the step of apprising the operator of the second craft comprises the steps of:
displaying the relative position and direction of travel of the first craft on a display; and
displaying the position of the second craft on a display.

53. A method of avoiding collisions between a first craft having a first identification code and at least a second craft having a second identification code, the first and second crafts coming within a predetermined range of each other, the method comprising the steps of:
(a) determining, on board to the first craft and using an existing automated navigational system, the first craft's position in at least one plane in space which is of interest to the second craft to avoid a collision with the first craft;
(b) encoding the first craft's position, identification code and the presence or absence of any current operating communication radio frequency on which voice contact with the first craft can be established, all to be carried by a first radio frequency signal;
(c) listening for any radio frequency signals present on the same frequency allocation as the first radio frequency signal;
(d) transmitting the first radio frequency signal carrying the first craft's position, identification code and the presence or absence of any current communication radio frequency on which voice contact with the first craft can be established;
(e) receiving the first radio frequency signal at the second craft;
(f) decoding from the first radio frequency the first craft's position, identification code and current communication radio frequency, if any, on which voice contact with the first craft can be established;
(g) determining the second craft's position, on board the second craft by using said existing automated navigational system, and in at least one dimension of space, which is of interest to the operator of the second craft, to avoid a collision with the first craft;
(h) displaying, on board the second craft, the position, identification code and current communication radio frequency, if any, on which voice contact to the first craft can be established, and displaying the location of the second craft so that the operator of the second craft is apprised of the location of the both the first craft and the second craft so as to avoid a collision therebetween; and
(i) repeating steps (a) through (h).

54. A method of avoiding collisions between a first craft having a first identification code and at least a second craft having a second identification code, the first and second craft coming within a predetermined range of each other, as defined in claim 53 wherein the step of determining the first craft's position comprises the step of receiving a LORAN signal or a GPS signal.

55. A method of avoiding collisions between a first craft having a first identification code and at least a second craft having a second identification code, the first and second craft coming within a predetermined range of each other, as defined in claim 54 wherein the first craft comprises an aircraft and wherein the step of determining first craft's position comprises the step of determining the latitude, longitude, and altitude of the first aircraft.

56. A method of avoiding collisions between a first craft having a first identification code and at least a second craft having a second identification code, the first and second craft coming within a predetermined range of each other, as defined in claim 53 wherein the step of encoding the first craft's position comprises the stop of encoding the latitude and longitude of the first craft into a digital pulse train which can be carried by a frequency modulated first radio frequency signal.

57. A method of avoiding collisions between a first craft having a first identification code and at least a second craft having a second identification code, the first and second craft coming within a predetermined range of each other, as defined in claim 53 further comprises the step of waiting a period of time after a conflicting radio frequency signal is heard prior to transmission of the first radio frequency signal, the period of time being different for the first craft and the second craft, the transmission of the first radio frequency signal being initiated without interrogation from another radio frequency signal.

58. A method of avoiding collisions between a first craft having a first identification code and at least a second craft having a second identification code, the first and second craft coming within a predetermined range of each other, as defined in claim 53 wherein the step of transmitting the first radio frequency signal comprises the step of transmitting the first radio frequency signal in the frequency range from about and including the VHF band to about and including the SHF band in a substantially omnidirectional pattern.

59. A method of avoiding collisions between a first craft having a first identification code and at least a second craft having a second identification code, the first and second craft coming within a predetermined range of each other, as defined in claim 53 wherein the step of displaying the position of the first craft comprises the step of displaying the relative direction of travel of the first craft on a display.

60. An apparatus for announcing the position of a first aircraft at a first position within airspace containing a plurality of other aircraft, to a receiver located at a second position within a predetermined range of the first aircraft, the first aircraft being within operational range of an existing navigational system which can provide position information in at least two planes of interest, the apparatus comprising:
means for making an on board determination of the position of the first aircraft using the existing navigational system;
means for encoding the position of the first aircraft, and any identification code and the presence or absence of any current communication radio frequency on which voice contact to the first aircraft can be made, into information which can be carried by a first radio frequency signal;

means for detecting the presence of any conflicting radio frequency signal which would interfere with the first radio frequency signal and determining whether transmission of the first radio frequency should proceed;

means for transmitting the first radio frequency signal from the first aircraft such that the radio frequency signal can be received at the receiver, decoded, and such that the position, identification code and current communication radio frequency, if any, on which voice contact can be made to the first aircraft is displayed.

61. An apparatus for announcing the position of a first aircraft at a first position to a receiver located at a second position within a predetermined range of the first aircraft, the first aircraft being within operational range of an existing navigational system which can provide position information in at least two planes of interest, as defined in claim 60 wherein the means for making an on board determination of the position of the first aircraft comprises a LORAN receiver.

62. An apparatus for announcing the position of a first aircraft at a first position to a receiver located at a second position within a predetermined range of the first aircraft, the first aircraft being within operational range of an existing navigational system which can provide position information in at least two planes of interest, as defined in claim 60 wherein the means for making an on board determination of the position of the first aircraft comprises a GPS receiver.

63. An apparatus for announcing the position of a first aircraft at a first position to a receiver located at a second position within a predetermined range of the first aircraft, the first aircraft being within operational range of an existing navigational system which can provide position information in at least two planes of interest, as defined in claim 60 wherein the means for making an on board determination of the position of the first aircraft comprises means for determining the latitude and longitude of the first aircraft.

64. An apparatus for announcing the position of a first aircraft at a first position to a receiver located at a second position within a predetermined range of the first aircraft, the first aircraft being within operational range of an existing navigational system which can provide position information in at least two planes of interest, as defined in claim 63 wherein the means for making an on board determination of the position of the first aircraft further comprises means for determining the altitude of the aircraft.

65. An apparatus for announcing the position of a first aircraft at a first position to a receiver located at a second position within a predetermined range of the first aircraft, the first aircraft being within operational range of an existing navigational system which can provide position information in at least two planes of interest, as defined in claim 60 wherein the means for transmitting the first radio frequency signal comprises a radio frequency transmitter operating in a frequency range from about and including the VHF band to about and including the SHF band.

66. An apparatus for announcing the position of a first aircraft at a first position to a receiver located at a second position within a predetermined range of the first aircraft, the first aircraft being within operational range of an existing navigational system which can provide position information in at least two planes of interest, as defined in claim 65 wherein the means for transmitting the first radio frequency signal further comprises an omnidirectional antenna.

67. An apparatus for announcing the position of a first aircraft at a first position to a receiver located at a second position within a predetermined range of the first aircraft, the first aircraft being within operational range of an existing navigational system which can provide position information in at least two planes of interest, as defined in claim 60 wherein the means for detecting the presence of any conflicting radio frequency signal comprises a radio frequency receiver.

68. An apparatus for announcing the position of a first aircraft at a first position to a receiver located at a second position within a predetermined range of the first aircraft, the first aircraft being within operational range of an existing navigational system which can provide position information in at least two planes of interest, as defined in claim 60 wherein the means for encoding the position of the first aircraft is further for encoding an identification code into information which can be carried by the first radio frequency signal.

69. An apparatus for announcing the position of a first aircraft at a first position to a receiver located at a second position within a predetermined range of the first aircraft, the first aircraft being within operational range of an existing navigational system which can provide position information in at least two planes of interest, as defined in claim 60 further comprising:

means for receiving a second radio frequency signal carrying the position and identification code for a second aircraft, and the presence or absence of any current communication radio frequency on which voice contact to the second aircraft can be established;

means for decoding from the second radio frequency signal the second aircraft's position, identification code, and the presence of absence of any current communication radio frequency on which voice contact to the second aircraft can be established; and means for displaying, on board the first aircraft, the second aircraft's position, identification code, and the presence or absence of any current communication radio frequency on which voice contact to the second aircraft can be established so that the operator of the first craft is apprised of the position of the second aircraft and is potentially able to make voice contact with the second aircraft.

70. An apparatus for tracking the position of a second craft from on board a first craft, the first and the second craft being within range of an existing navigational system and within a predetermined range of each other, the apparatus comprising:

means, on board the first craft, for receiving a determination of the position of the first craft using the existing navigational system, the position of the first craft being determined in at least two planes of interest to the operator of the second craft;

means for encoding the first craft's position, and any identification code and the presence or absence of any current communication radio frequency on which voice contact to the first craft can be made, in a form which can be carried by a first radio frequency signal;

means for transmitting the first radio frequency signal;

means for receiving a second radio frequency signal carrying the second craft's position an identification code for the second craft and the presence or absence of any current communication radio frequency on which the second craft can contacted by voice;

means for decoding the second craft's position, identification code and current communication radio frequency, if any, from the second radio frequency signal;

means for displaying, on board the first craft, the second craft's position, identification code and current communication radio frequency, if any, decoded from the second radio frequency signal so that the operator of the first craft is apprised of the position, identification code and current communication radio frequency, if any, of the second craft.

71. An apparatus for tracking the position of a second craft from on board a first craft as defined in claim 70 wherein the means for receiving an on board determination of the position of the first craft comprises a data port adapted to receive data from a LORAN receiver.

72. An apparatus for tracking the position of a second craft from on board a first craft as defined in claim 70 wherein the means for receiving an on board determination of the position of the first craft comprises a data port adapted to receive data from a GPS receiver.

73. An apparatus for tracking the position of a second craft from on board a first craft as defined in claim 70 wherein the means for transmitting the first radio frequency signal comprises:

a radio frequency transmitter operating in a frequency range from about and including the VHF band to about and including the SHF band; and an omnidirectional antenna system.

74. An apparatus for tracking the position of a second craft from on board a first craft as defined in claim 73 further comprising means for detecting the presence of any conflicting radio frequency signal.

75. An apparatus for avoiding collisions between a first craft having a first identification code and at least a second craft having a second identification code, the first craft being within range of an existing navigational system and the first and the second craft being within a predetermined range of each other, the apparatus comprising:

means for determining, on board the first craft and using the existing navigational system, the first craft's position in at least one plane in space which is of interest to the second craft to avoid a collision with the first craft;

means for encoding the first craft's position, the first identification code and the presence or absence of any current communication radio frequency on which the first craft can be contacted by voice, such that the encoded information is carried by a first radio frequency signal;

means for detecting the presence of any conflicting radio frequency signal and determining whether transmission of the first radio frequency should proceed;

means for transmitting the first radio signal;

means for receiving, on board the first craft, a second radio frequency signal transmitted from the second craft, the second radio frequency signal carrying the position of the second craft, the second identification code and the presence or absence of any current communication radio frequency on which the second craft can be contacted by voice;

means for decoding, on board the first craft, the second craft's position, the second identification code and the presence or absence of any current communication radio frequency on which the second craft can be contacted by voice;

means for simultaneously displaying the first craft's position and the second craft's position on board the first craft so that the operator of the first craft is apprised of the position of the second craft, the second identification code and the presence or absence of any current communication radio frequency on which the second craft can be contacted by voice so as to avoid a collision therebetween.

76. An apparatus for avoiding collisions between a first craft having a first identification code and at least a second craft having a second identification code as defined in claim 75 wherein the means for determining the first craft's position comprises a LORAN receiver.

77. An apparatus for avoiding collisions between a first craft having a first identification code and at least a second craft having a second identification code as defined in claim 75 wherein the means for determining the first craft's position comprises a GPS receiver.

78. An apparatus for avoiding collisions between a first craft having a first identification code and at least a second craft having a second identification code as defined in claim 76 or 77 wherein the means for transmitting the first radio frequency signal comprises:

a radio frequency transmitter operating in a frequency range from about and including the VHF band to about and including the SHF band; and an omnidirectional antenna system.

79. An apparatus for avoiding collisions between a first craft having a first identification code and at least a second craft having a second identification code as defined in claim 78 wherein the means for detecting the presence of any conflicting radio frequency signal comprises a radio frequency receiver.

* * * * *

UNITED STATES PATENT AND TRADEMARK OFFICE
CERTIFICATE OF CORRECTION

PATENT NO. : 5,153,836
DATED : October 6, 1992
INVENTOR(S) : EDWARD J. FRAUGHTON et al.

It is certified that error appears in the above-identified patent and that said Letters Patent is hereby corrected as shown below:

Title page, column 1, lines 9-10, "Salt Lake City, Utah" should be --South Jordan, Utah--
    Column 1, line 10, "any one" should be --anyone--
    Column 2, line 13, "dependant" should be --dependent--
    Column 2, line 16, "dependant" should be --dependent--
    Column 4, line 27, "interfer" should be --interfere--
    Column 9, line 48, delete "a"
    Column 10, lines 38-39, "speed spectrum" should be --spread spectrum--
    Column 10, line 40, before "non-interrogation" insert --interrogation or--
    Column 232, line 24, "aircraft" should be --craft--
    Column 233, line 26, eliminate "to"
    Column 229, line 19, after "by" insert --a--

Signed and Sealed this

Twenty-third Day of November, 1993

Attest:

BRUCE LEHMAN

*Attesting Officer*      *Commissioner of Patents and Trademarks*